United States Patent [19]

Jordan et al.

[11] Patent Number: 4,868,785
[45] Date of Patent: Sep. 19, 1989

[54] BLOCK DIAGRAM EDITOR SYSTEM AND METHOD FOR CONTROLLING ELECTRONIC INSTRUMENTS

[75] Inventors: Dale A. Jordan, Aloha; Lynne A. Fitzsimmons; William A. Greenseth, both of Portland; Gregory L. Hoffman, Beaverton; David D. Stubbs, Portland, all of Oreg.

[73] Assignee: Tektronix, Inc., Beaverton, Oreg.

[21] Appl. No.: 7,234

[22] Filed: Jan. 27, 1987

[51] Int. Cl.⁴ ................... G06F 15/46; G06F 15/20
[52] U.S. Cl. ................................................ 364/900
[58] Field of Search ............... 364/200 MS File, 300, 364/900 MS File, 578

[56] References Cited

U.S. PATENT DOCUMENTS

| 4,064,394 | 12/1977 | Allen | 364/200 |
|---|---|---|---|
| 4,315,315 | 2/1982 | Kossiakoff | 364/300 |
| 4,389,706 | 6/1983 | Gomola et al. | 364/200 |
| 4,656,603 | 4/1987 | Dunn | 364/900 |
| 4,723,209 | 2/1988 | Hernandez et al. | 364/300 |

OTHER PUBLICATIONS

Wolfe, "Block Diagrams and Icons Alleviate the Customary Pain of Programming GPIB Systems," Electronic Design, Apr. 17, 1986, pp. 125-132.

Primary Examiner—Gary V. Harkcom
Assistant Examiner—Christopher H. Lynt
Attorney, Agent, or Firm—Alexander C. Johnson, Jr.; Robert S. Hulse

[57] ABSTRACT

A block diagram editor system and method is implemented in a computer workstation that includes a Cathode Ray Tube (CRT) and a mouse, graphics and windowing software, and an external communications interface for test instruments. The computer is programmed for constructing, interconnecting and displaying block diagrams of functional elements on the CRT. From prestored routines for each functional element, the software assembles and executes a program that emulates the functional operations of each element and transfers data from output from each element in turn to an input of a succeeding block, as determined by the block diagram configuration. The block functions include signal generating and analysis functions, and functions for control of various types of test instruments, which can be interactively controlled through the CRT and mouse. The computer converts desired outputs of the instruments into control settings and receives, analyzes and displays data from the instruments. Blocks can also be grouped into macroblocks.

8 Claims, 64 Drawing Sheets

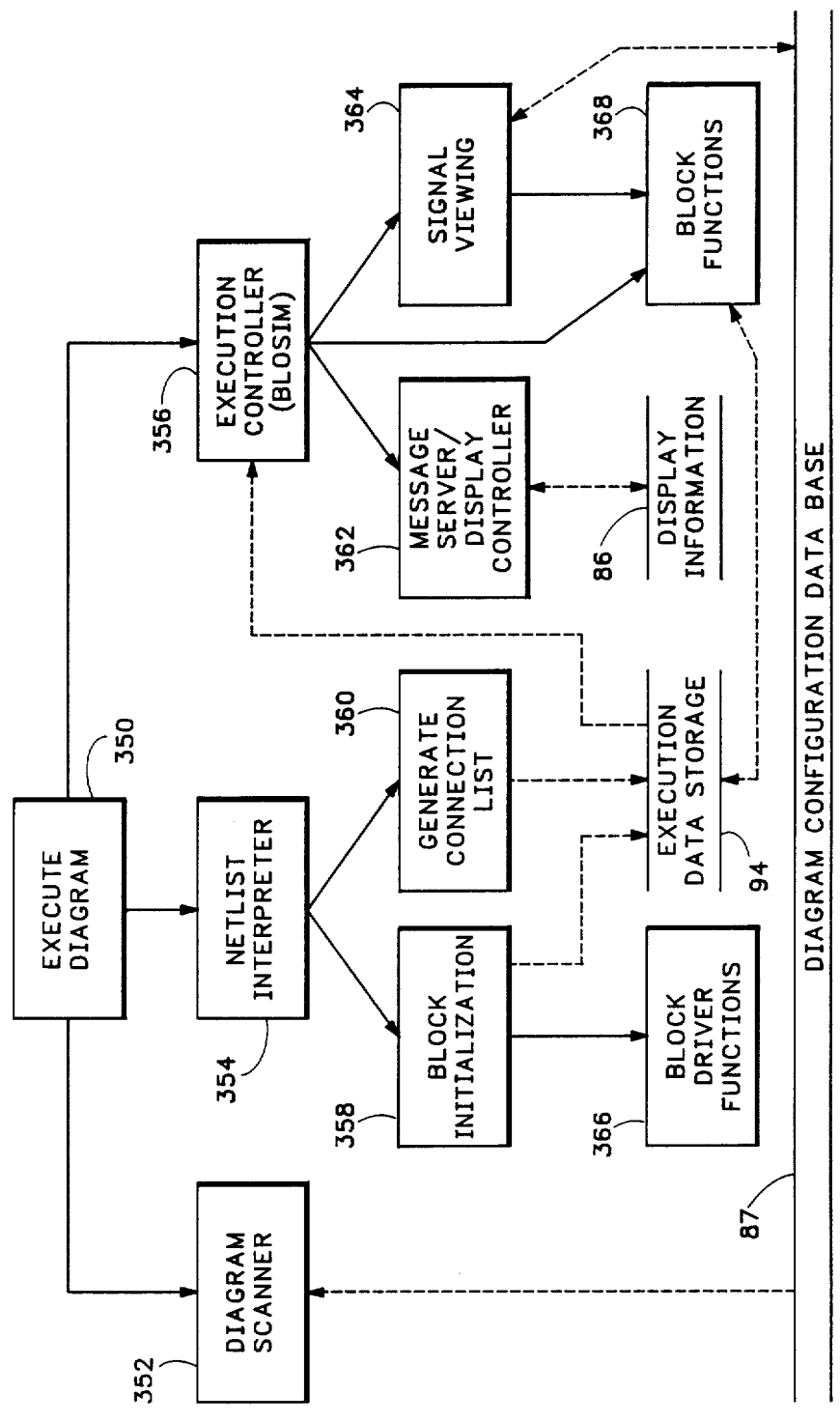

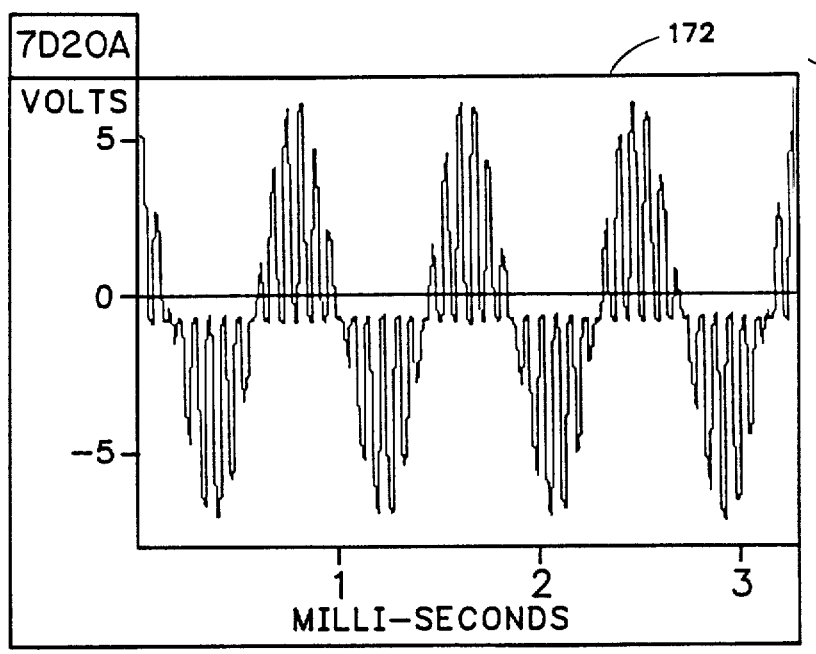
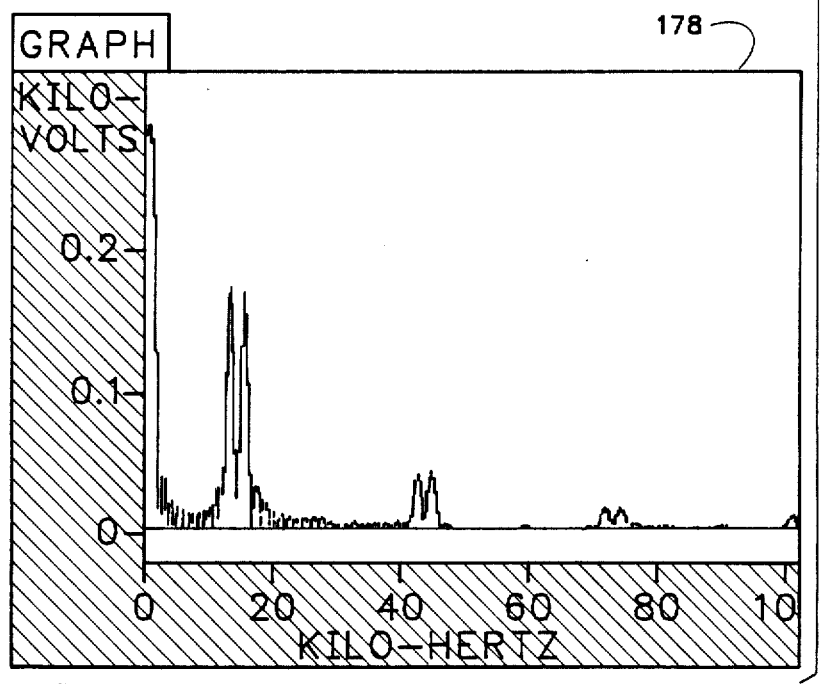
FIG. 19 (CONTINUED)

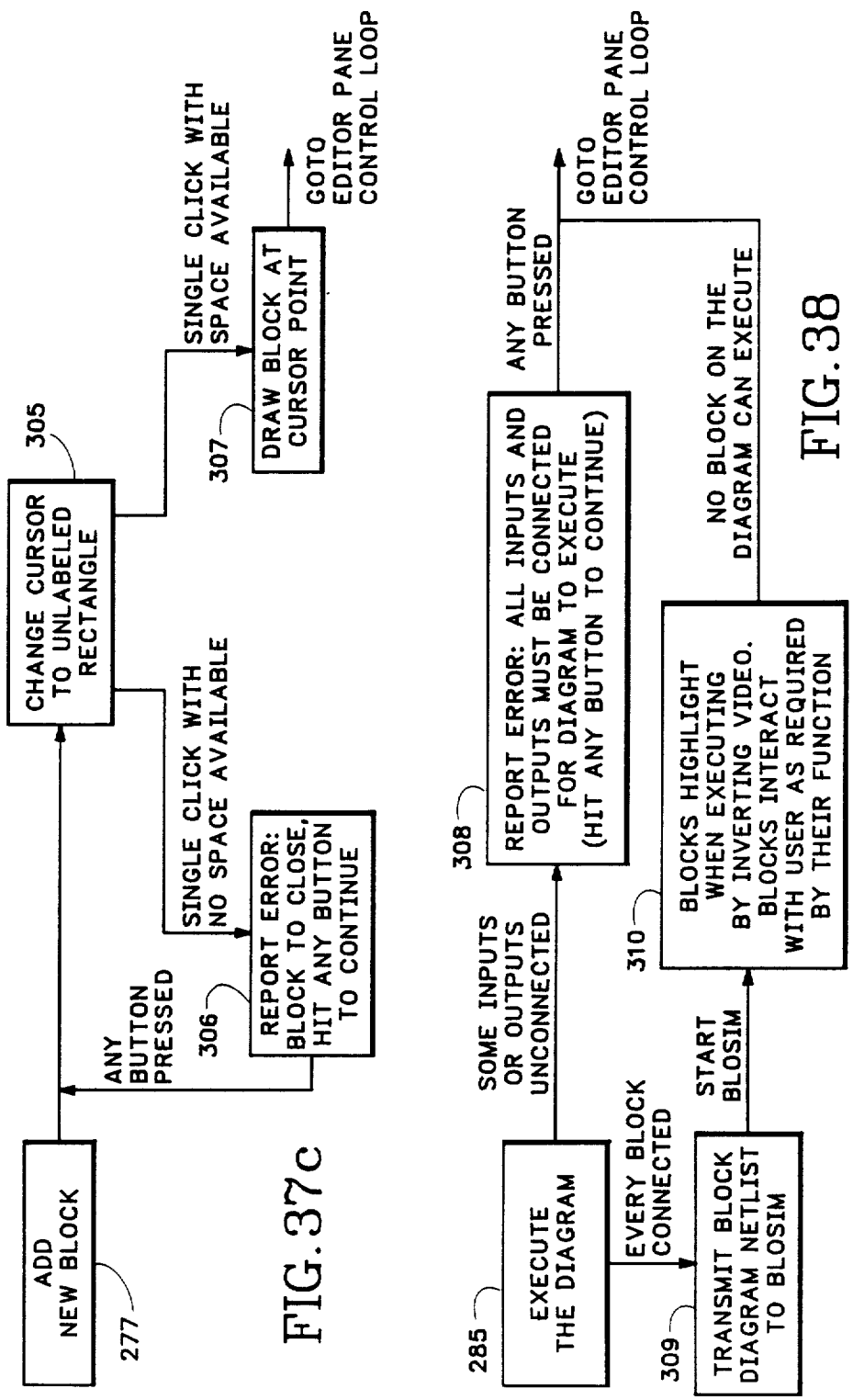

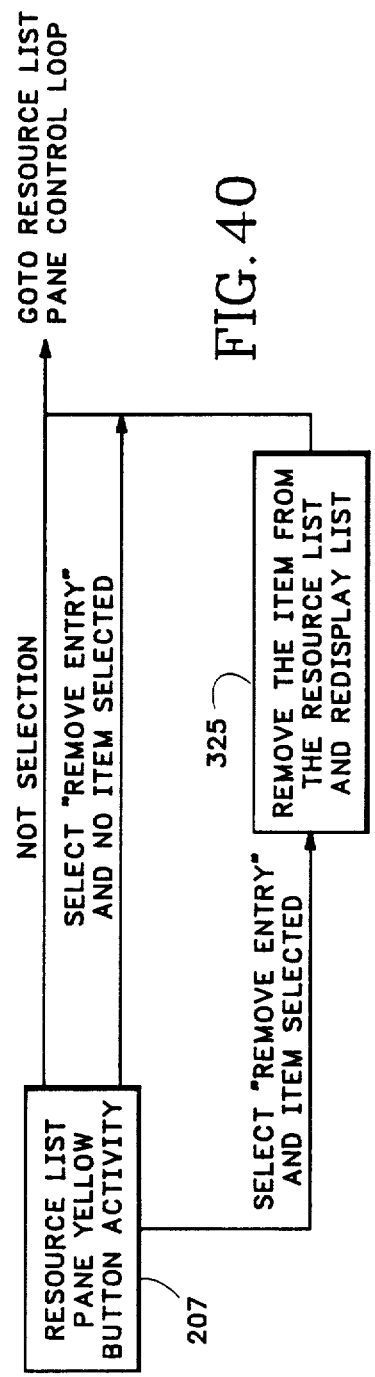
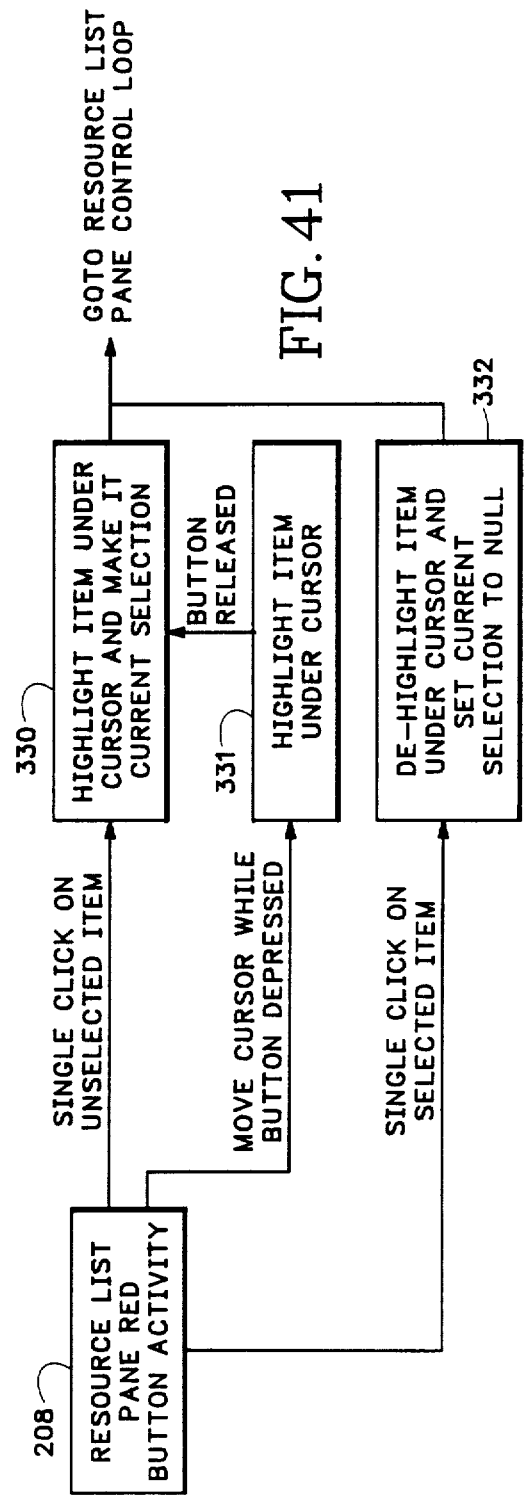
FIG. 40
FIG. 41

BLOCK DIAGRAM EDITOR SYSTEM AND METHOD FOR CONTROLLING ELECTRONIC INSTRUMENTS

RELATED APPLICATION DATA

This application is related to commonly-assigned U.S. patent application Ser. No. 935,369, filed on even date herewith by D. Stubbs, entitled SIGNAL VIEWING INSTRUMENTATION CONTROL SYSTEM.

BACKGROUND OF THE INVENTION

The invention relates generally to a graphical user interface system and more particularly to a system and method for a user interactively to computer-control an electronic testing system.

In a typical experiment or testing environment, there is a device or object under test, a means to stimulate the device under test, and a means to measure the response of the device to stimulation. The process of stimulus/response testing is typically followed by an analysis phase to extract specific information from the response measurement.

In a computer-based instrument environment, a host computer is connected to the stimulus and response instruments. This computer, commonly called the controller, controls the operation of the test instruments and can be used to perform the analysis of the response data. The most common interface for connecting the controller to the instruments is the GPIB (General Purpose Interface Buss) or IEEE 488 standard.

The most common approach to control of this computer-based stimulus/response testing has been to write a program in BASIC, FORTRAN or other high-level programming language to control the instrumentation and, in a similar manner, to write a program to perform the response data analysis. The instrument control programs conventionally include subroutines, or drivers, which interpret the control expressions in the high-level language and convert them into the communication protocol required to control the instrument. For certain instruments, drivers may also report the state of the instrument, such as the control settings and error status information, as well as the response data that an instrument may detect. These drivers are essentially similar to the computer operating systems used to communicate with peripheral devices, such as terminals, disk drives and magnetic tape drives.

BASIC is typically the language of choice for test system developers and users, because it is easy to learn by novices and is interactive. Nevertheless, the writing of control and analysis programs can become quite tedious and the programs are often difficult to modify. The user must communicate with the test instrumentation in terms of its conventional control settings, e.g. amount of vertical offset, vertical scale factor, etc. The user must understand not only how to control the test instrument but how to communicate the desired controls in the programming language.

Many high-level languages have also been extended to provide means for graphically displaying data returned from test instruments. The programs employ windowing modules or subroutines to convert acquired data, e.g., digitized signals, from the coordinate system of the data, e.g., time vs. voltage, into the coordinate system of the display device (CRT). With data transformed into display coordinates, graphing modules interpret various language commands and apply the commands to the display-coordinate data and produce instructions in a form that the display device requires to render a graphical representation of the test data.

High-level language elements, windowing modules and graphing modules have been widely used to produce graphical representations of data stored in computer memory. They have also been used in conjunction with graphic input devices, e.g., a joystick, mouse, etc, which controls a display cursor, to interpret the cursor's screen location in terms of the coordinate system of the display data. This type of display system enables the user to display the stored data in different scales, but the resolution of the data displayed is limited to that which is stored. Zooming in on a portion of a waveform cannot add any more detail about the waveform than was originally stored. Also, the stored data is limited to the record length of data stored. Thus, zooming out beyond the dimensions of the stored data does not make more data available. To remedy both of these problems requires the user to reprogram the test instrument to acquire a new set of data.

In conventional manual operation of test instruments, the user operates the test instrument controls interactively in response to the graphical presentation of the data. The operation of programmable test instruments controlled by high-level programming languages, however, requires forethought and calculation. Thus, programmable test instruments are difficult to use in an interactive manner. The user can set goals in terms of the display data, but must transform these goals into terms of test instrument settings in order to act. If more than one instrument is being used, each must be set separately. Similarly, if the manner of analysis of the returned test data is to be modified, the analysis routines must also be reprogrammed. All of this entails much complexity, and requires substantial expertise, time and careful work to accomplish successfully.

Software systems are also known which enable a user to model and simulate systems on a computer and interactive display. An example of such a system is BLOSIM, a general purpose simulation program for sampled data systems described in D. G. Messerschmitt, "Blosim—a Block Simulator," Dept. of Electrical Engineering, Univ. of California—Berkeley (June 7, 1982). A BLOSIM user partitions a system to be simulated into small pieces implementing elementary parts of the system, each piece called a block, and provides a simulation program for each block. The user also provides a program that defines the topology of interconnection of the blocks. BLOSIM then handles the details of the actual interconnection and execution of the blocks. BLOSIM was not designed to be used as a test instrument control program. Moreover, the topology of the blocks must be recompiled each time a change is made in the system under test. Additionally, application of BLOSIM to actual systems becomes very difficult as the topologies become increasingly complex. Hence, within the known state of the art, BLOSIM is not applicable to test instrumentation control.

Accordingly, a need remains for an improved method and apparatus for controlling test instrumentation and analyzing signals.

SUMMARY OF THE INVENTION

One object of the invention is to provide an improved method and means for controlling, through a computer workstation interface, a test instrumentation system.

A second object of the invention is to provide a single channel of access to engineering, testing, analysis, research, etc. resources in a test system.

Another object is to eliminate the need for test instrument front panel controls and displays by providing workstation-based control and thereby reduce the cost of programmable test instruments.

A further object is to minimize the time required for a user to establish or modify test instrument settings.

Yet another object is to enable a user to control a test system or to analyze signals in a manner to which the user is accustomed, including defining control or analysis in terms of operational goals.

An additional object is to enable a user to control the complexity of the user interface with test instrumentation systems and analysis problems.

The invention provides a method and apparatus for controlling a test instrumentation system, or usable in other applications such as signal analysis, that enables a user to manipulate operation through a graphical interface based on block diagrams. The system includes a programmable computer having a memory, a processor, a graphical display means, and input means including user-operable means for selecting and positioning graphic data on the display. Preferably, for controlling a physical system such as test instrumentation, the computer also includes an external communications means. The computer is programmed with software which enables the user interactively to edit and program a block diagram for execution by the computer.

So programmed, the system includes block display means responsive to the user operable means for displaying a plurality of user selected blocks as graphical data on the display. The blocks include a first type of block having at least one output terminal and a second type of block having at least one input terminal, and can include blocks having both input and output terminals. Associated with each of the first type of blocks is a function instruction means executable by the processor for generating a first set of signal data in accordance with a predefined first function and providing the signal data at the output terminal of such block. Similarly, associated with each of the second type of blocks is a function instruction means executable by the processor for transforming an input signal data in accordance with a predefined second function. The second type of block can include means for returning information derived from the transformed data to the user. A third type of block has both input and output terminals. Such blocks have an associated function instruction means that is executable by the processor for transforming the input signal data in accordance with a predefined third function and providing a transformed set of signal data on the output terminal.

The system also includes interconnection display means responsive to the user-operable means for displaying an interconnection between the various types of blocks, connected from an output terminal of one block to an input terminal of another block as designated by the user. Associated with the displayed interconnection is a data flow means for transmitting the signal data from output to input terminal between the function instruction means associated with each of the blocks between which the displayed interconnection is connected.

The system includes means responsive to the input means for actuating the processor to execute each of the function instruction means in turn. Accordingly, a first set of signal data is generated in accordance with the functions of each of the first type of blocks. This set of signal data is transmitted to the function instruction means of blocks of the second type in accordance with the data flow paths defined by the interconnections. The signal data generated by the blocks of the first type is then transformed in accordance with the functions of the second type of blocks to produce a second set of signal data.

The system can include means for actuating the graphical display means for graphically displaying the second set of signal data. Transforming-type blocks, having both input and output terminals, and their associated function instruction means, can be connected between blocks of the first and second type to perform intermediate transformations of the signal data.

Preferably, the system includes a block storage means for storing a plurality of unique function instruction means, each in association with a predetermined user-selectable block. A means is provided for the user to select, by operation of the user-operable means and block display means, the stored function instruction means associated with a designated block. A means is also provided that is responsive to the user interconnecting the blocks on the display means for assembling the function instruction means for each designated block for execution by the processor in a sequence determined by the direction of signal data transmission indicated by the interconnections.

Two or more blocks of the first type can be connected by interconnections to a block of the second type and the system includes means for executing the selected function instruction means for each of the first type of block and outputting resultants of the signal data from each such block to the second block in substantially parallel operation. Similarly, a block of the first type can be connected by interconnections to two or more blocks of the second type and the system includes means for executing the selected function instruction means for the blocks of the second type on the signal data transmitted by the data flow means for each interconnection from the first block.

Many different kinds of blocks can be used in the system, the function of each being determined by the associated prestored function instruction means. Some blocks function to generate, transform or display data within the computer. Others function to control operation of physical apparatus, such as programmable test instruments, through the external communications interface. The function instruction means of the latter type include means for generating commands to program settings of the instruments. A block and associated function means can be provided which, respectively, represents and simulates the physical system in the block diagram, e.g., for comparing operation of a prototype device with a design simulation of the device.

The function instruction means can include one or more user-settable parameters responsive to user operation of the input means to modify the function thereof. Similarly, the function instruction means for certain blocks, such as a digitizer, can be operated to produce or transform a two-dimensional signal with the graphic display means operable to display such signal as two-dimensional graphic data. Preferably, a means is provided, which is responsive to operation of the user-operable means to select and position a feature of the displayed two-dimensional graphic data, for manipulating the function instruction means of such block to modify the function thereof. Such means correspondingly includes means for transforming the displayed feature from display coordinates into terms of settings of the instrument to reset its parameters as the associated function instruction means are readied for execution.

The preferred embodiment further includes means actuable by the user-operable means for the user to select and group the displayed blocks and their associated connections to form a macro-block executable as a unit by the processor. The block storage means can correspondingly include means for storing the macro-block for manipulation in same manner as blocks of the first, second and third type. Such means can further include means for storing any parameters associated with the blocks constituting a macro-block and enabling the user selectively to modify such parameters. A means is preferably provided for the user to nest macro-blocks within other macro-blocks.

The invention enables a user to plan, decompose and carry out measures, experiments, signal analysis and other complex tasks, concentrating on the goals of the task at hand, by expressing the task in a way familiar to the typical user—a block diagram. It enables the user to program in the semantics of a given problem, with little or no interference from the syntax of programming language. By working with schematic concepts, the user's concentration is focused on the problem, the system is easier to use and learn and the cognitive burden is less. The system allows the user, in effect, to draw programs with predefined processing elements or blocks and interconnections. If a block diagram becomes too complex, the user can readily reduce its complexity by grouping several blocks together and displaying them as a single, higher-level macro-block.

In a preferred embodiment, the user selects desired blocks from a menu displayed in one portion of the graphic display, positions the selected blocks in an editing area, and interconnects the inputs and outputs of the blocks as desired to direct the data flows. The user may group blocks into macro-blocks to reduce visual complexity and to prevent overflow of the editing area. The macro-blocks can then be added to the collection of predefined blocks. The user may also place non-executable "empty" blocks in the editing area and can subsequently refine them into collections of predefined blocks as the user's grasp of the problem becomes more concrete.

After having drawn a diagram that represents what the user intends to accomplish, the user can then execute the diagram. From the user's viewpoint, the diagram is the program. The diagram also self-documents both the program and the particular experiment or analysis task that has been designed and executed. Preferably, the software is written in an object-oriented language, which facilitates the documentation and information presentation task by enabling a user to "look inside" blocks at descending layers of complexity while leaving that complexity behind for ease of manipulation and editing of the block diagrams.

The foregoing and other objects, features and advantages of the invention will become more readily apparent from the following detailed description of a preferred embodiment which proceeds with reference to the accompanying drawings.

BRIEF DESCRIPTION OF THE DRAWINGS

FIG. 3c is a diagram of the execution manager portion of the software structure of FIG. 3.

FIG. 38 is a state diagram of the "execute the diagram" state in FIG. 37.

FIG. 40 is a state diagram of the "resource list pane yellow button activity" state in FIG. 31.

FIG. 41 is a state diagram of the "resource list pane red button activity" state in FIG. 31.

FIGS. 45a and 46a are state diagrams of the "vertical settings" and "horizontal settings" states, respectively, in FIG. 44.

FIGS. 45b and 46b are diagrams graphically illustrating operation of the procedures of FIGS. 45a and 46a, respectively.

TABLES 1, 2 and 3 summarize examples of block functions used in the block diagram editor system for signal analysis and test instrument control.

TABLE 4 shows an alternate form of the Block Editor menu, together with a brief summary of the functions listed in the menu.

APPENDIX A is a program listing in C programming language of a block function routine for controlling an example of a stimulus-type test instrument, a function generator, in accordance with the invention.

APPENDIX B is a C-language program listing of a block function routine for controlling an example of a response-detecting instrument, a digitizer, in accordance with the invention.

APPENDIX C is a description and example of a C-language block function routine used in the present invention for performing signal analysis, polar conversion, on signal data.

Figure 16:
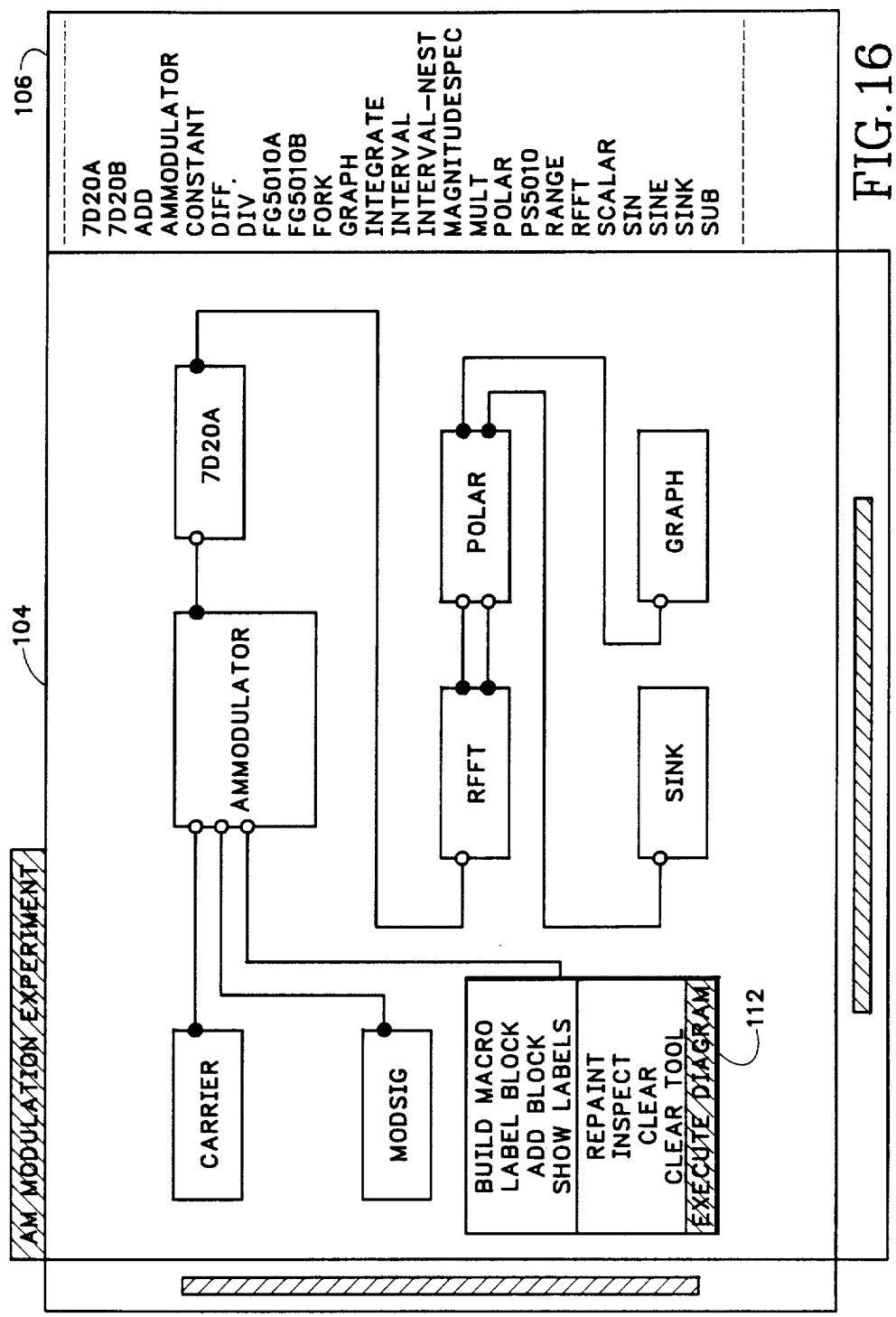
FIG. 16 shows selection on the pop-up menu of the "execute diagram" command to commence execution.

APPENDIX D is a format and example for the block diagram of FIG. 16 of the netlist created by execution of the block diagram.

APPENDIX E is a C-language listing of the definition of SAMPLE in the Experiment Manager.

APPENDIX F is a C-language listing, with comments, of a generalized block function.

APPENDIX G defines the variables employed in program for signal viewing control of a digitizer.

APPENDICES H and I are Smalltalk-80 program listings, with comments, for the methods of determining vertical and horizontal digitizer settings under signal viewing control.

APPENDIX J is a Smalltalk-80 program listing, with comments, for the key methods for controlling a power supply via signal viewing.

DETAILED DESCRIPTION

This description begins with a general description of the overall hardware and software structure as used, first, for signal analysis and, second, for managing an experiment involving an electrical circuit (device under test). Then, operation of the system is described from the user's viewpoint. Finally, the block diagram editor software structure and operation are described in detail.

1.0 GENERAL HARDWARE AND SOFTWARE STRUCTURE

1.1 Computer System

Figure 5:
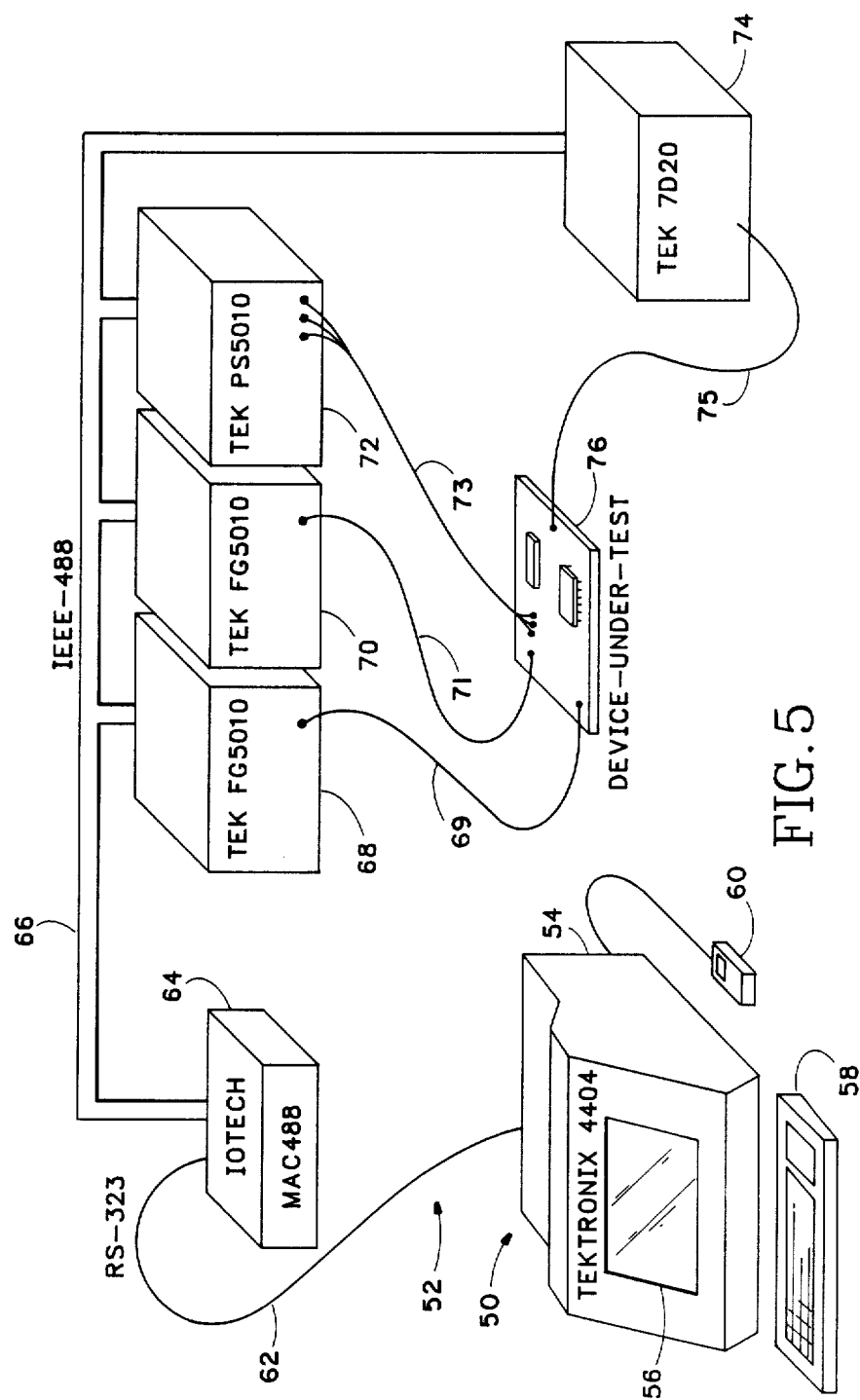
FIG. 5 is a diagram of the layout and interconnection of a computer and programmable test instrumentation system for stimulating a device under test and detecting and analyzing the response in accordance with the invention.

Referring to FIG. 5, a computer system 50, arranged and programmed in accordance with the invention, is connected to an instrumentation system 52 to provide an Experiment Manager system. Computer system 50 comprises a general purpose digital computer 54, conventionally including a central processor and random access and hard disk memory (not shown). A user interacts with the computer through a graphic display means 56 and user input means including a keyboard 58 and a three-button mouse 60. (With some rearrangement of the software, a one-or two-button mouse could be used.) A suitable form of computer is provided by a Tektronix 4404 artificial intelligence workstation, which is commercially available with a Tektronix 4404 integrated CRT display serving as the graphic display means and with the aforementioned keyboard and three-button mouse.

1.2 Instrumentation System

As used in an experiment manager system, the computer system 50 is connected to the instrumentation system 52 by data communications means including a bi-directional RS-232 data bus 62, a protocol converter 64 and an IEEE 488 (GPIB) bi-directional data bus 66. The protocol converter is suitably an BIOtech Model MAC488 bus controller. The test instrumentation system can be composed of any of a wide variety of programmable electronic test instruments, compatible with the IEEE 488 protocol. Workstation other than the Tektronix 4404 can be used, which have a built-in GPIB interface, such as the IBM/PC-AT.

In the illustrated example of test instrumentation system 52, three signal generating instruments 68, 70, 72 and a signal detecting instrument 74 are shown connected to bus 66. Each of the signal generating instruments is connected via suitable conductors 69, 71, 73 to a device under test 76 comprising an electrical circuit. Conductors 69, 71, 73 are connected via suitable probes to locations in the device under test to stimulate the circuit as determined by the user. The response-detecting device 74 is similarly connected via a conductor 75 and suitable probe to a test point of interest on the circuit of device 76.

For purposes of example to illustrate application of the invention to management of an experiment, the device under test 76 is an amplitude modulator. The stimulating test instruments 68 and 70 are each a Tektronix FG5010 Programmable Function Generator and instrument 72 is a Tektronix Model PS5010 programmable power supply. An alternative example of test instruments 68, 70 can be the Analogic Corp. Model DATA 2020 polynomial waveform synthesizer, which is also programmable and controllable by IEEE 488 protocol. The response-detecting instrument 74 is preferably a Tektronix Model 7D20 digitizer. An alternate example of response-detecting instrument 74 is a programmable spectrum analyzer.

1.3 General Software Structure

Figure 3:
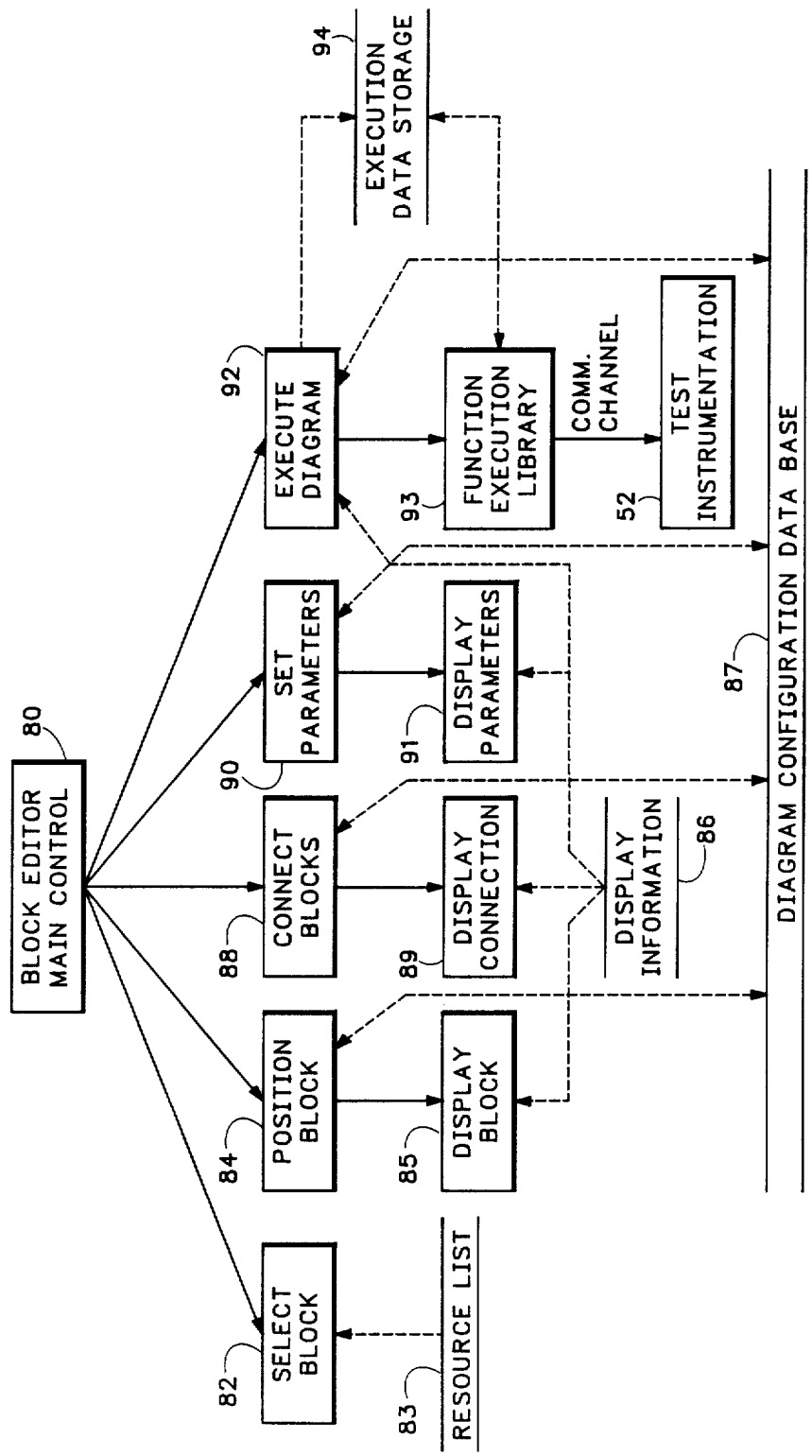
FIG. 3 is a diagram of the software structure implementing the block diagram editor system of the invention.

For purposes of the example described herein, computer 54 is assumed to be a Tektronix 4404 workstation programmed to run programs written in Smalltalk-80 and C programming languages under Uniflex or another UNIX-like operating system. The computer is further programmed, in accordance with the invention, with block diagram editor and execution manager software structured as shown in FIG. 3. The block editor software is preferably implemented in Smalltalk-80 or other object-oriented programming language. Such languages are known and described in the art, for example, in A. Goldberg, "Smalltalk-80, the Interactive Programming Environment" published by Addison-Wesley (1984); "4404 Artificial Intelligence System: Introduction to the Smalltalk-80 System" published by Tektronix (1984); and BYTE Vol. 6, No. 8 (August 1981) and Vol. 11, No. 8 (August 1986). Portions of the execution manager software are based on a modification of BLOSIM, referred to herein as IBLOSIM (for Interactive BLOck SIMulator), as shown in FIG. 3c and described in Section 4.0. These portions have been implemented in C programming language, which is well-known in the art, and the remainder is programmed in Smalltalk-80.

1.3.1 Block Editor Software

This software operates under control of a Block Editor Main Control routine, indicated by block 80. The software structure includes a Select Block routine 82, which is first invoked by the Block Editor Main Control routine. When actuated by the user as described below, this routine takes a selected block from a prestored resource list 83. Control is then shifted to a Position Block routine 84 which in turn accesses a Display Block routine 85 which causes conventional graphics software to display the selected block on the graphical display 56. The displayed information is stored in a display information memory 86 that continues to be updated as a block diagram is assembled on the computer by the user.

After positioning two or more blocks on the display, the user can then invoke a Connect Blocks routine 88. This routine in turn enables a Display Connection routine 89 to display interconnections selected by the user. These interconnections are also stored in the display information memory 86.

Once the block diagram has been assembled, the user can invoke a Set Parameters routine 90. Many of the functional blocks, such as those representing instruments 68, 70, 72 and 74, require that initial or default settings of parameters for operation of the instruments be input to the system. Invoking routine 90 for such a block causes a Display Parameters routine 91 to display a table of parameters for the instrument associated with the block. The user then fills in the desired parameters. As this is done for each block, the display parameters are added to the display memory.

Each of routines 84, 88 and 90 also provides block position, interconnection and parameter setting information to a diagram configuration data base 87. This data base is structured to provide data used by the execution manager software, described below, to create a netlist in the format of APPENDIX D that is used by the execution manager to control execution of the block diagram. In an operative embodiment of the system, this netlist is compiled after the block diagram has been fully assembled but, alternatively, it can be compiled incrementally, as the block diagram is being assembled, to attain faster execution.

The block editor's operation is described in more detail in Section 2.2 and its software structure is described in Section 3.0.

1.3.2 Execution Manager Software

After completing a block diagram, the user actuates the execution manager software through the Block Editor Main Control routine. This action invokes an Execute Diagram routine 92, which creates from the block diagram data stored in data base 87 a netlist, such as that of APPENDIX D, to control execution of the diagram. Routine 92 also accesses a prestored Function Execution Library 93, containing block function application subroutines that correspond to and implement each of the functions in resource list 83. The netlist dictates to the Execute Diagram routine which functional subroutines to use and how to link these subroutines for execution in the sequence embodied in the diagram.

As each function of the diagram is being executed, interim and output data are stored in an execution data storage 94. Then, as execution of each function is completed, the stored data is either output to the next function routine as determined by the netlist interconnections, or returned to the function subroutine to generate control setting commands for transmission via the communications channel to the appropriate test instrument of instrumentation system 52.

During execution of each block, the Execute Diagram routine provides a command to the Main Control routine to cause the block being executed to be highlighted on the display. In this stage of operation, the user can intervene in execution of the diagram to alter the parameters of a selected block and its associated function and re-execute the diagram. This capability is particularly useful to enable the user interactively to control the operation of the test instruments. It is further enhanced, for control of test instrumentation, by addition of a signal viewing capability that enables the user to display and manipulate features of operation of the test instruments in two dimensions. This capability is described below in Section 5.0.

Section 2.1 below outlines operation of the execution manager to execute the block diagram of FIGS. 1 and 2. Section 4.0 is a more detailed description of the software structure of the execution manager.

2.0 SYSTEM OPERATION

Figure 1:
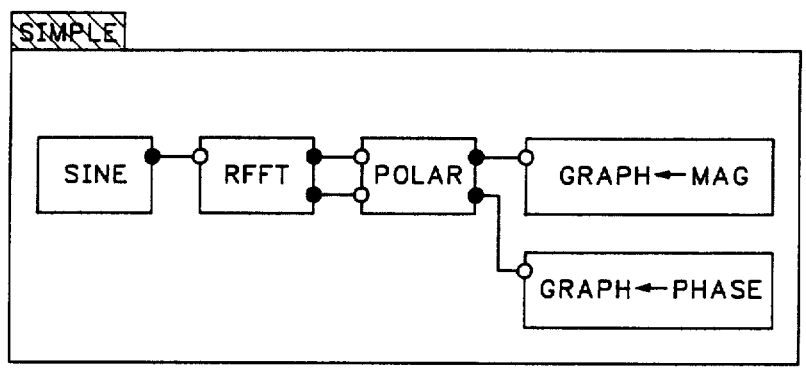
FIG. 1 is an illustration of a graphical display screen showing a simple application of the block diagram editor system of the invention to a signal analysis problem.
Figure 2:
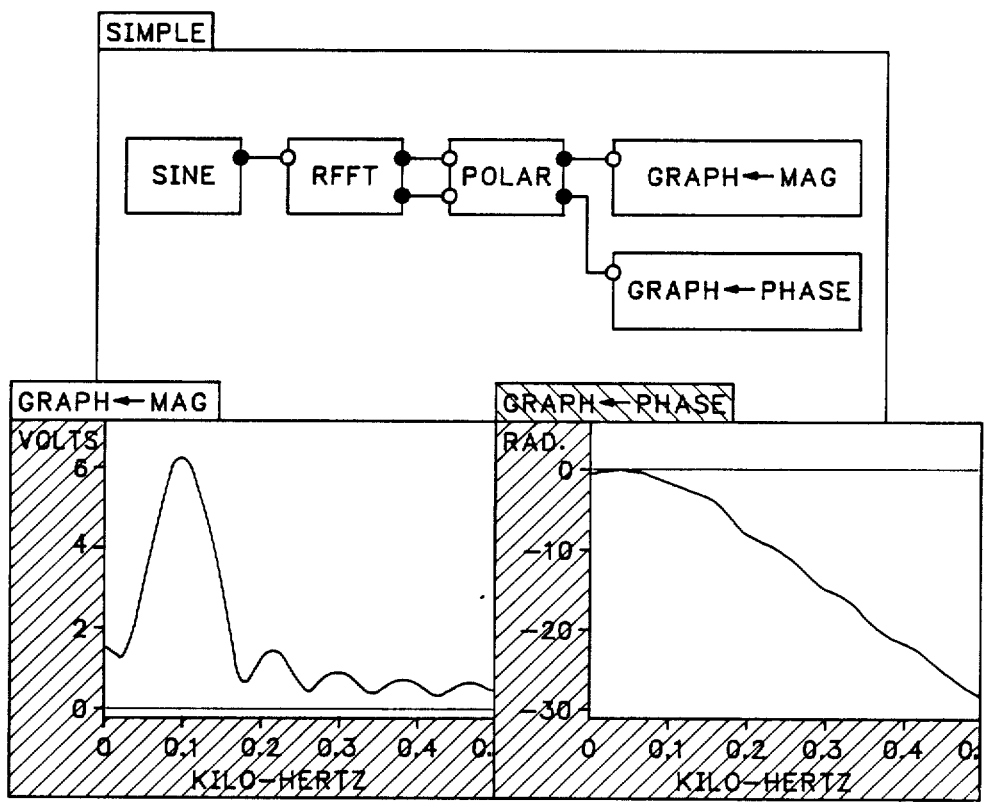
FIG. 2 shows the output information appearing on the display screen after executing the example of FIG. 1.

FIGS. 1 and 2 illustrate a simple application of the block diagram editor system of the invention to a signal processing problem. In this example, the user has constructed a block diagram, shown in FIG. 1, to generate and process a signal. Upon execution of the block diagram and underlying software assembled as described above, the originally-generated signal and signals output from the subsequent processing steps are graphed, as shown in FIG. 2.

Figure 4:
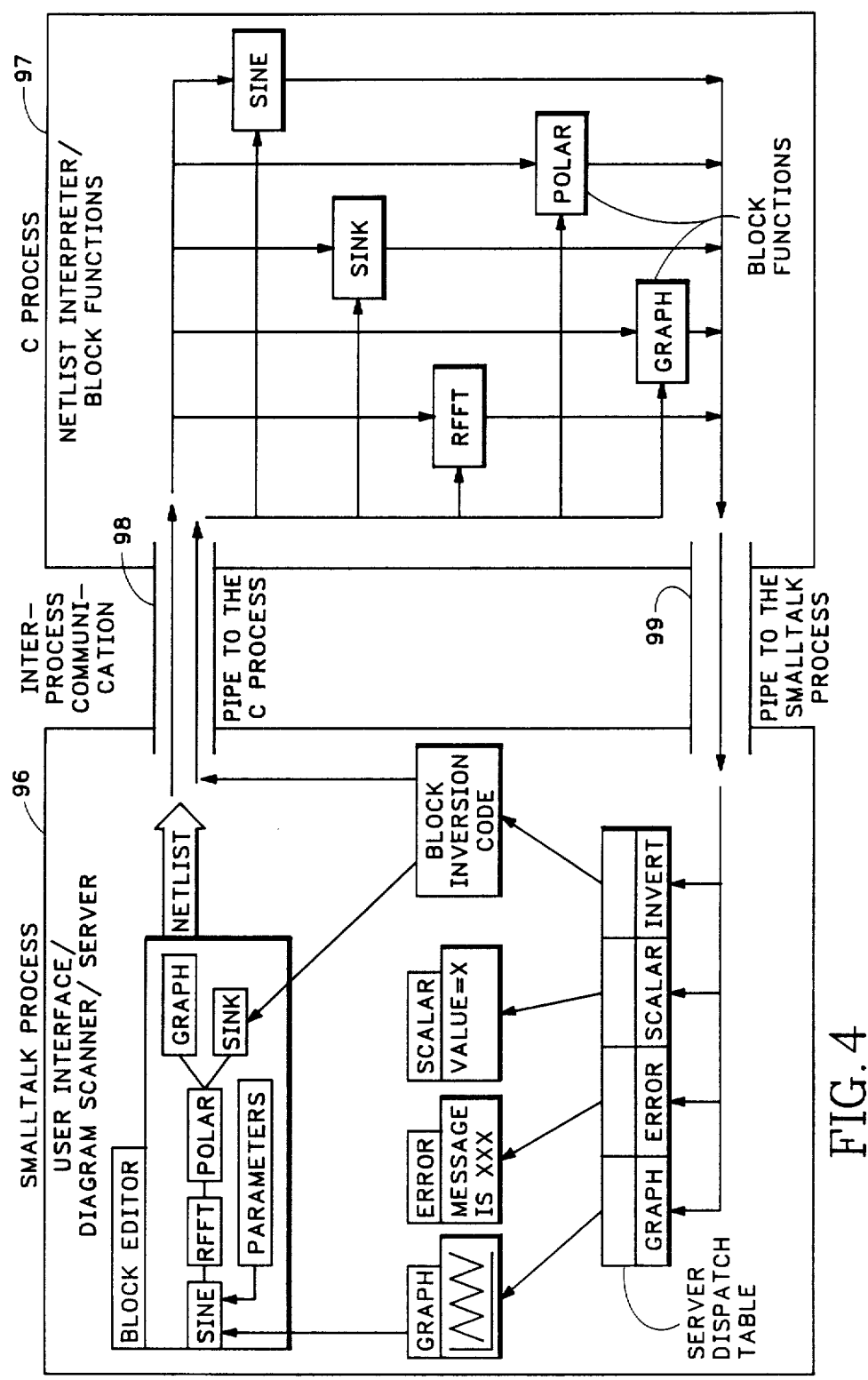
FIG. 4 is a diagram illustrating an example of operation of the execution manager software to execute a block diagram similar to FIG. 1.

Upon execution, the current block diagram is first checked for validity, i.e., to make sure all connections are proper. Next, in operation of the execution manager software, the Smalltalk process 96, shown on the left side of FIG. 4, is "forked" into a C process 97, shown on the right side of FIG. 4. The C process runs as a child process of the Smalltalk process, using pipelines 98, 99 for transfer of information between the two processes.

The Smalltalk process 96 converts the block diagram that the user has constructed into a netlist formatted like that in APPENDIX D. This is done by scanning the underlying data structures corresponding to the current block diagram, as stored in diagram configuration data base 87 (FIG. 3), and creating a list of all the blocks, their parameters and their connections. Then, the netlist is shipped to the C process, which includes a netlist interpreter and the Function Execution Library 93. The netlist interpreter handles the setup, scheduling and execution of the block functions Under this routine, the netlist is interpreted, the parameters are set for the various block function routines called by the netlist, and the routines are scheduled and then executed. The routines are scheduled to be executed in an order determined by the direction of data flow indicated by the interconnections shown in the diagram.

Before the function corresponding to each block commences execution, a block inversion request is transmitted by the C process 97 to the Smalltalk process 96 via pipe 99. In response to this request, the Smalltalk process causes the graphics software to reverse video or highlight the block to be executed to provide feedback to the user. In the case of signal view control, e.g., of the digitizer, this gives the user an opportunity to modify the parameters of the block about to be executed, as discussed further below.

Error messages and waveform data are transferred back to the Smalltalk process during execution of the block diagram. Such transfers cause graphical display objects to appear, if they do not already exist. These display objects then read and display the error messages or waveform data. The names of the blocks from the original block diagram are installed as the titles of the graphical display objects. When the entire diagram has finished executing, the C process dies and control returns to the user via the BlockEditor user interface.

In regard to the example of FIGS. 1 and 2, the sequence of execution commences with the routines corresponding to generator blocks, which generate signal data at their outputs. The example illustrated in FIGS. 1 and 2 shows generation of a sine function, sin(x). Execution then proceeds to the routines corresponding to transforming blocks, which accept and transform the signal data and provide modified signal data at their outputs. The example shows successive transformations, first, of the sine function signal by a fast Fourier transform (Rfft) and, second, by a polar conversion function (Polar), a listing for which is contained in APPENDIX C.

Finally, the output signal data are input to appropriate routines for the terminal blocks shown in the block diagram. The example of FIGS. 1 and 2 shows two such blocks (Graph), each of which has the function of graphing the signal data output from the block to which it is connected. An alternative form of block (e.g., "sink" in FIG. 4) can be used to dead end any signal data that is not of interest. The output of each Graph block is then transmitted back to the Smalltalk process, via pipe 99, for graphical display as shown in FIG. 2.

This simple example shows how the system of the invention can be used for simulation purposes. As will be seen from the ensuing description, a live signal could alternatively be input to computer system 50 via an appropriate communications interface for analysis similar to that illustrated in FIGS. 1 and 2. Similarly, signals can be generated in the manner illustrated by FIGS. 1 and 2 and output, through an appropriate interface, either directly to a communications system or in the form of control setting commands to other test instruments.

2.2 Experiment Manager

This section describes how a user interacts with a computer system 50 and the software of the invention to build, modify and execute block diagrams for purposes of managing an electrical circuit experiment. It is equally applicable to any of the foregoing applications. In this description, operation of the three-button mouse is couched in terms of button color, as used in the Goldberg text, i.e., the left or "select" button is red; the middle or "menu" button is yellow; and the right or "window" button is blue.

2.2.1 Editing and Resource Panes

Figure 6:
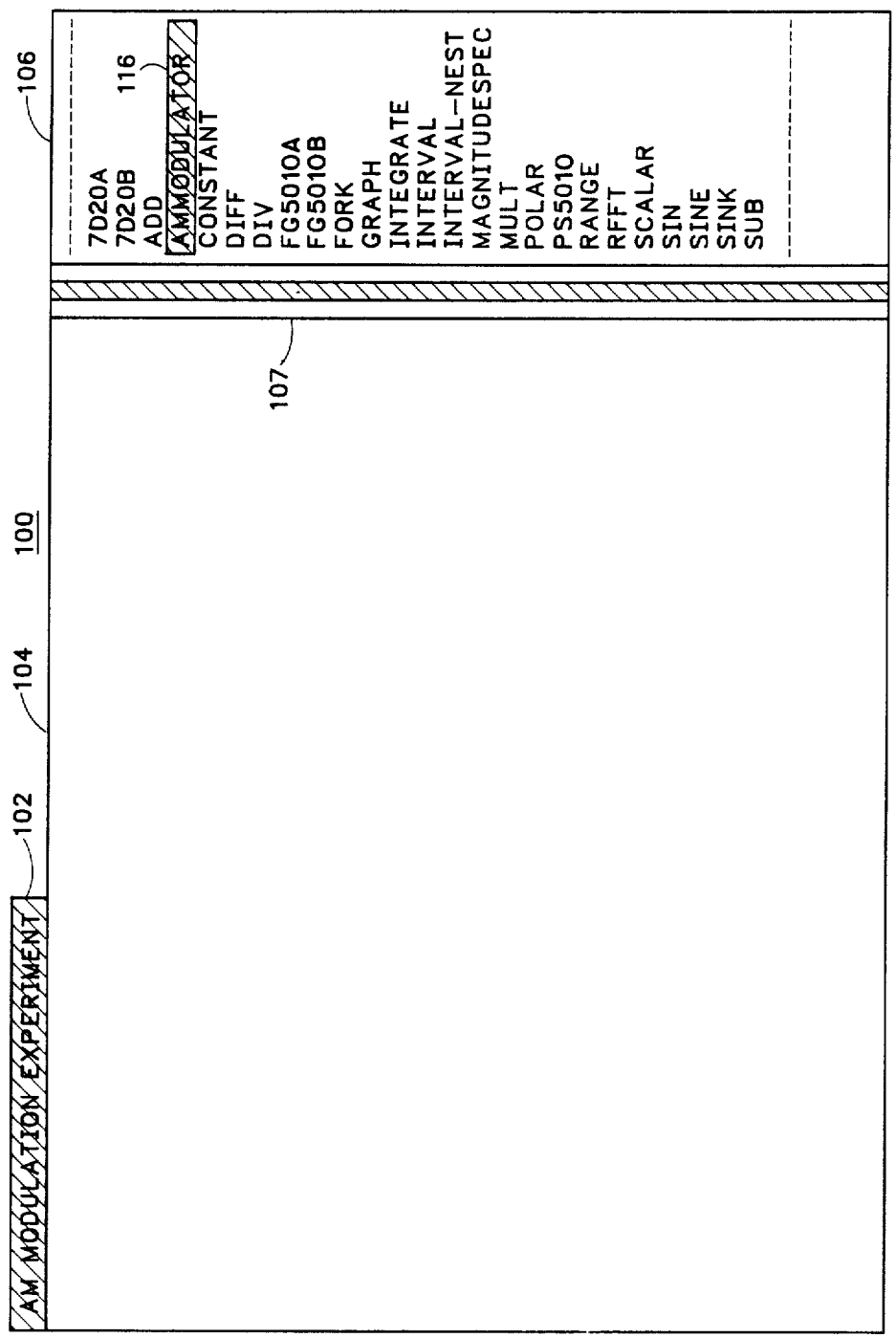
FIGS. 6–11 illustrate the steps of assembling a block diagram and associated diagram configuration data base in the computer of FIG. 5 for stimulating and detecting a response from the device under test.

Referring to FIG. 6, upon start-up, the user will see a view on 100 on screen 56 with "BlockEditor" in title tab 102. If there is no BlockEditor view on the screen, the user enters the following text in the work space: "BlockEditor openOn: Universe new" and then selects this line of text and executes it. The user then designates a location for the BlockEditor view in response to a prompt.

The BlockEditor view comprises two panes, an editor pane 104 on the left and a resource list pane 106 on the right. The resource list can be a multi-pane list. The BlockEditor view 100 may contain an entire block diagram, in which case the title tab will read "BlockEditor," or it may contain a "macro expansion," in which case the title tab 102 will contain the name of the macro, e.g., "amModulation Experiment", as shown in FIG. 6. The term "macro" refers to a collection of blocks and connections that have been grouped into a higher level module and the term "macro expansion" is the expanded display of that macro. The term "macro expansion BlockEditor" will refer to a BlockEditor view in which a macro expansion is being edited.

Figure 9:
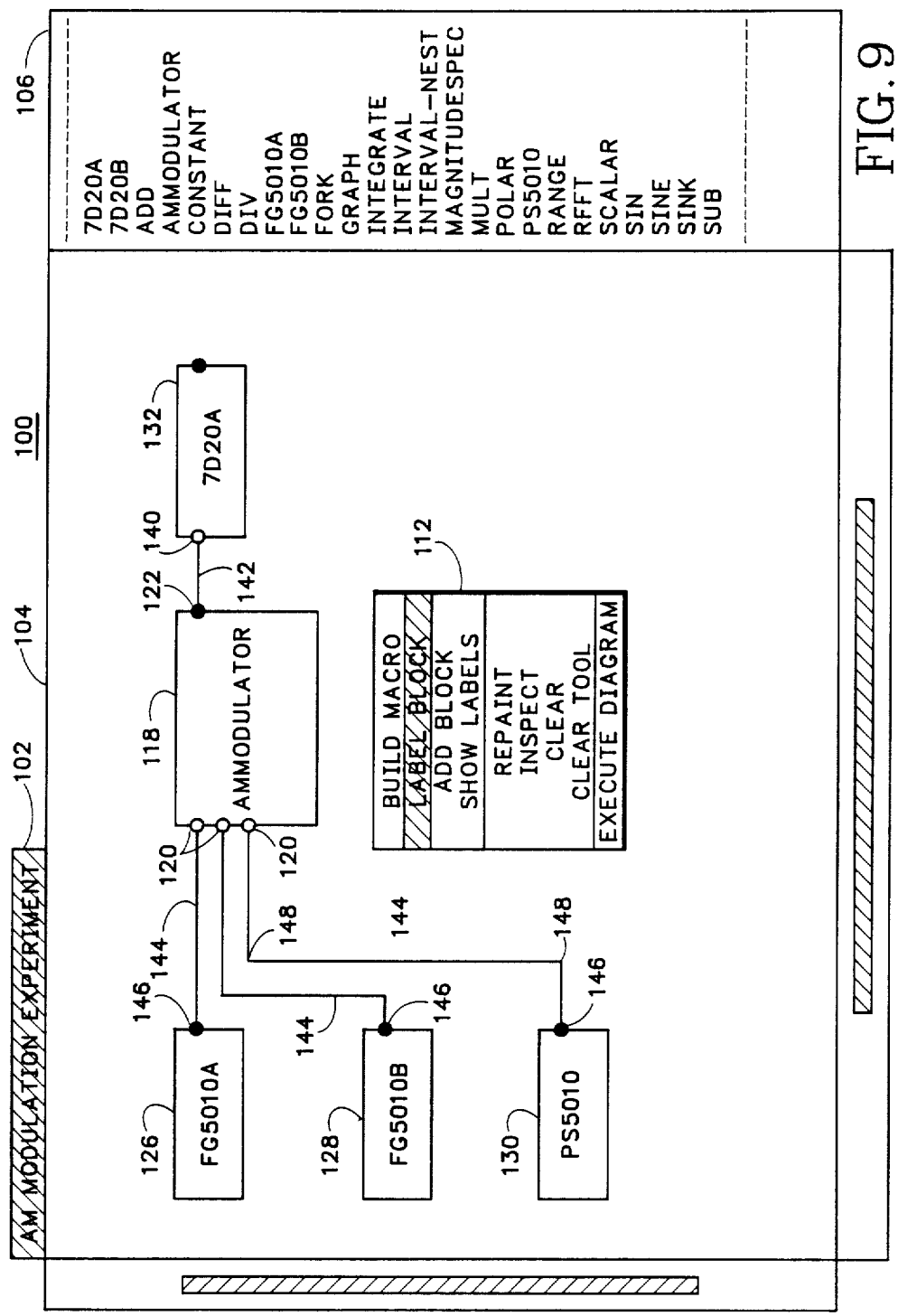

The editor pane can contain (1) blocks—labeled rectangles with white interior; (2) macros—labeled rectangles with patterned interior; and (3) connections—lines connecting block or macro output terminals (black dots, by convention to right of the block) to block or macro input terminals (small circles, by convention to the left of the block), as shown in FIG. 9.

Figure 7:
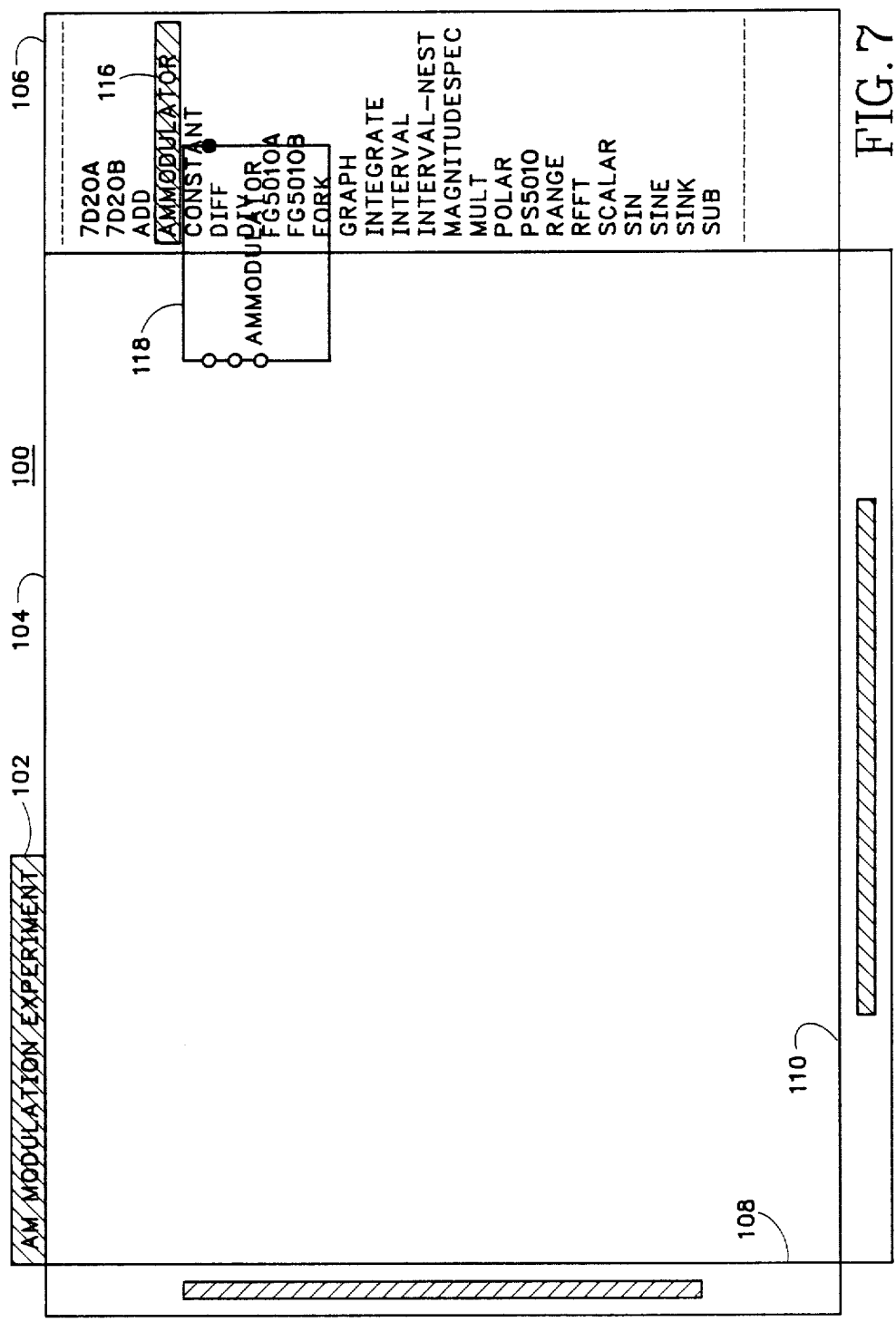

The resource pane has a vertical scroll bar 107, which appears when the cursor is in the resource pane, as shown in FIG. 6. It disappears when the cursor is moved into the editor pane, as shown in FIG. 7. The editor pane has X-Y scroll bars 108, 110, also as shown in FIG. 7. Individually, the scroll bars work just like a conventional Smalltalk vertical scroll bar. Simultaneous X-Y scrolling can be actuated by depressing the left shift key on keyboard 58 and pressing the red button on mouse 60. The left shift key can then be released. As long as the red button is held down, the screen will scroll in two dimensions.

2.2.2 Pop-up Menus

The editor pane has three pop-up menus, each of which contain a collection of editing commands. All three pop-up menus are invoked by pressing the yellow mouse button. The first menu is the BlockEditor menu 112, shown in FIG. 9. This menu is brought up by pressing the yellow mouse button while the cursor 114 (FIG. 8) is not inside a block or a macro. When the BlockEditor menu is brought up in a macro expansion view, two additional commands—"accept" and "cancel"—are included and the "execute diagram" command is omitted. Other combinations of functions can be included in the BlockEditor menu, for example, as shown in TABLE 4.

Figure 13:
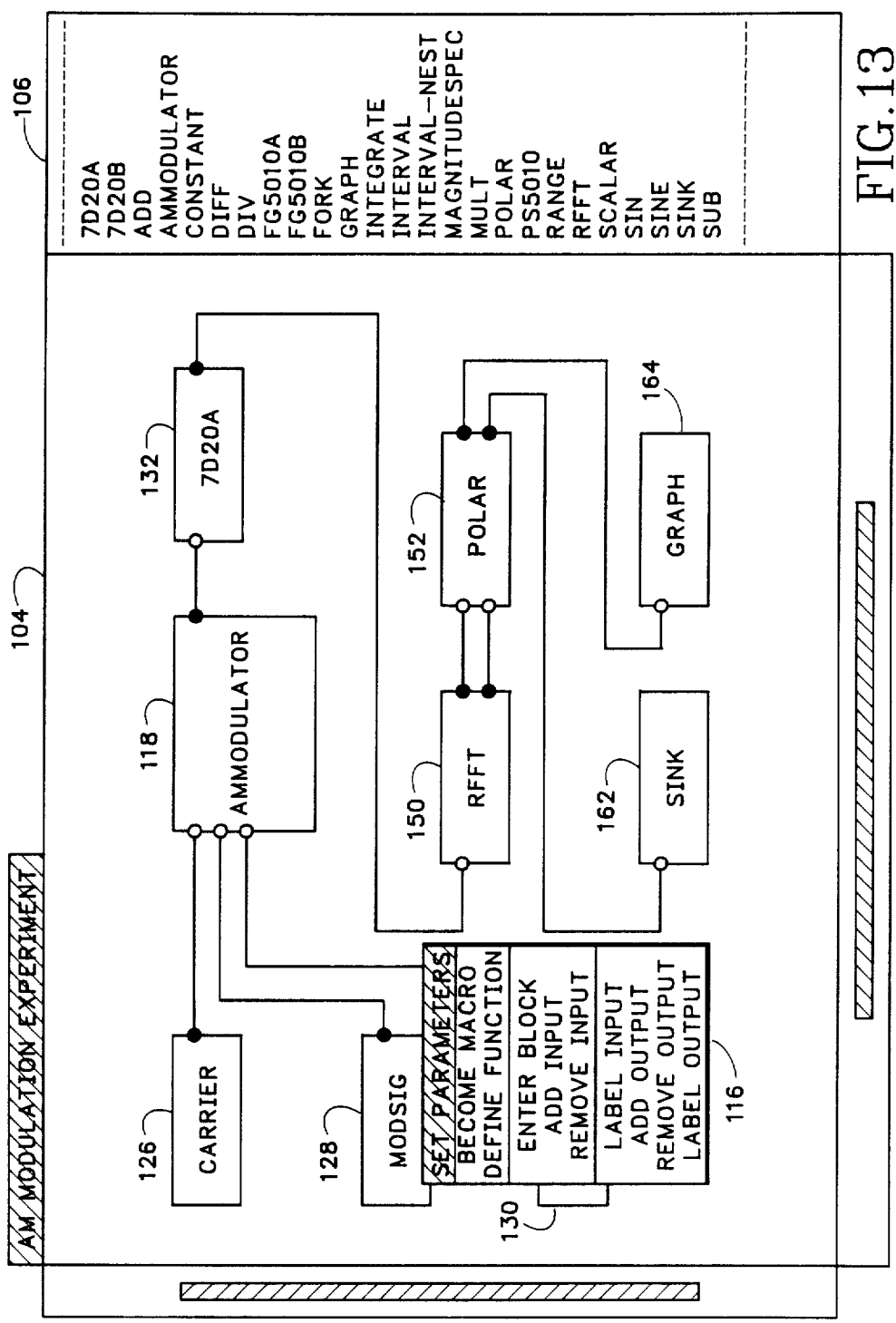
FIGS. 13 and 14 show the screen of FIG. 12 during operation of the system to set parameters for a selected generator block in the block diagram.

The second form of menu is a block menu 116, as shown in FIG. 13. The block menu is brought up by pressing the yellow mouse button with cursor 114 (FIG. 8) inside a block.

The third form of menu is a macro menu, which is brought up by pressing the yellow mouse button with cursor 114 inside a macro block. It has one menu item: enter macro.

The resource list pane 106 contains a list of available functions, which is stored in resource list memory 83 (FIG. 3). A function is selected from this list by placing the cursor on the function name and pressing the red mouse button The resource list pane has one yellow button menu with one menu item: remove entry. The "remove entry" operation deletes the selected function from the resource list pane and deletes the software associated with that function from the system.

2.2.3 Constructing Block Diagrams

Figure 8:
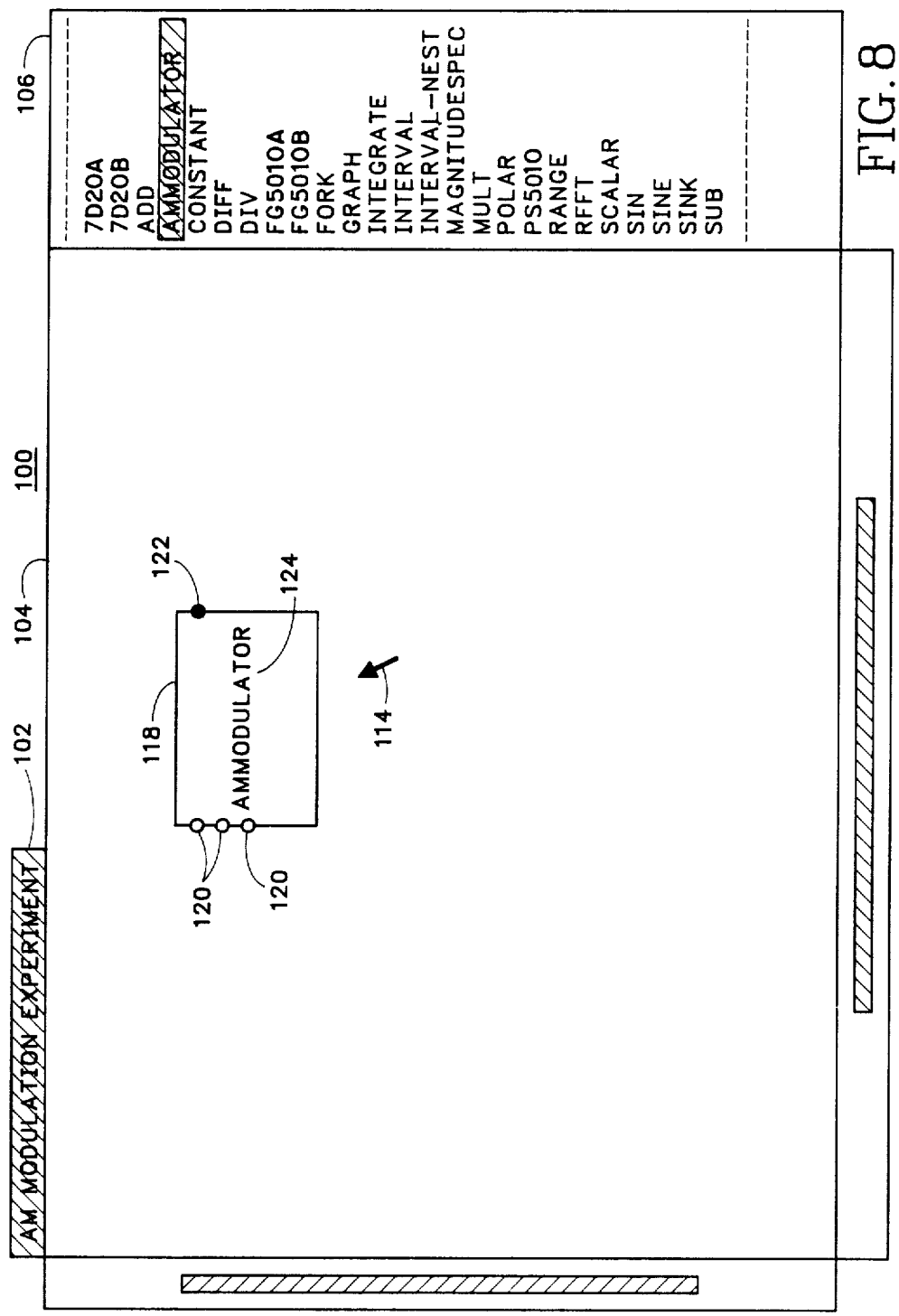

A block or macro is added to a block diagram in editor pane 104 by selecting its name from the resource list in pane 106. In FIG. 6, the "amModulator" function 116 has been selected. After selecting, the user moves the cursor into the editor pane and the cursor will change to represent the selected function as a block 118, as shown in FIG. 7. To place the block, the user moves it to a desired location by moving the mouse and positions the block by pressing the red mouse button. As shown in FIG. 8, the cursor will change back to the normal cursor, in the form of an arrow 114, and the block will be fixed in position on the editor pane. Small circles 120 on the left side of block 118 indicate input terminals and a small circular spot 122 on the right side of the block indicates an output terminal.

A block label 124 appears in the block 118. Initially, the block label is identical to the function name for the function selected from resource pane 106. Block labels must be unique so the block diagram editor software will attach an asterisk to the block label of a selected function if another block bearing the same label has already been positioned in editor pane 104. The user can, however, change the label of a block.

Referring to FIG. 9, the user can continue to build up a block diagram by selecting functions from resource pane 106 and positioning each selected function as a block in editor pane 104. In the same manner that the user selected and positioned block 118, the user can select and position blocks representing two function generators 126, 128, a power supply 130 and a data acquisition device 132. Comparing FIG. 9 and FIG. 5, it can be seen that the block diagram contains functional blocks corresponding to the test instruments 68, 70, 72 and 74 connected to the device under test 76 in instrumentation system 52.

Figure 10:
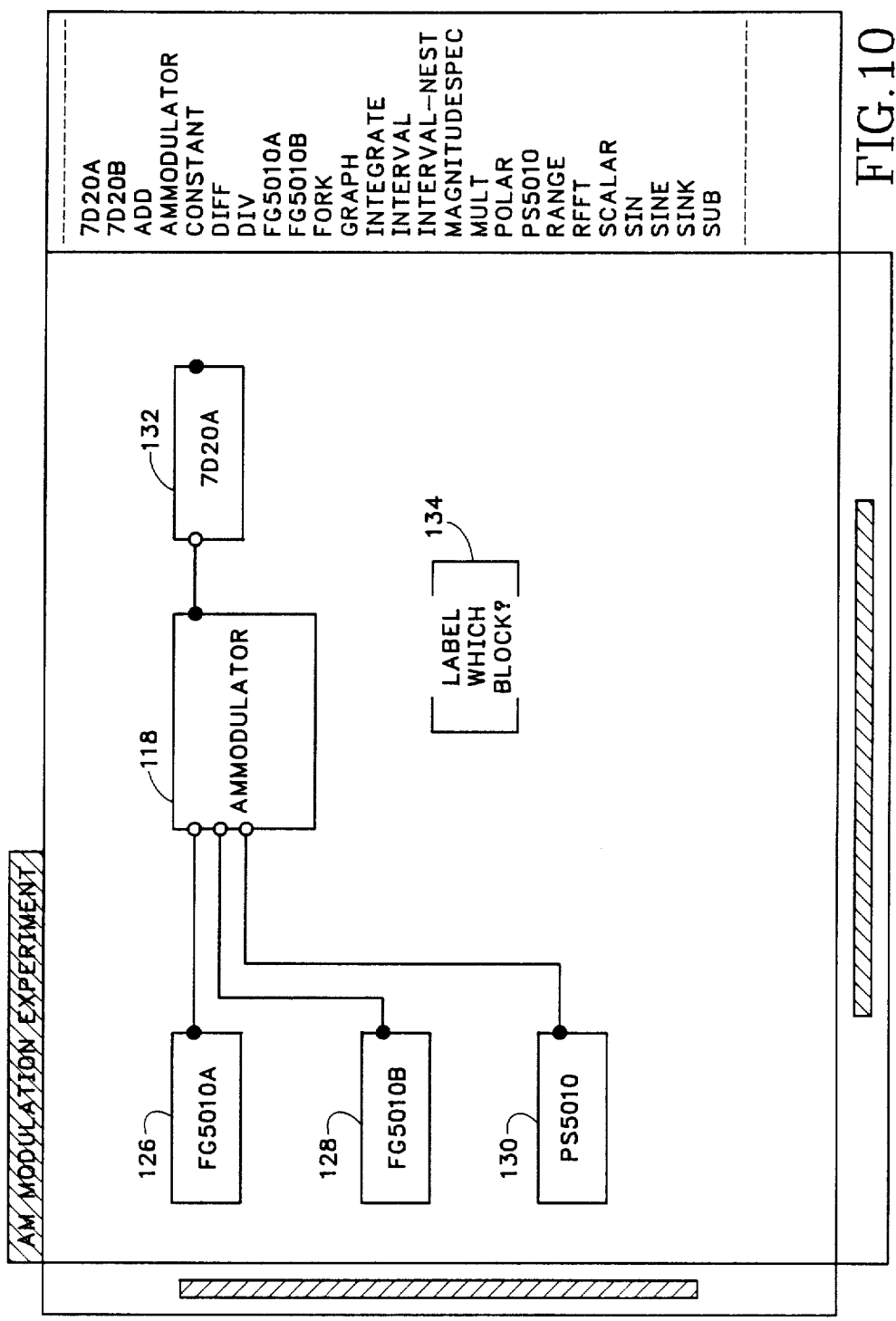

To make the block diagram descriptive of the function that it is performing, the user can modify the names of the blocks. To do so, the user invokes the BlockEditor menu 112 and selects the item "label block" shown in the menu. Referring to FIG. 10, the display provides a cursor 134 to the user: Label which block? The user positions the cursor on the block that is desired to be renamed and presses the yellow mouse button.

Figure 11:
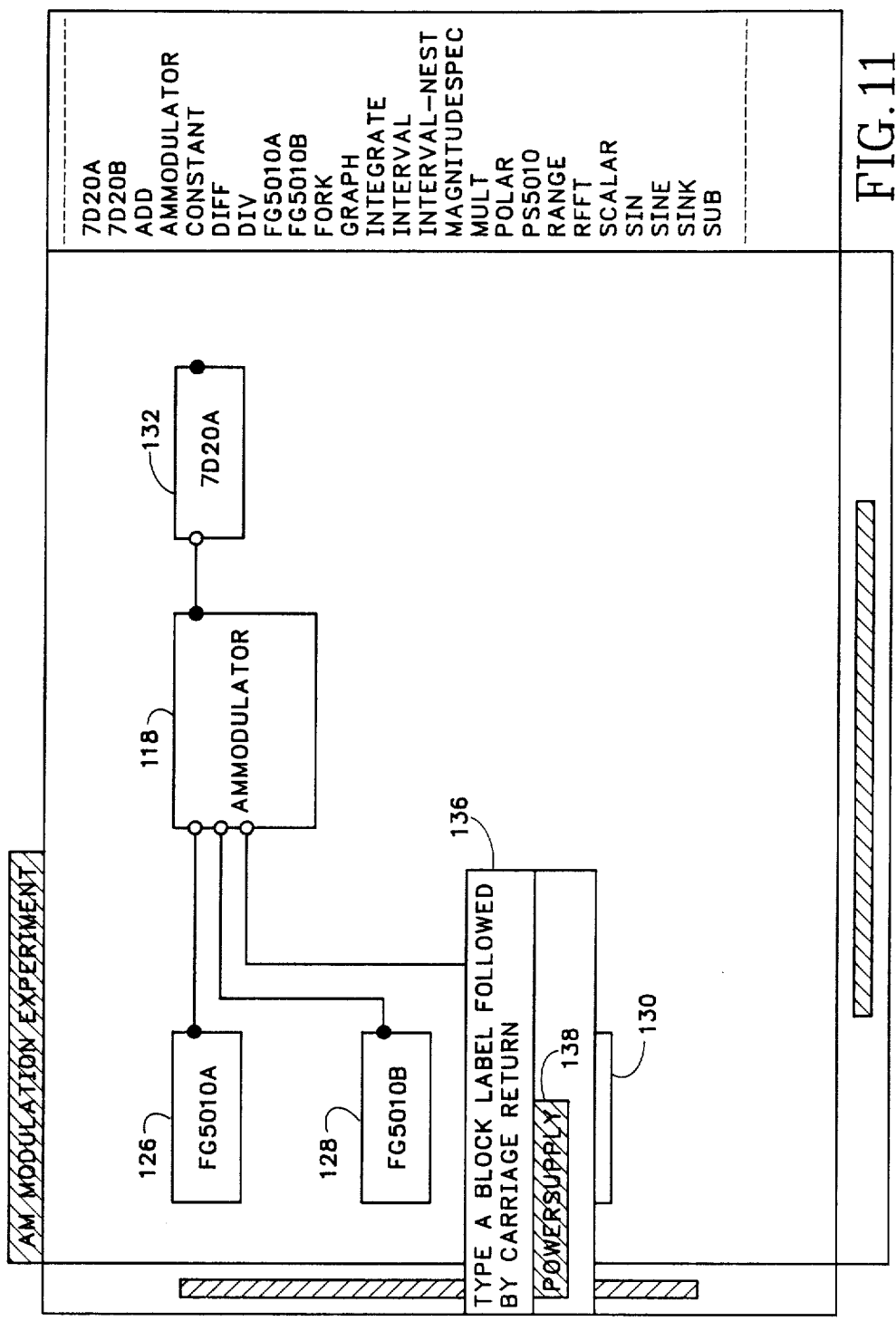
Figure 12:
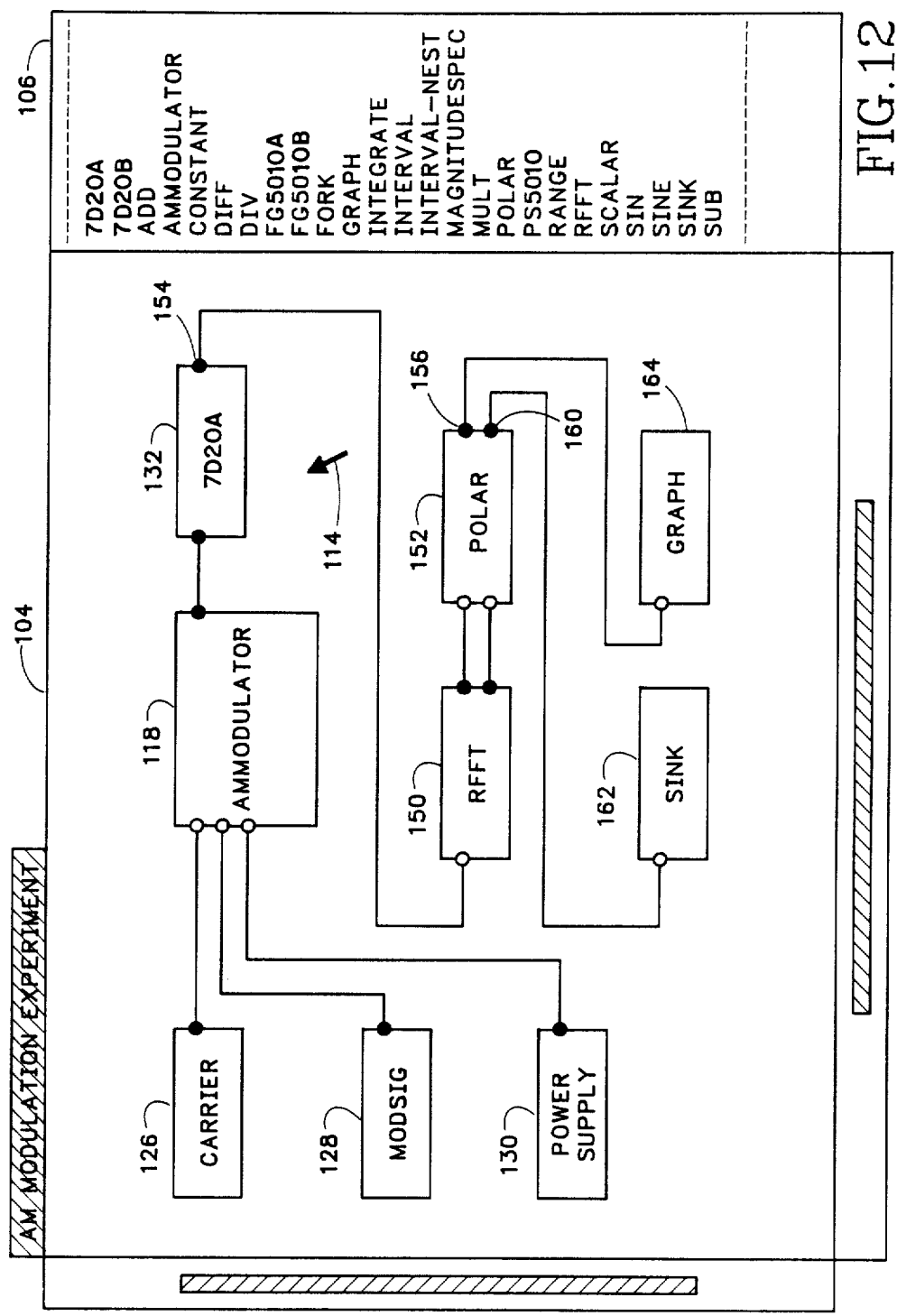
FIG. 12 illustrates the further steps of adding blocks to the block diagram of FIG. 11 for analyzing and displaying signal data returned by the digitizer from the device under test.

Referring to FIG. 11, block 130 has been selected. This action causes a prompt to appear over the selected block, requesting the user to type in a new block label. As it is typed in, the new label 138 appears in prompt 136. When the user presses the yellow mouse button, the new label is inserted in the selected block. FIG. 12 shows blocks 126, 128, 130 all relabeled using this procedure. The same name must not be duplicated in any other blocks in a block diagram because these names are later used in the netlist that is used to execute the diagram (see APPENDIX D).

Returning to FIG. 9, before a diagram can be executed, all of the inputs and outputs must be connected. To connect an output to an input, the user moves the cursor to an output of a block, for example, output 122 of block 118, and presses the red mouse button. The user then moves the cursor away from the output and the BlockEditor software displays a line extending from the output to the current cursor position. To complete a connection, the user points the cursor to an input, such as input 140 of block 132, and depresses the red mouse button. A connection 142 is then drawn between output terminal 122 and input 140. Connections are drawn in like manner between the output terminals 146 of blocks 126, 128, 130 and the input terminals 120 of block 118. To facilitate routing of connectors 144, the user can choose to put points 148 in the interconnection lines to produce an interconnection routing with only horizontal and vertical lines and to avoid other blocks. This is done by pressing the red mouse button at each location where direction of the interconnection line is to change.

The user can also modify connections that have been made. To select a connection, the user moves the cursor to one of the connection points, either an end point or one of points where directions changes, and press the red mouse button. To select an end point, the user places the cursor in the center of the input or output terminal. The connection will highlight, indicating successful selection. To move a connection point, the user moves the cursor to that point and presses the red button. The line or lines connecting to that point will "rubber band" and the user moves the point to its new location and releases the red button. End points of interconnection lines can be moved to any unused input or output. To delete a connection, the user moves any of the connection points outside of the BlockEditor pane 104. To reroute a connection, the user deletes the connection and redraws it. A selected connection may be deselected either clicking the red mouse button on it again or by selecting something else in the diagram.

The user can also select and either move or delete a block that is already on the diagram. The user does this by positioning the cursor within the block and pressing the red mouse button. The block will highlight, indicating selection. To move a selected block, the user moves the cursor to that block, presses the red mouse button, drags the block to a new location, and releases the red button. To delete a block, the user selects it and drags it outside of the editing pane and releases the red button. To add a block to the resource list, the user drags the block into the resource list pane 106 and releases the red button. If the block's name is not already there, it will be added to the resource list.

Referring to FIG. 12, additional blocks can be added to the block diagram as needed for a particular experiment. For example, signal analysis blocks 150, 152 are connected in series to an output terminal 154 of signal acquisition block 132. Connected to one output terminal 156 of block 152 is a "graph" block 164. Connected to the other output terminal 160 of block 152 is a "sink" block 162. Blocks 150, 152 perform signal analyses on the signal output from block 132 at terminal 154. The names of these blocks are stored in the resource list pane 106 and the BlockEditor software includes subroutines, selectable by selecting the associated function name and block, for performing the function indicated by the function name. Block 164, also selected from the list in pane 106, invokes a graphing function for graphically displaying the signal that is output on terminal 156 from block 152. Block 162, "sink," is also listed in pane 106 and enables the user to disregard data from output terminal 160 of block 152.

2.2.4 Setting Initial Block Parameters

Figure 14:
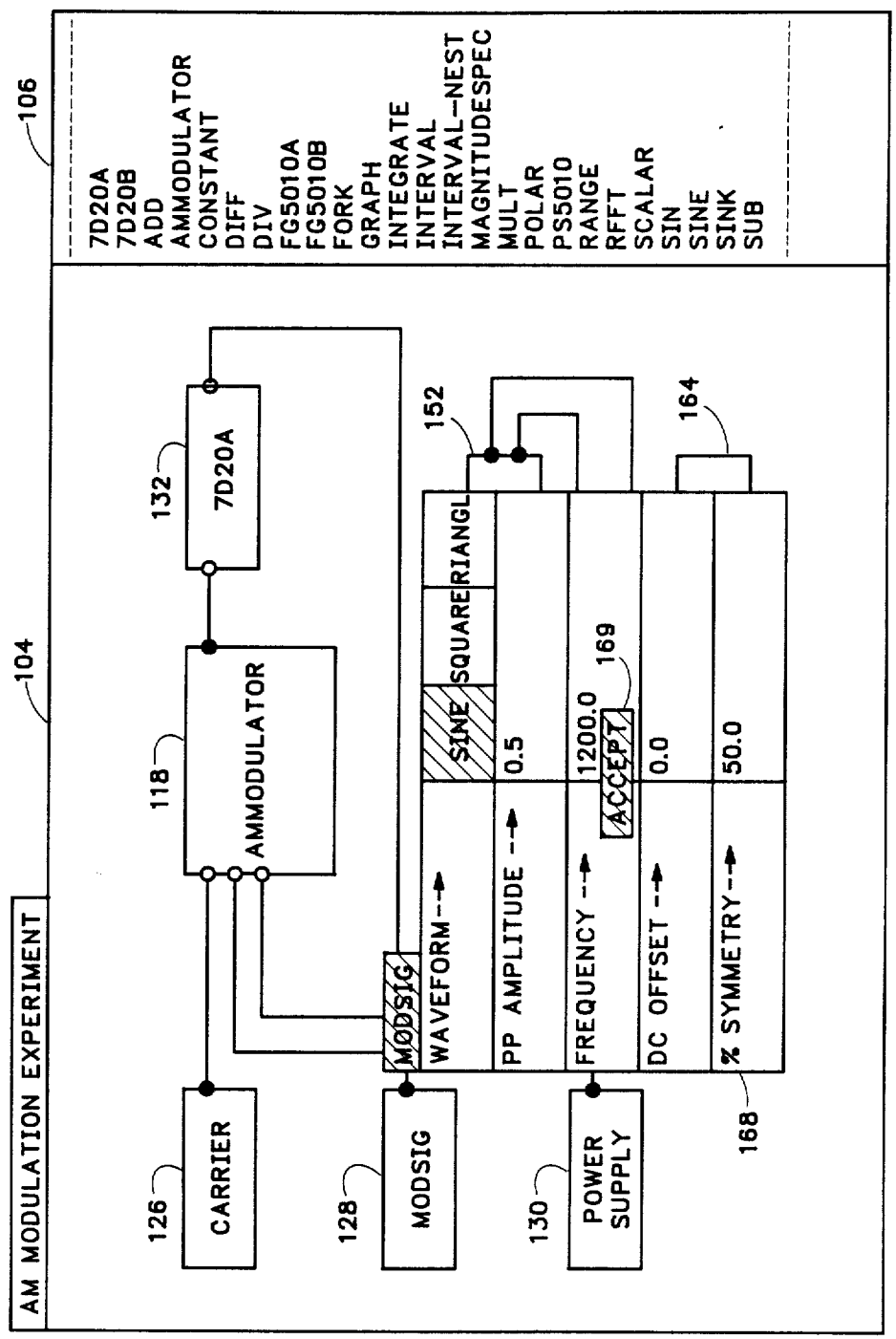

Referring to FIG. 13, some blocks have initial or default parameters for the user to set. The user does this by moving the cursor into a block whose parameters are to be set, invokes the block menu 116, and selects "set parameters" from the menu. If the block has no parameters, the cursor will remain a normal, arrow cursor. If the block has parameters, the cursor will change to a "wait" cursor, followed shortly by a prompt to locate a parameter view. In FIG. 13, the user has selected block 128, which represents and controls the function generator 70 in FIG. 5. A parameter view or menu 168 for the selected block then appears, as shown in FIG. 14.

The parameter view is divided into left and right sides. The panes on the left side define the parameters of the particular block. The panes on the right side of the view are used to specify the settings of the parameters for the function associated with the selected block. In some cases, the parameter can be expressed as a series of buttons, as in the case of the "waveform" parameter in menu 168. The user can select one of the choices, e.g., "sine", by placing the cursor over it and depressing the red mouse button. If the parameter is not specified by buttons, the user moves the cursor into the right side pane and types in a number to specify the requested parameter. Once the parameters have been input, the user accepts the parameters by selecting "accept" 169 from the BlockEditor menu invoked by pressing the yellow (middle) mouse button while the cursor is still in the parameter view.

Figure 15:
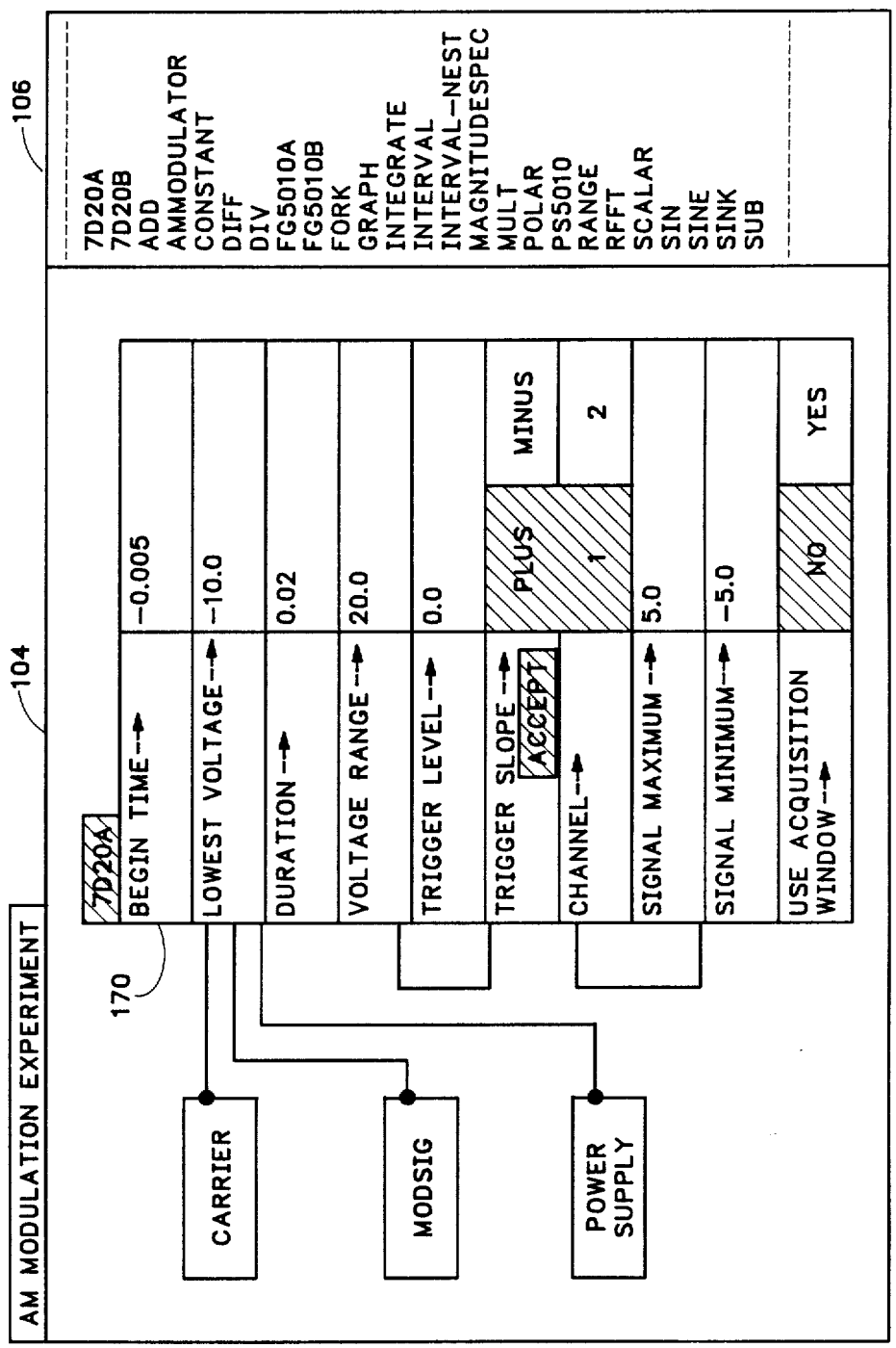
FIG. 15 shows the step of setting initial or default parameters for the digitizer.

FIG. 15 shows the foregoing parameter-setting procedure as applied to digitizer 74, represented in the diagram as block 132. The operation of digitizer 74 is initially controlled by default parameters programmed into the associated block 132 when initially constructed. These parameters can be reset in the same manner as for generator blocks 126, 128, 130. Referring to FIG. 15, selecting the "set parameters" item brings up the parameters pane 170 for block 132. The format of this pane is similar to parameter pane 168 (FIG. 14), previously described. The user can select the various buttons shown on the pane and input the numerical parameters desired to specify initial or default operation of digitizer 76. The values shown are exemplary default or initial settings that can subsequently be modified interactively by the user during execution of the diagram. To interactively modify these default parameters, the user selects "no" after the query "Use acquisition window."

2.2.5 Executing a Block Diagram

Once assembled, the block diagram can be executed. To execute a block diagram, the use selects "execute diagram" from the BlockEditor menu 112, as shown in FIG. 16. If all of the inputs and outputs are connected, the diagram will execute; otherwise, an error notification will appear. If that happens, the user can press the red mouse button to proceed with connecting any unconnected outputs.

There will be a short pause after selecting "execute diagram" and then each block will "reverse video" as the processor executes the associated functions in the software. Some blocks prompt the user to specify a location to display an output set of signal data. After a location is specified, execution of the block diagram continues. If the diagram is reexecuted, and the data display windows are still present, the new data will be automatically routed to those windows.

Figure 16A:
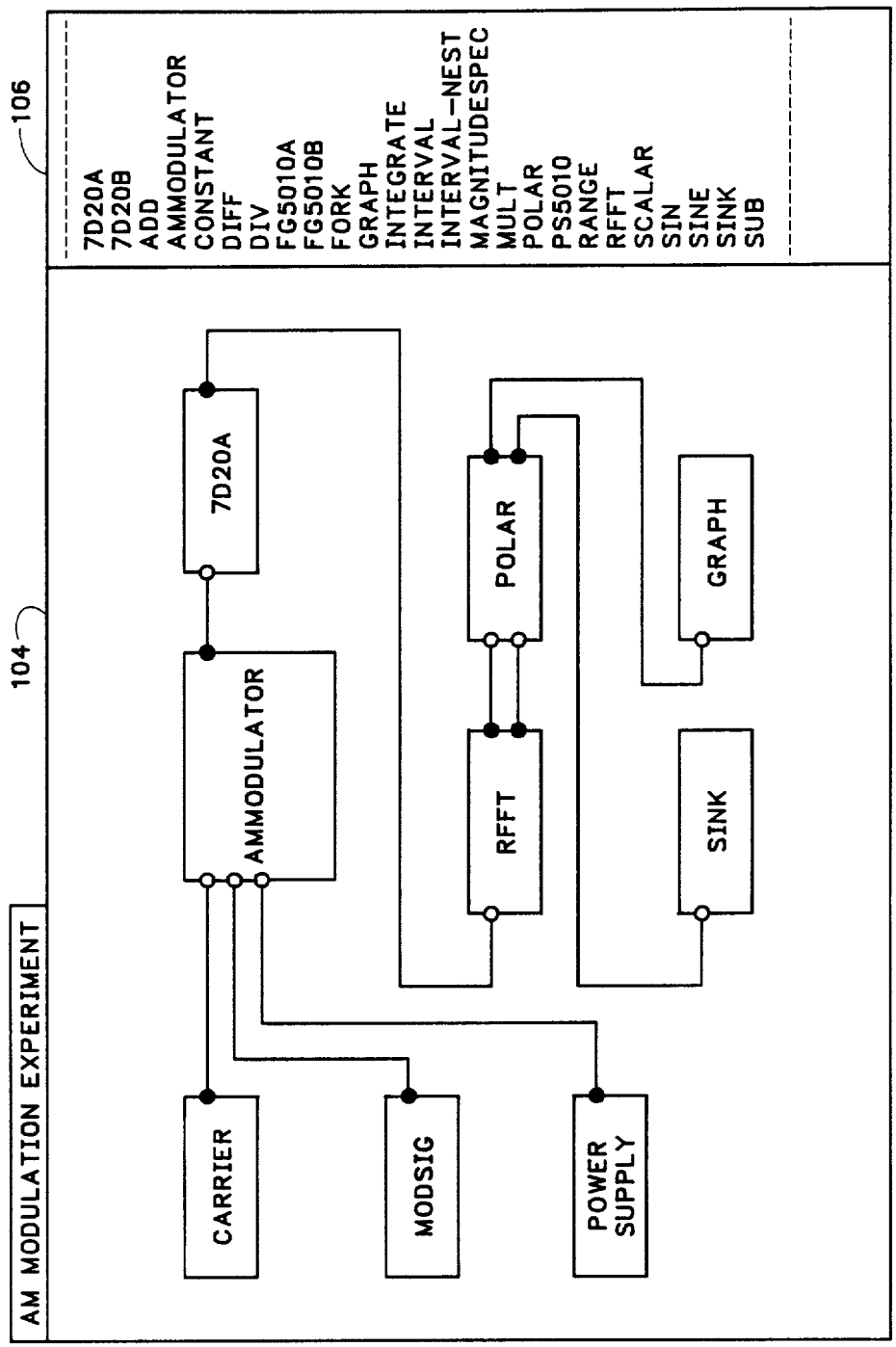
FIG. 16a shows the screen after partial execution of the block diagram, with a graphical display of a waveform output from the digitizer under the initial settings of FIG. 15.
Figure 16A:
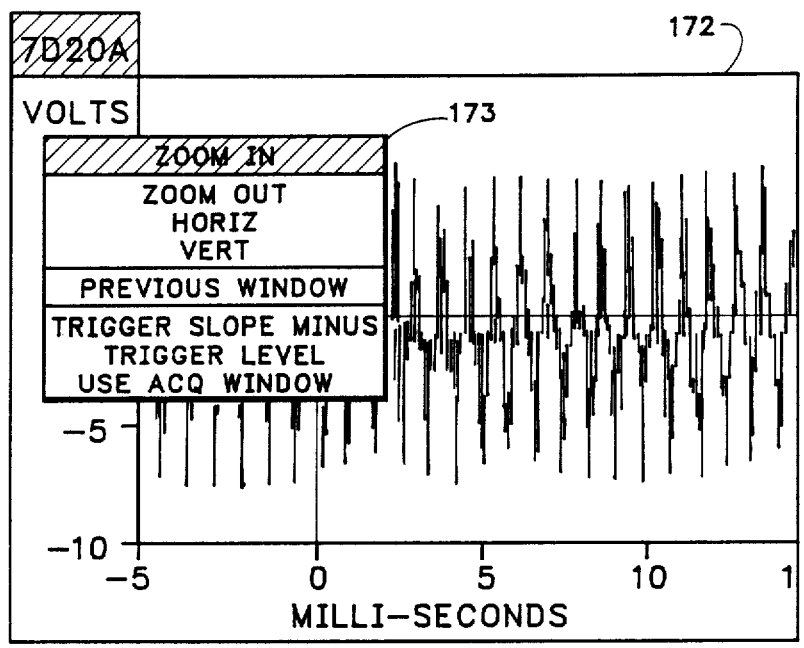

FIG. 16a shows an example of the windows appearing on display 56 after partial execution of the block diagram of FIG. 16. Window 172 displays a waveform output from digitizer 74 to computer system 50. The signal viewing menu 174 can be invoked at this point in the operation to enable the user to modify the signal acquisition window of the digitizer.

2.2.6 Modifying Block Parameters

During execution of the diagram, however, the user can modify operation of the digitizer interactively by changing the signal acquisition window thereof on the graphic display 56. FIGS. 16a, 17, 17a, 18 and 19 illustrate this procedure from the user's viewpoint. Section 5.0 describes the internal structure and operation of this capability.

The user selects the desired form of signal viewing control on menu 173 in FIG. 16a. For this example, the user has selected "zoom in." This command invokes a standard Smalltalk-80 routine that prompts the user to designate a rectangle 174 which encompasses a portion of the signal that is of interest to the user. This rectangle can be either smaller or larger than the displayed signal, although its effectiveness is constrained by the capabilities of the instrument being controlled, as discussed in Section 5.0.

Figure 17:
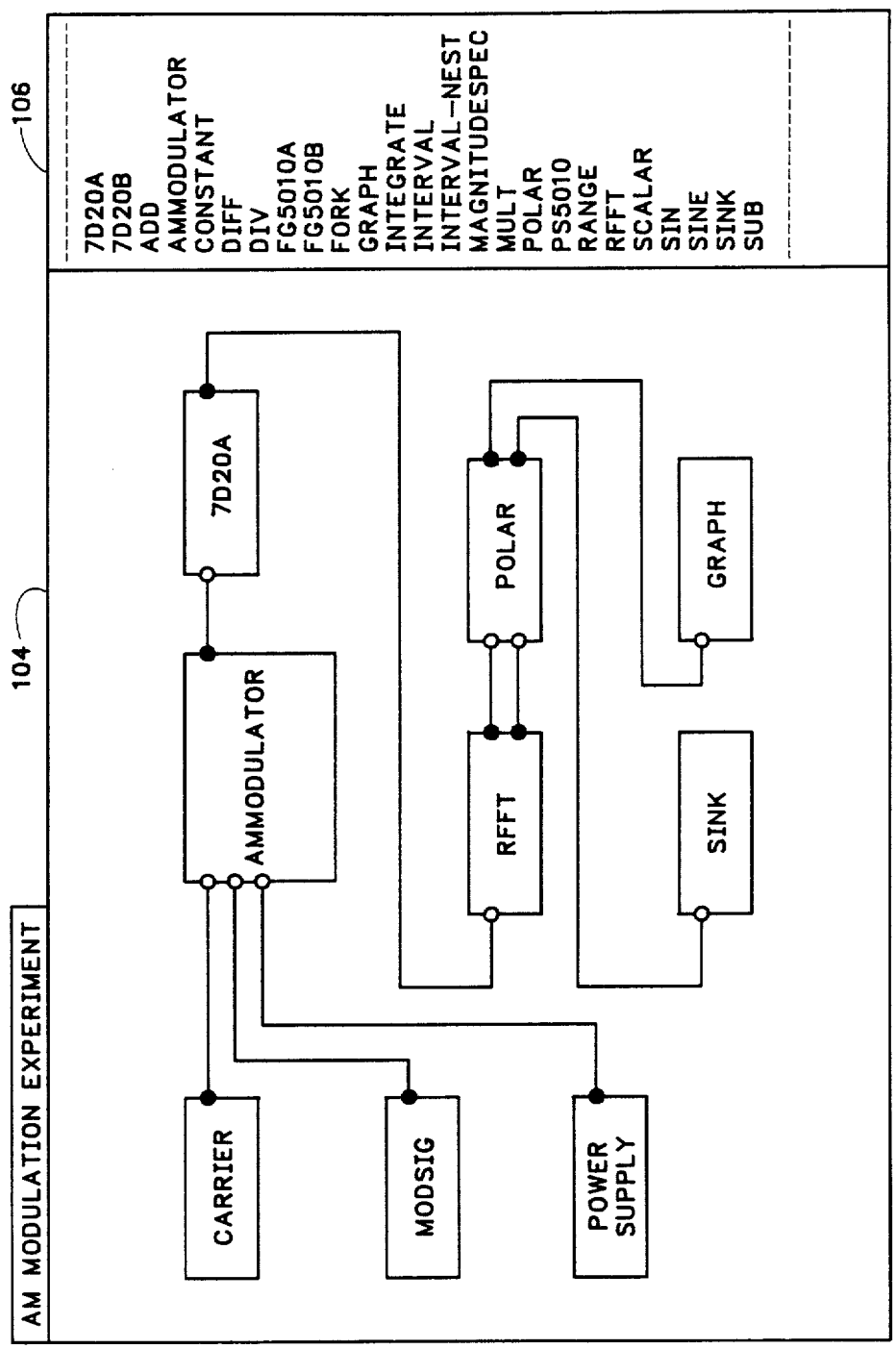
FIG. 17 shows how the user can modify operation of the digitizer by user-interactive, signal-viewing control of the signal acquisition window.
Figure 17:
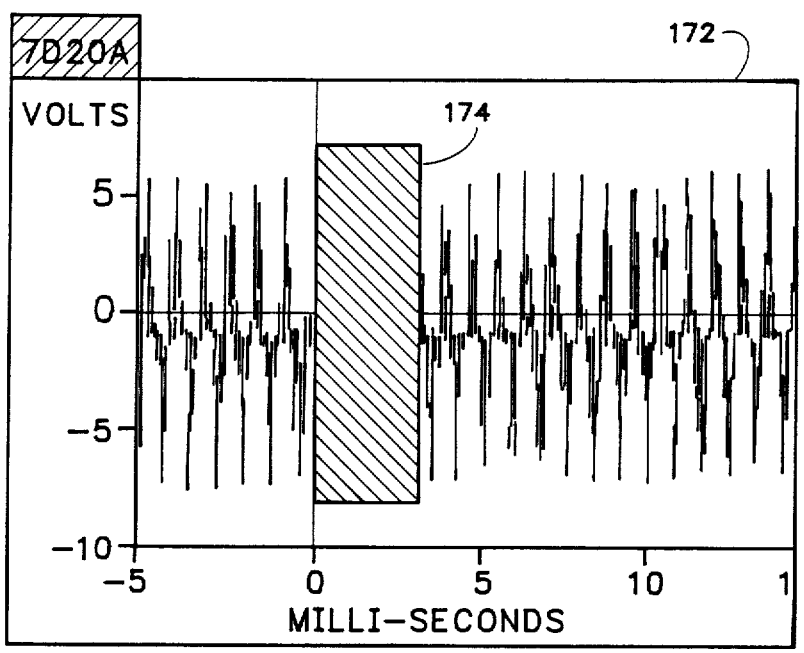

To define this rectangle, as shown in FIG. 17, the system displays an upper left corner symbol (not shown), which the user positions by depressing and holding down the mouse pointer button. Then the user moves the mouse pointer to position the lower right corner of rectangle 174, and then releases the button. The designated area is stored, as a variable screenRect, which is then processed, as described in Section 5.0, to establish a new signal acquisition window corresponding to rectangle 174.

Figure 17A:
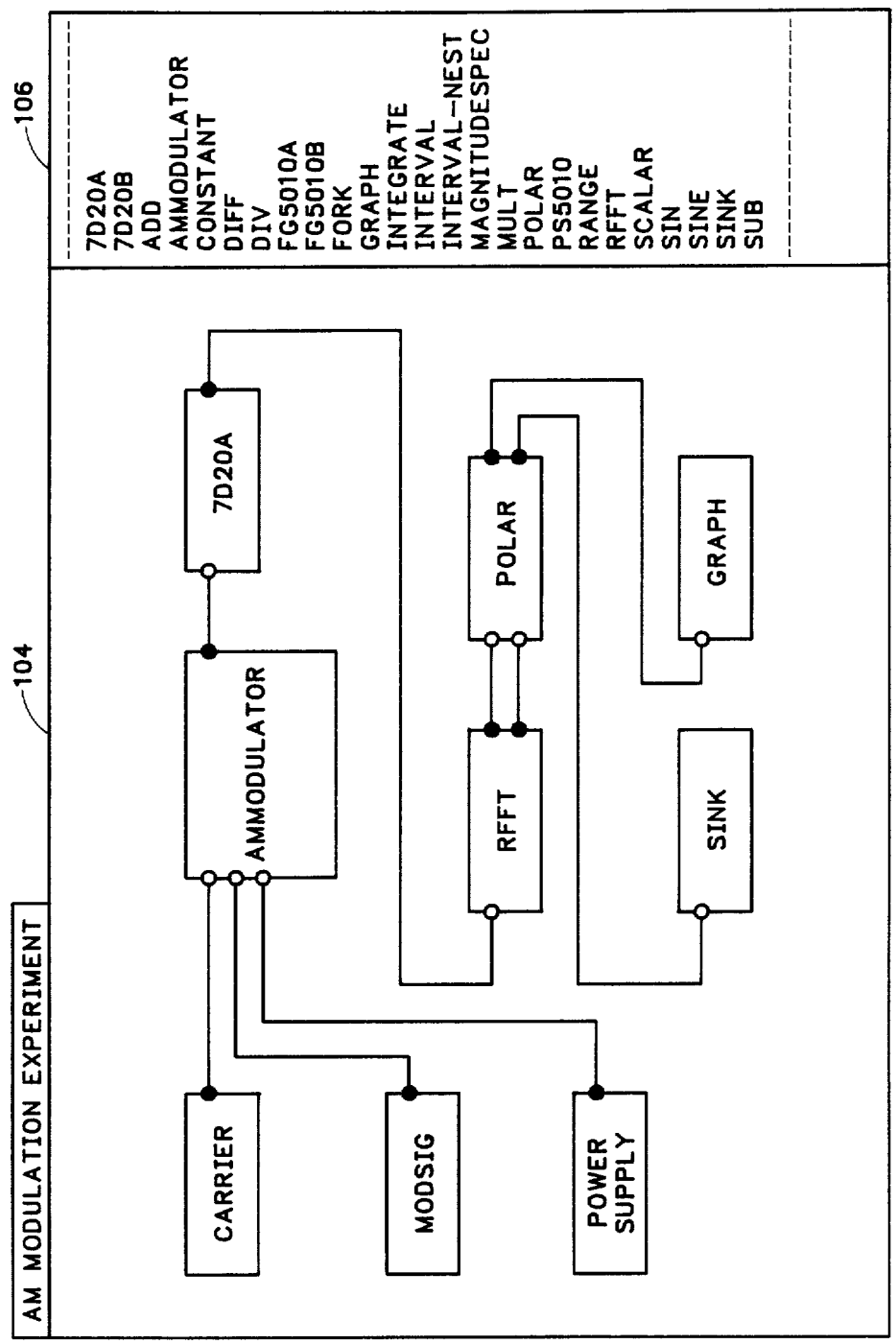
FIG. 17a shows the screen after partial re-execution of the block diagram using the digitizer settings modified in FIG. 17.
Figure 17A:
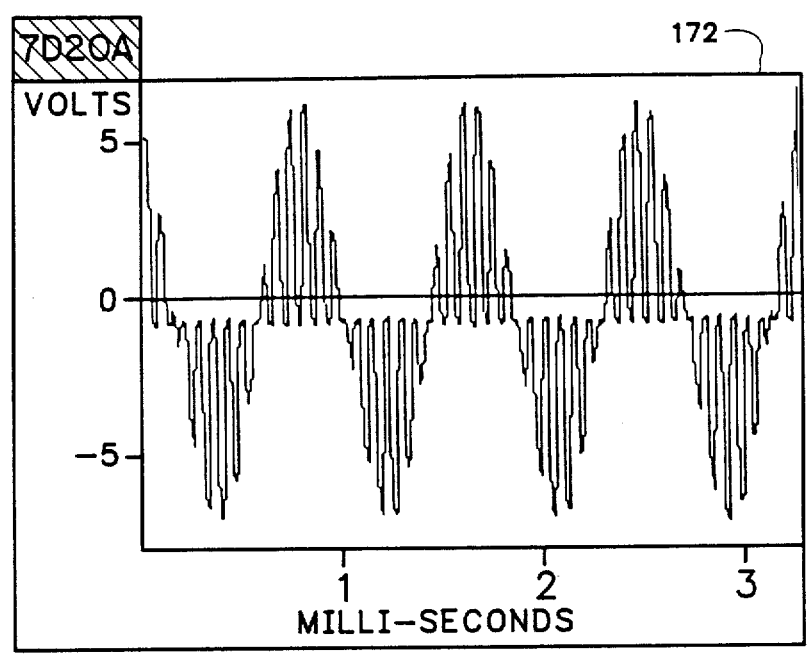

FIG. 17a shows the windows after partial re-execution of the block diagram using the new signal acquisition window specified by rectangle 174. A new waveform is displayed in window 172. It corresponds to the waveform shown in FIG. 16a but is based on newly acquired data, not merely an expansion of reformated, stored data from the prior execution.

Figure 18:
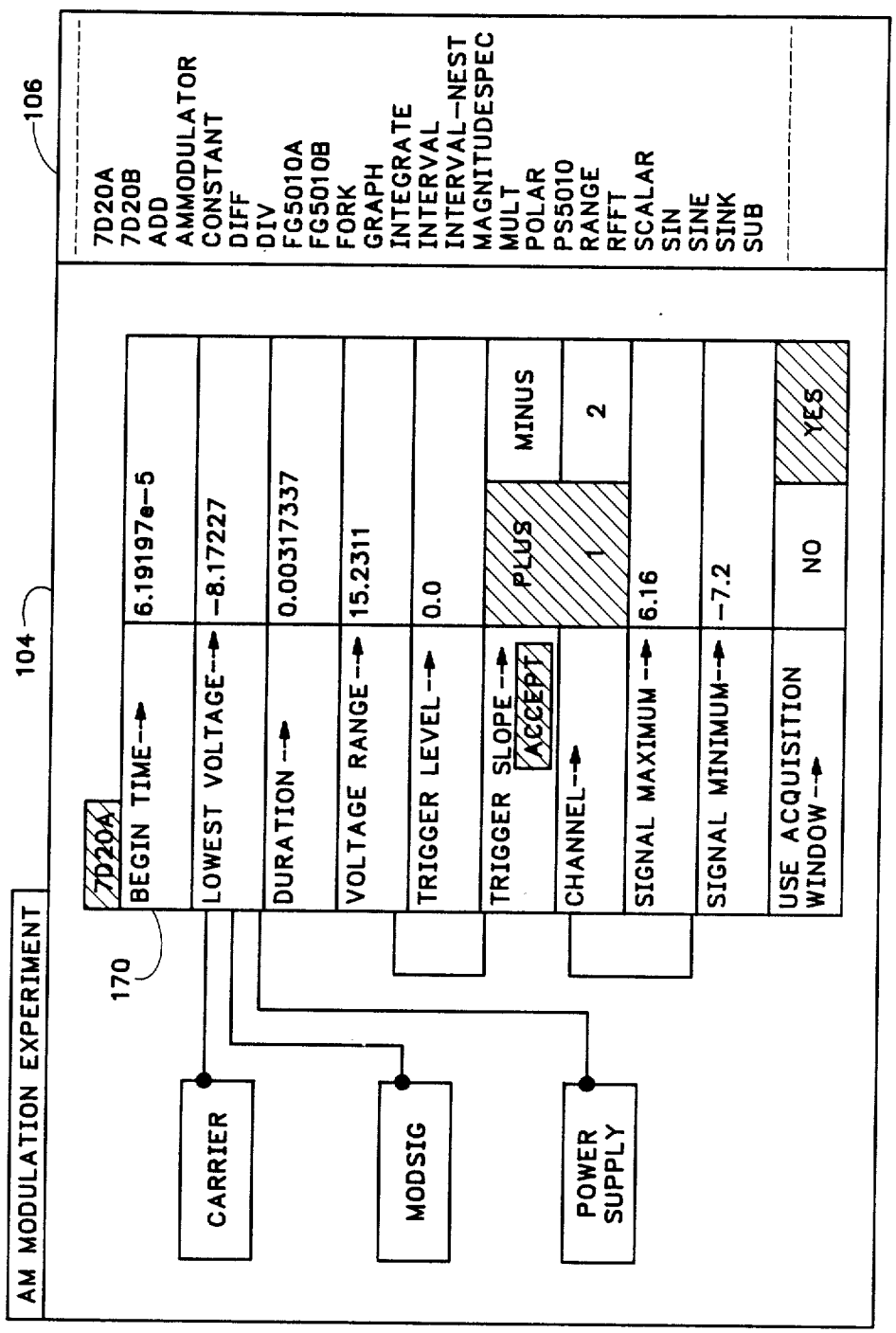
FIG. 18 shows the step of modifying the digitizer default settings to conform to those set in FIG. 17.
Figure 18:
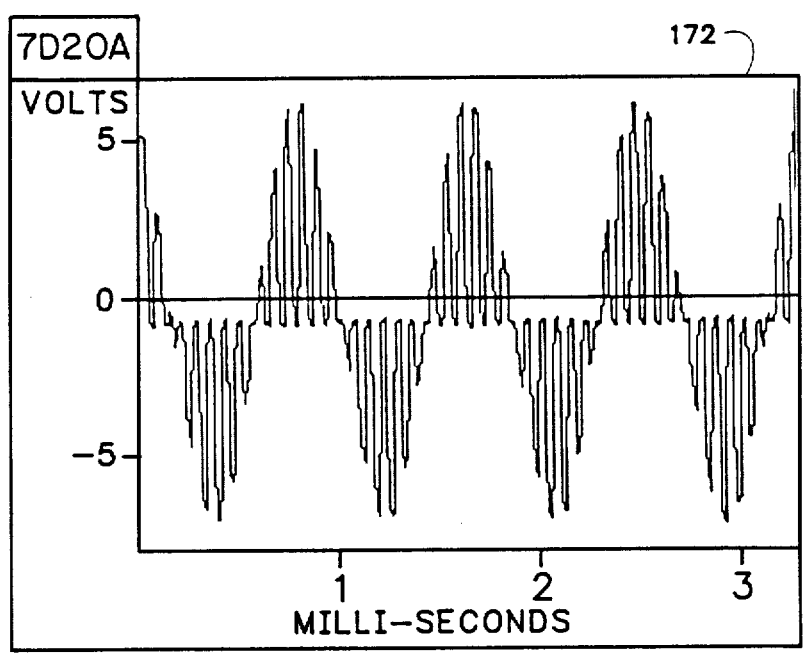

The user decides whether the waveform shows what is desired. If not, the user can again modify the signal acquisition window. Once satisfied, the user can again invoke the parameter view 170 from window 104, as shown in FIG. 18. The values displayed are those derived from the desired acquisition rectangle 174. This time the user selects these values for complete execution of the block diagram by answering "Yes" to the query "Use acquisition window." Alternatively, the user can again invoke menu 173 (FIG. 16a) and select "Use acq window," to perform the same function.

Figure 19:
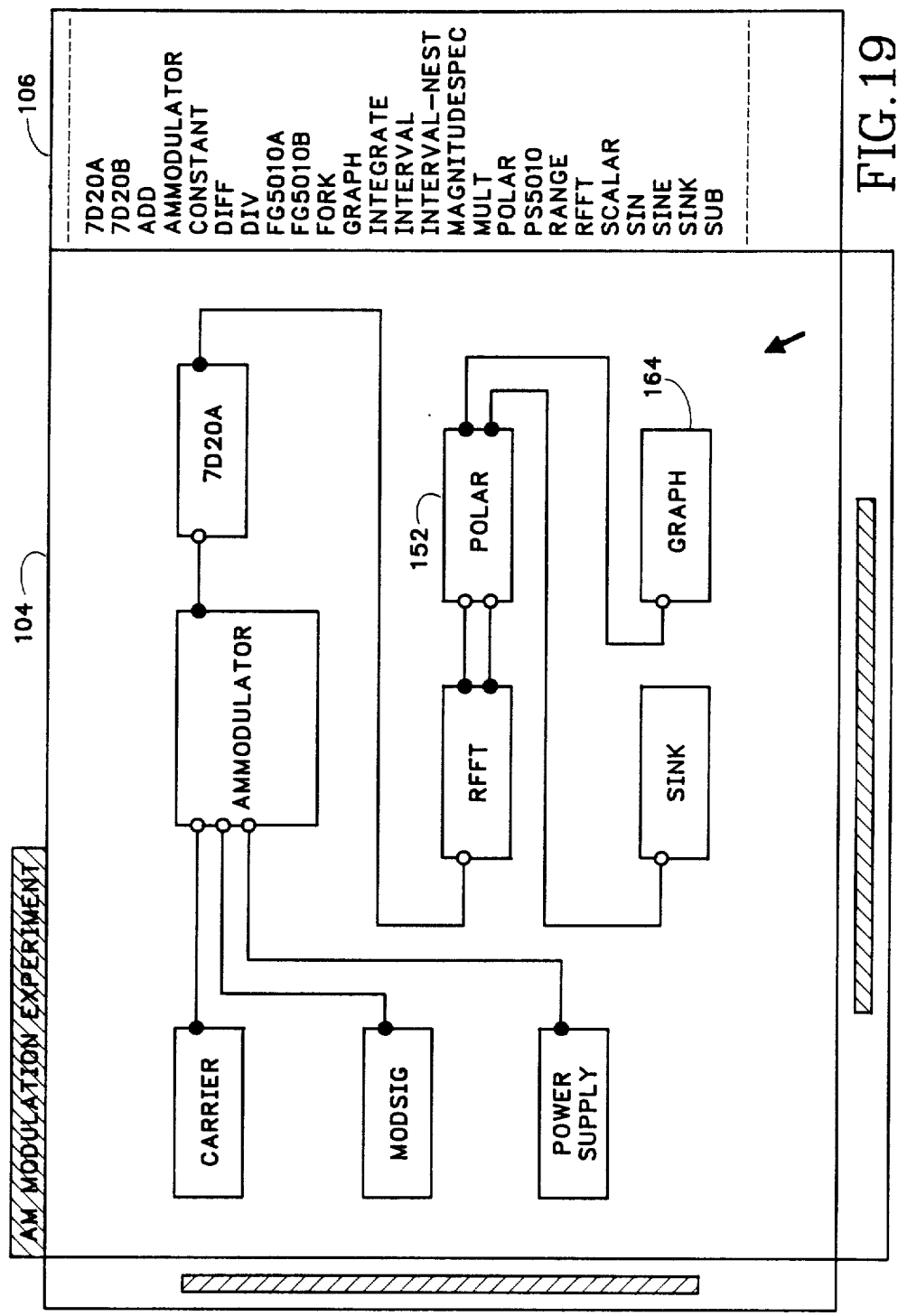
FIG. 19 shows the screen after complete execution of the block diagram, including graphs of the digitizer output waveform and the output of the polar block.

The diagram is then executed completely, with the results being shown in FIG. 19. Window 172 again displays the digitizer output waveform for the desired acquisition rectangle 174. Window 178 displays a graph of the amplitude output of polar analysis block 152, as specified by the connection to graph block 164.

2.2.7 Creating Macros

Figure 20:
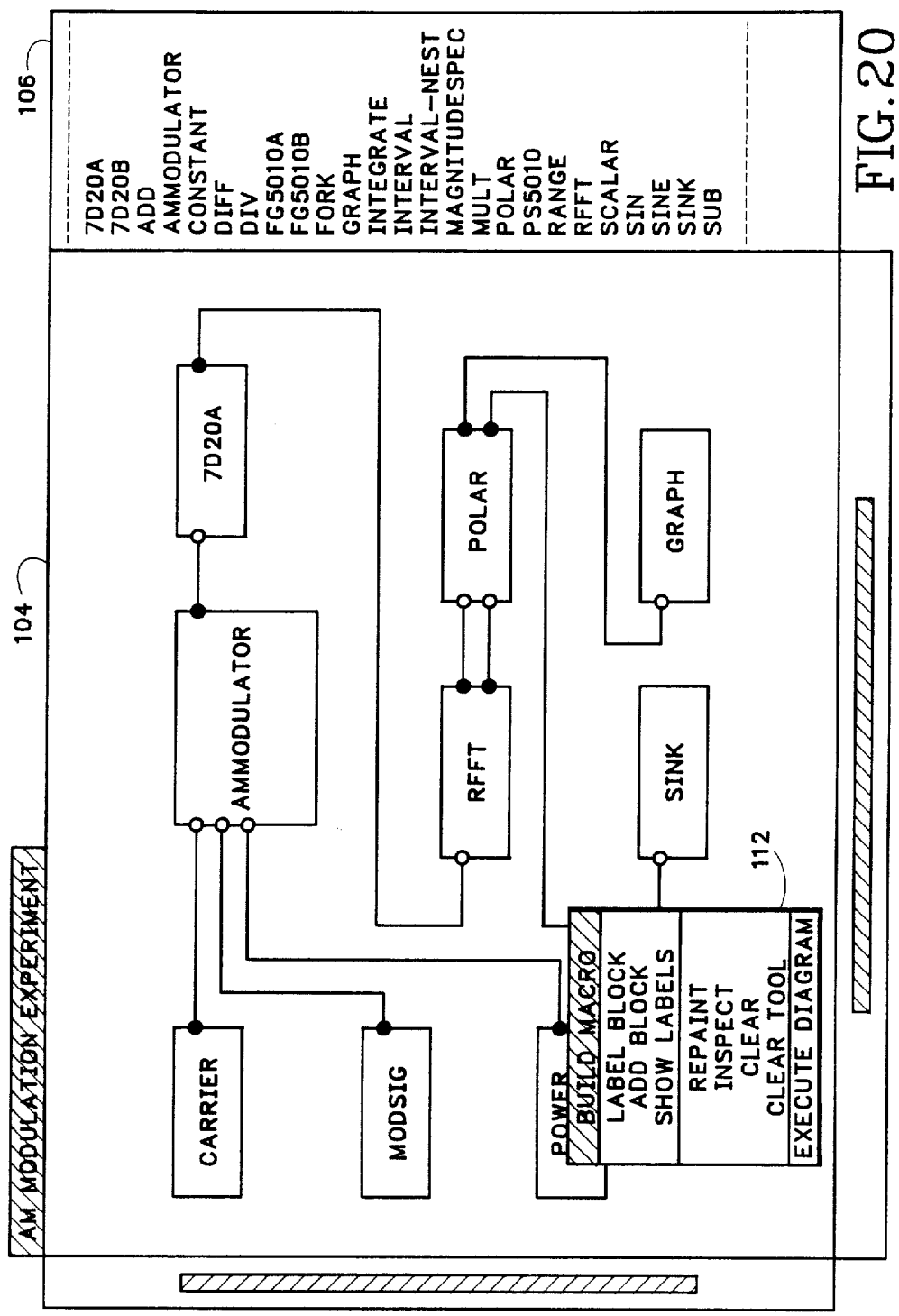
FIGS. 20–23 illustrate the procedure for consolidating a portion of the block diagram of FIG. 12 into a macro block.
Figure 21:
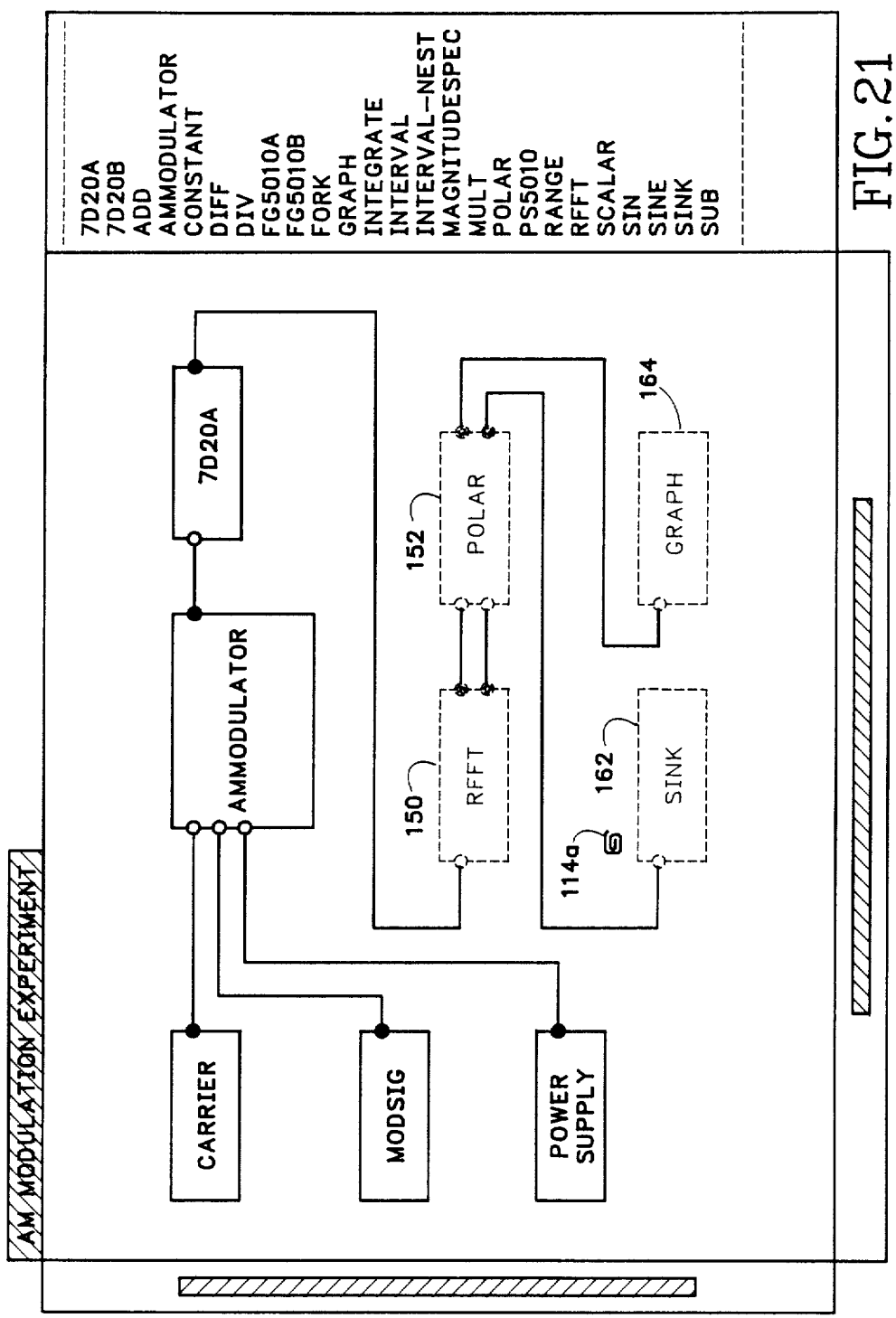

At times it may be desirable to group several blocks together and treat them as if they were one functional block. This is accomplished by using the "build macro" menu function, as shown in FIG. 20. All the functions that are intended to be included in the macro must appear in the editor pane 104 and must be appropriately connected. The user positions the cursor in the editor pane and selects "build macro" from the BlockEditor menu 112. The cursor changes from an arrow a swirl 114a, as shown in FIG. 21. The user then locates the cursor on each block and presses the red button once to include that block in the macro. The blocks will highlight as they are selected.

Figure 22:
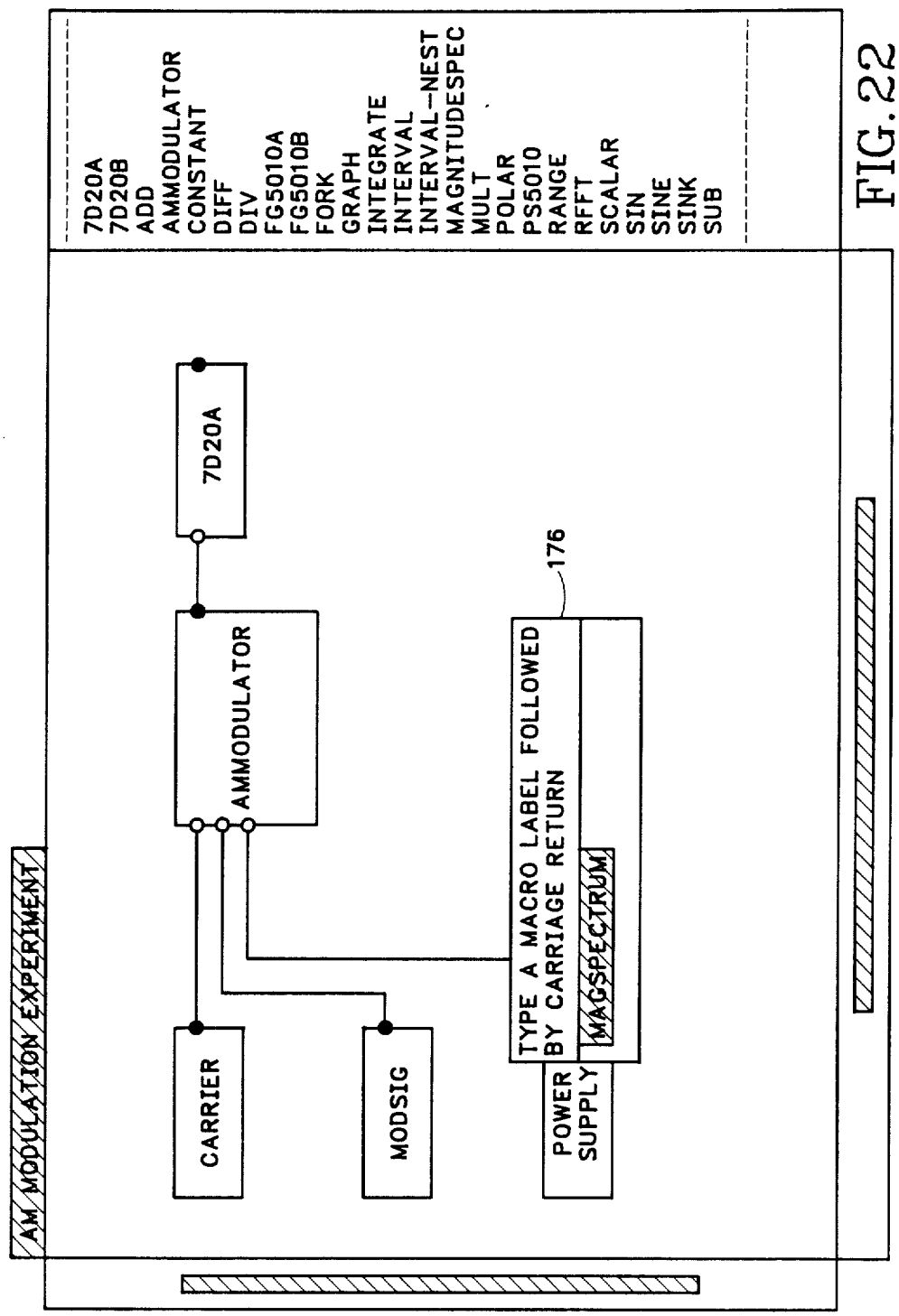
Figure 23:
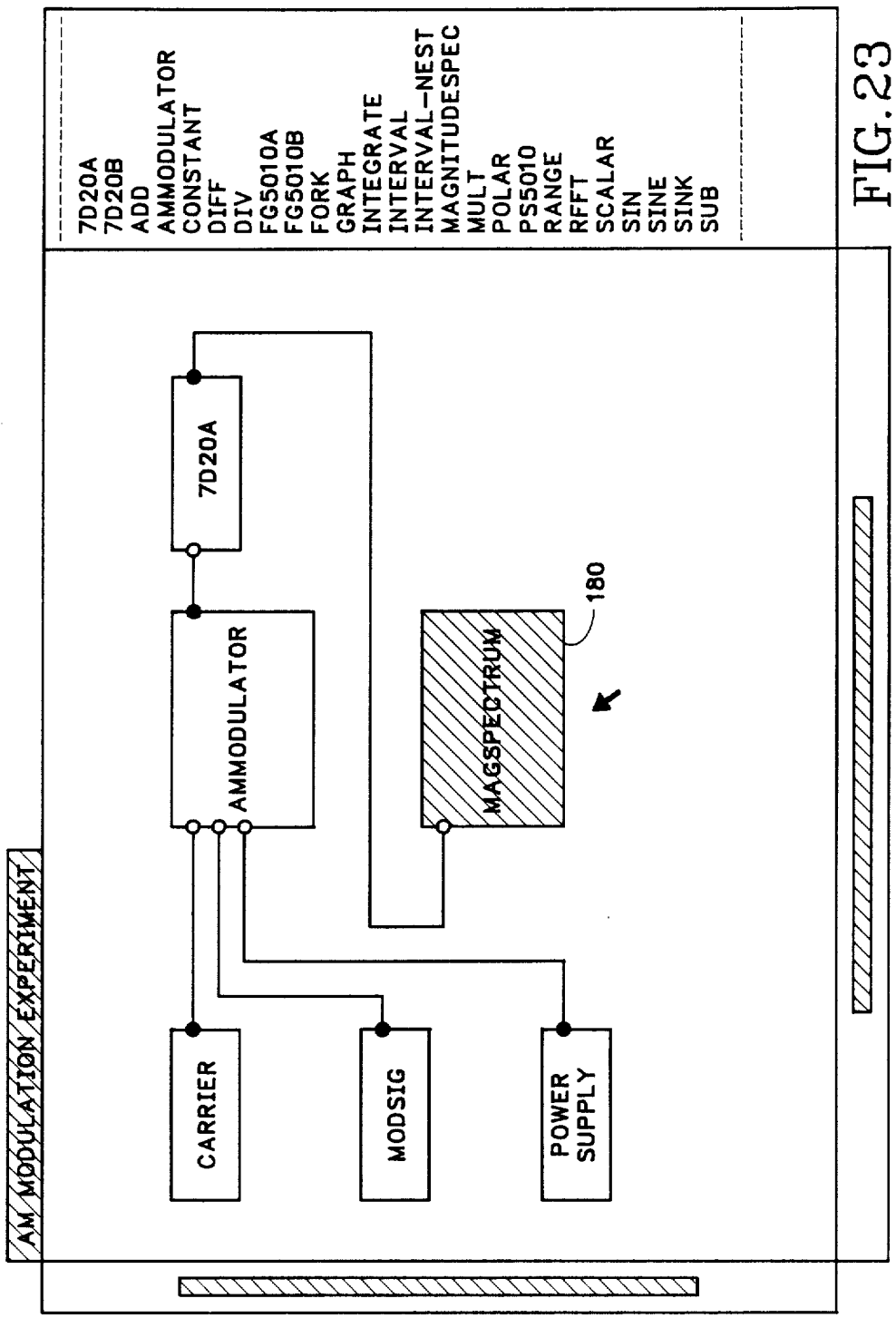

Once all blocks to be included in the macro have been selected, the user moves the cursor to an open area of the editor pane and presses the red button twice. The highlighted blocks and associated connections are then erased from the display screen, as shown in FIG. 22, and the user is prompted to type a name into box 176. A unique name must be applied to the macro to distinguish from the names of other blocks already in use. Once a name is provided, the cursor will then change to represent a macro block which can be positioned in the diagram, as shown in FIG. 23. The connections from blocks inside the macro to blocks outside the macro will then be redrawn.

In FIG. 21, the user has selected blocks 150, 152, 162, 164 for inclusion in a macro. In FIG. 23, after assignment of a name, the functions of all of these blocks are included in a single block 180, named "magSpectrum." This is the "bottom up" way to create a macro.

Figure 24:
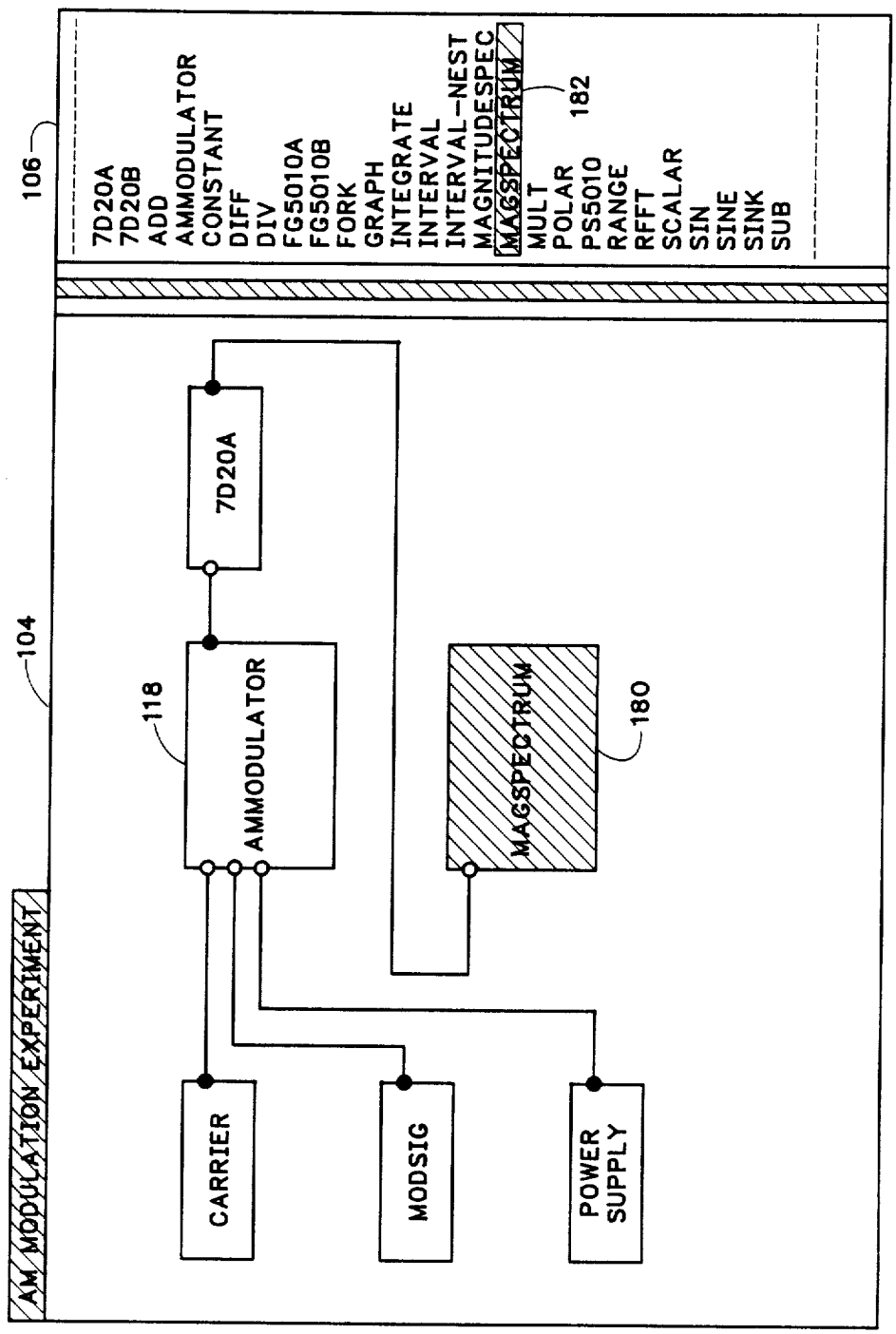
FIG. 24 illustrates the step of adding the macro block to the resource list.

Once created, a macro behaves just like any other block, and can be added to the resource list in pane 106. Referring to FIG. 24, to add a block to the resource list, the user drags it, using the mouse with the red mouse button depressed, into the resource list pane and releases the red mouse button. Since the macro is a newly created block, its name is added as label 182 to the resource list. Block 180 will continue to be displayed at its last location.

There are also two "top down" ways to create a macro. First, a non-defined function named, for example, "empty macro" can be included in the resource list pane 106 for the user to select and position in the editor pane 104. Once it is positioned it should be relabeled to reflect its intended function. Second, if there is no "empty macro" function in pane 106, the user can move the cursor into the editor pane to 104 and select "add block" from the BlockEditor menu 112. The cursor will change to represent an empty block which the user can move to a desired location and position by clicking the red mouse button The block is then labeled to reflect its intended function. The user will be prompted for the block parameters but none are required for macros. The user can position the cursor in the parameter work space, delete everything between parentheses, and select "accept" from the BlockEditor menu. Next, the user selects "become macro" from the block menu 116. The block will then become an empty macro.

2.2.8 Editing Macros

To edit a macro, the user moves the cursor inside the macro and selects "enter macro" from the macro menu. The user is then prompted for a screen location for a new macro expansion BlockEditor view. This view will have the macro's label as its title tab, indicating that a macro is being edited. If the macro is empty, &he editor pane will be empty; otherwise, the blocks that& constitute the macro will be displayed. The diagram's can be edited like a top-level block diagram, with one exception. When the editing session is done, the user selects either "accept" to save the edited macro or "cancel" to delete all changes since the last "accept." The macro expansion BlockEditor view may then be closed.

The user then moves the cursor to the next-higher BlockEditor view (if there are macros within macros, one can be a few levels down), and select "repaint" from the BlockEditor menu 112. Any external changes to the macro, e.g., number of inputs and outputs, will be displayed. Connections will be broken if blocks in the macro to which they were originally connected have been connected to another block or removed. The result of editing a diagram before "repaint" is undefined.

To parameterize blocks in a macro, the user selects "enter macro" in the macro menu. Then, the user parameterizes each of the blocks in the macro independently as previously described, entering "accept" for each set of parameters in turn, and then entering "accept" for the macro as a whole. The macro expansion BlockEditor may then be closed.

2.2.9 Viewing Block Information

Just as a macro includes internal blocks, a block may have some information, such as a textual document or a schematic associated with it. To view this information, the user selects "enter block" from the block menu. If the block has no information, nothing will happen. If the block has any information, the user is prompted to designate a display location.

Figure 25:
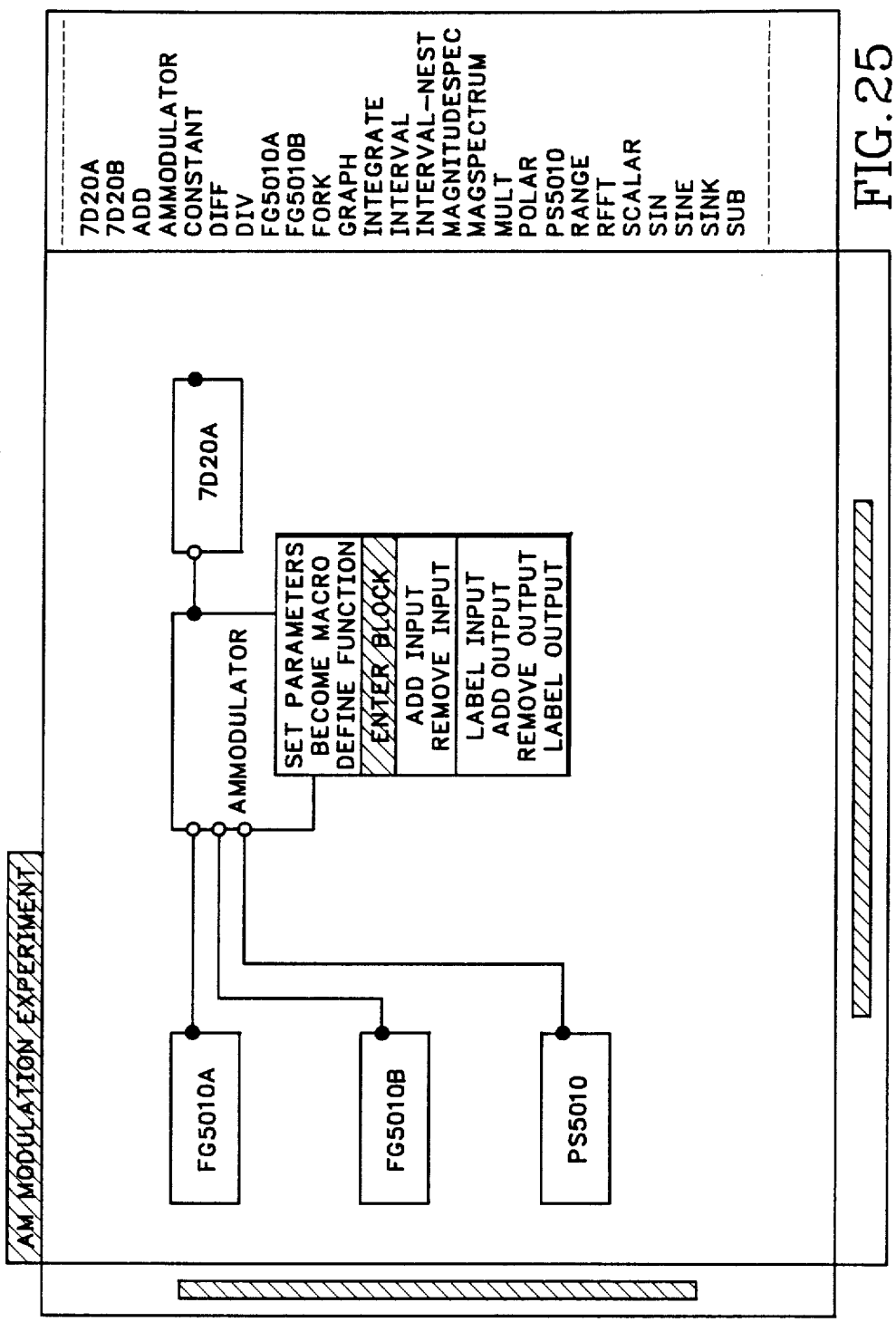
FIGS. 25–30 illustrate a capability provided in the invention for the user to enter a block, such as the device under test, to view further layers of a detail of the structure represented by the block.
Figure 25A:
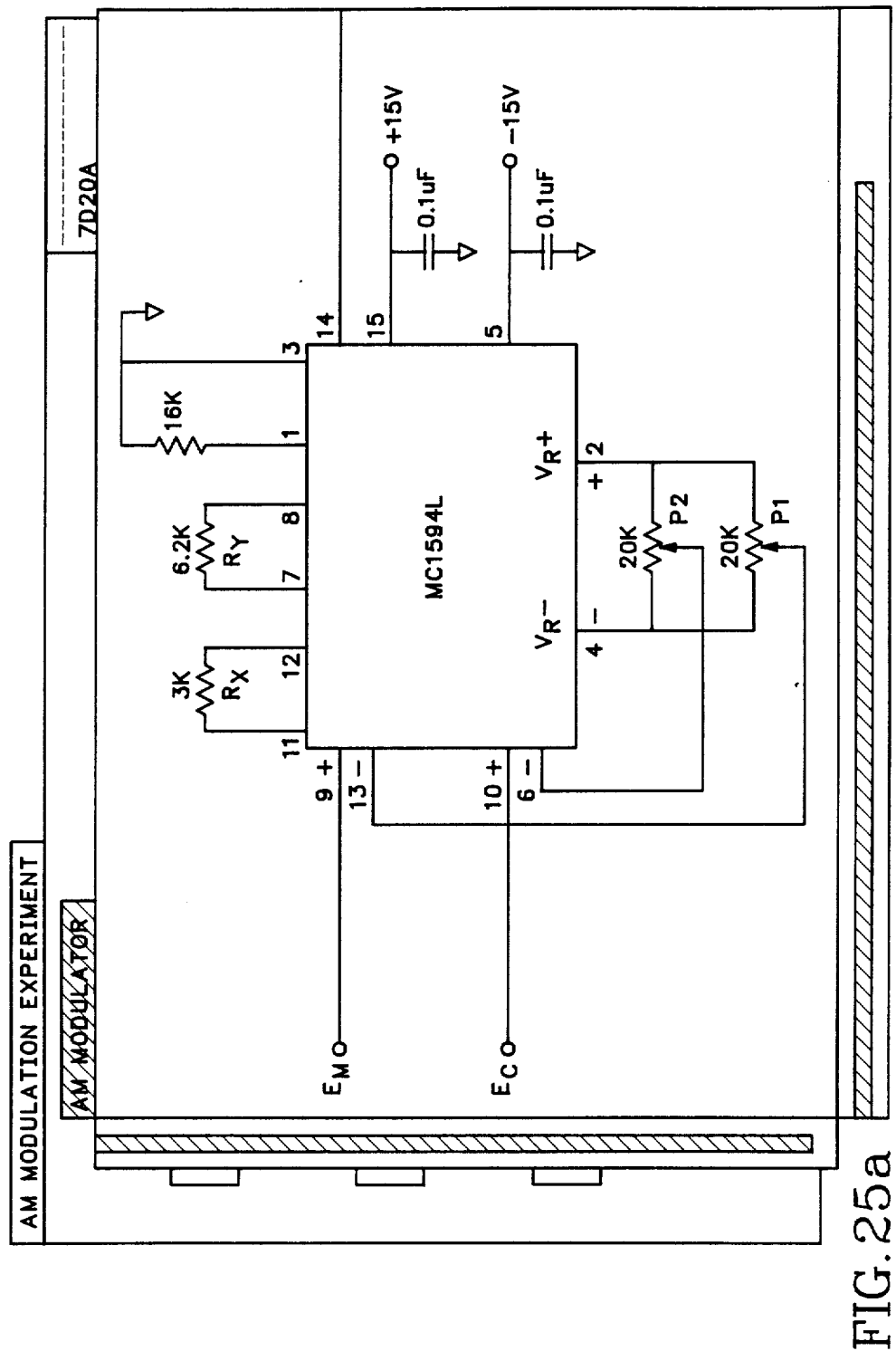
Figure 26:
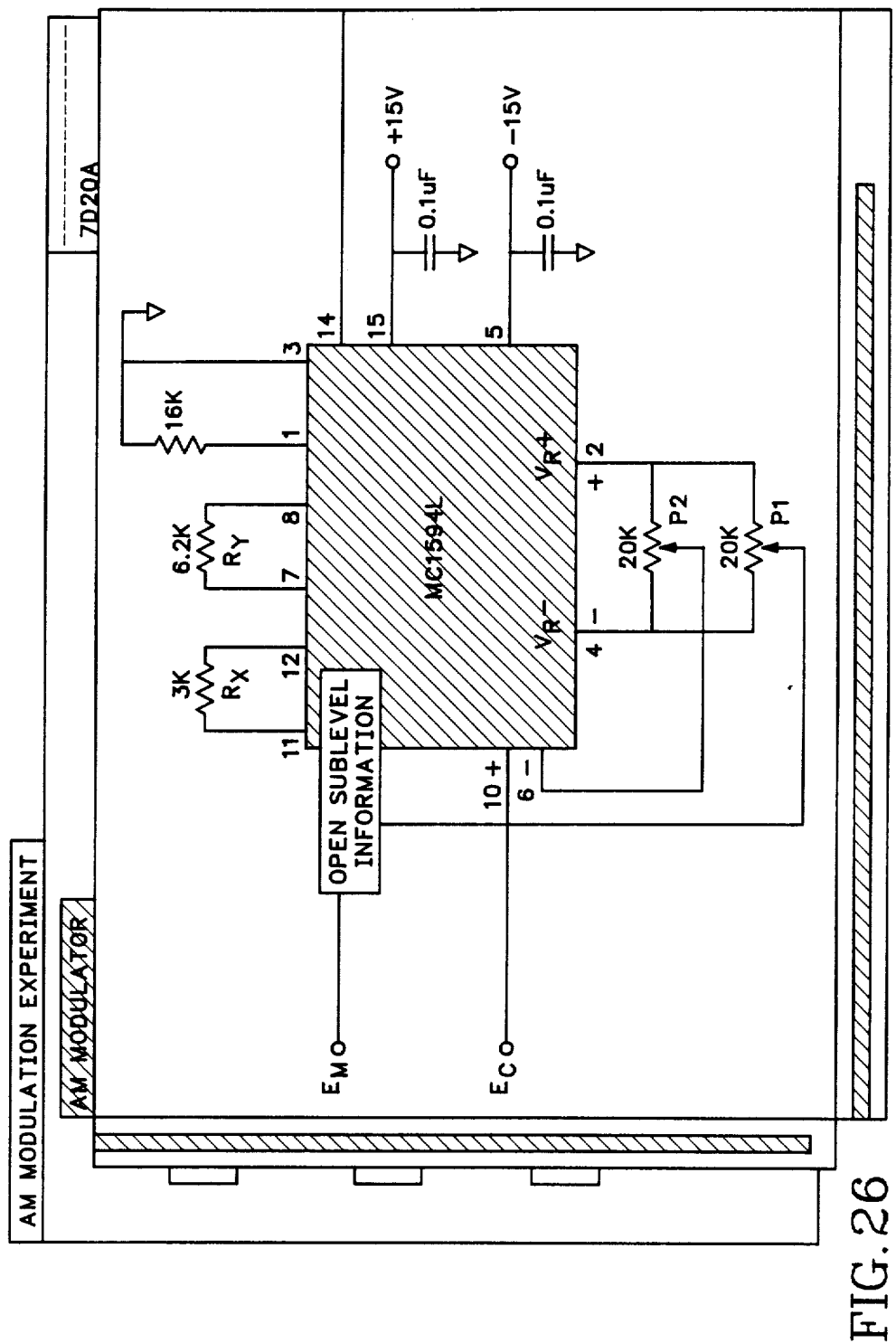
Figure 27:
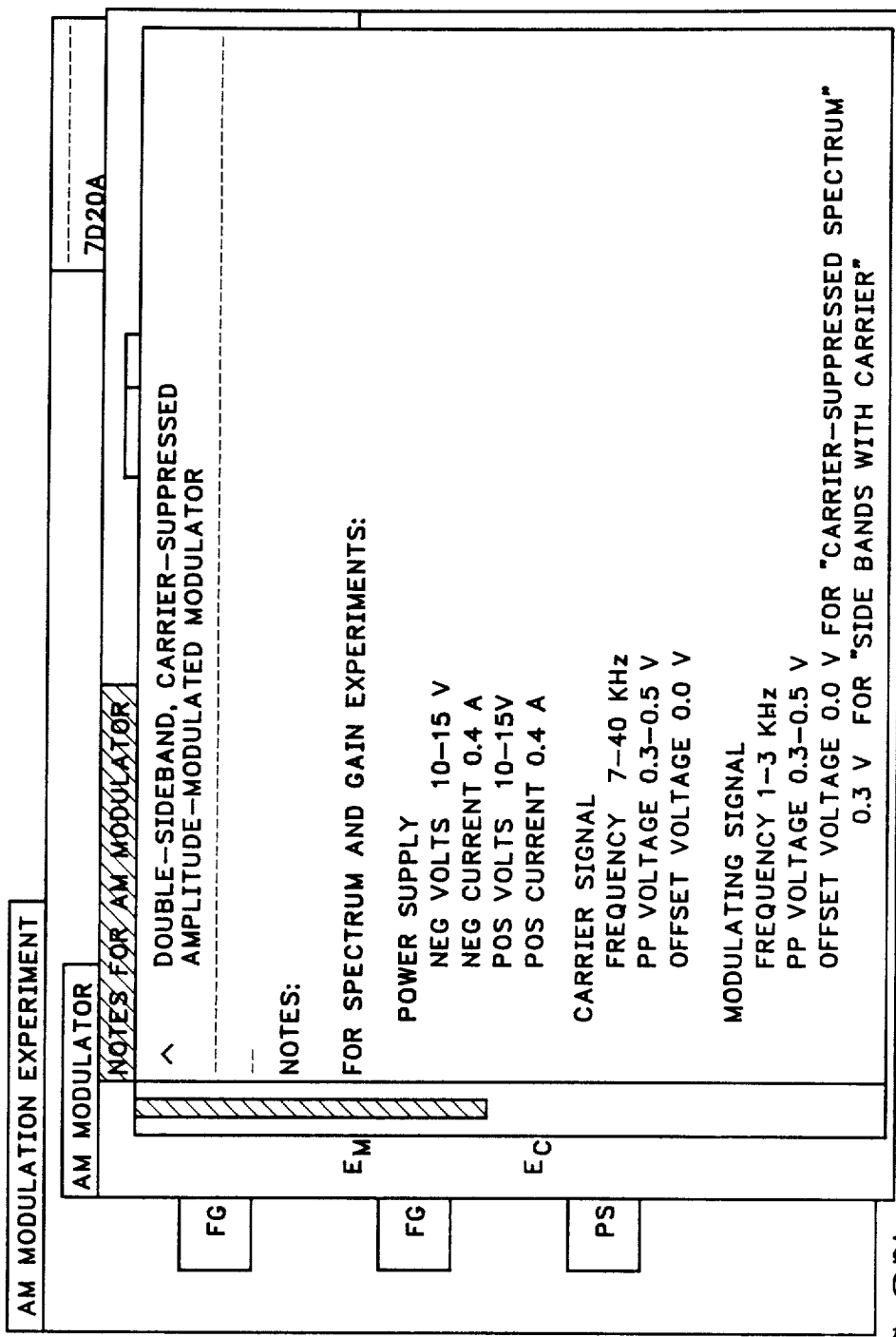
Figure 28:
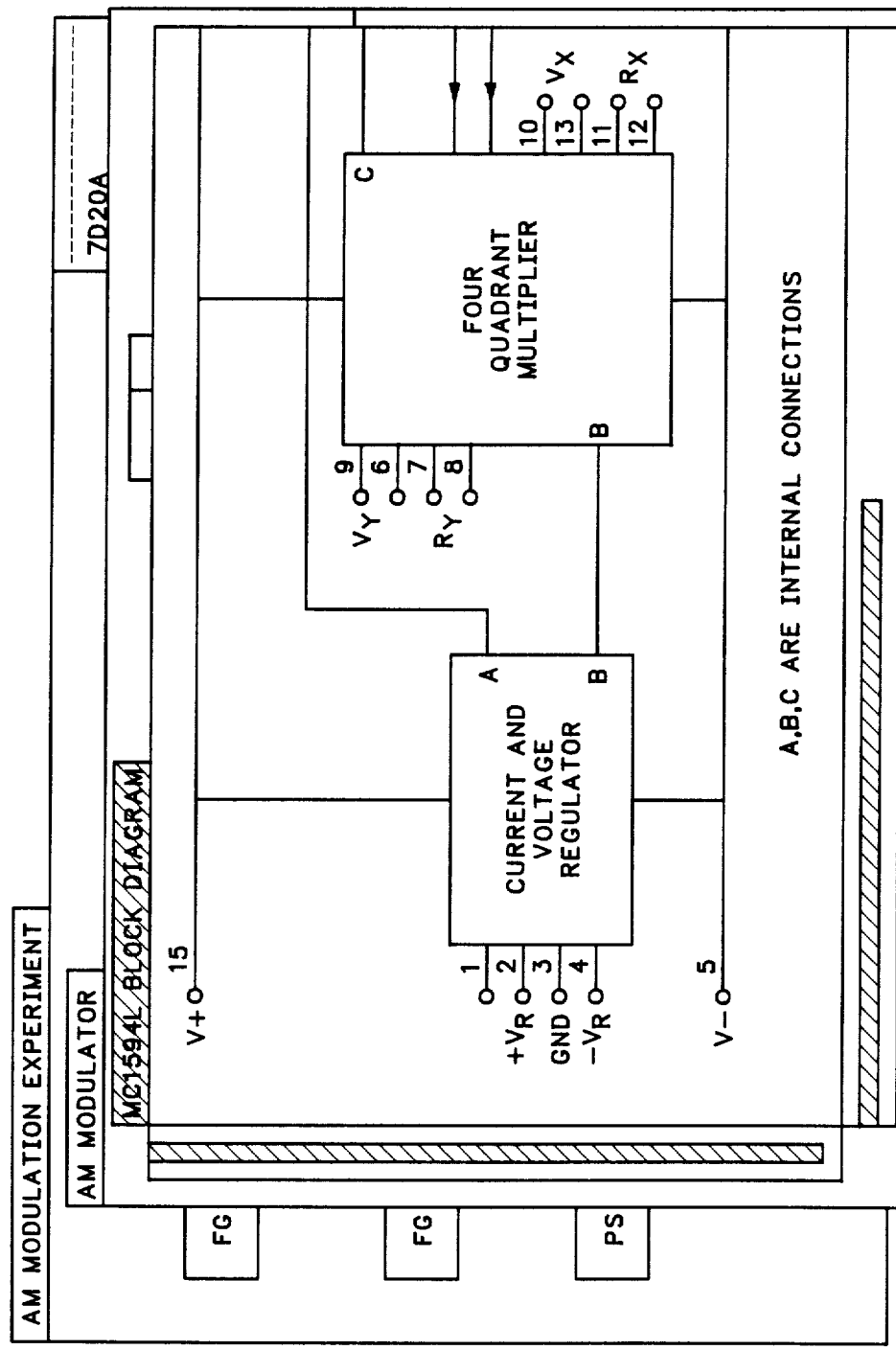
Figure 29:
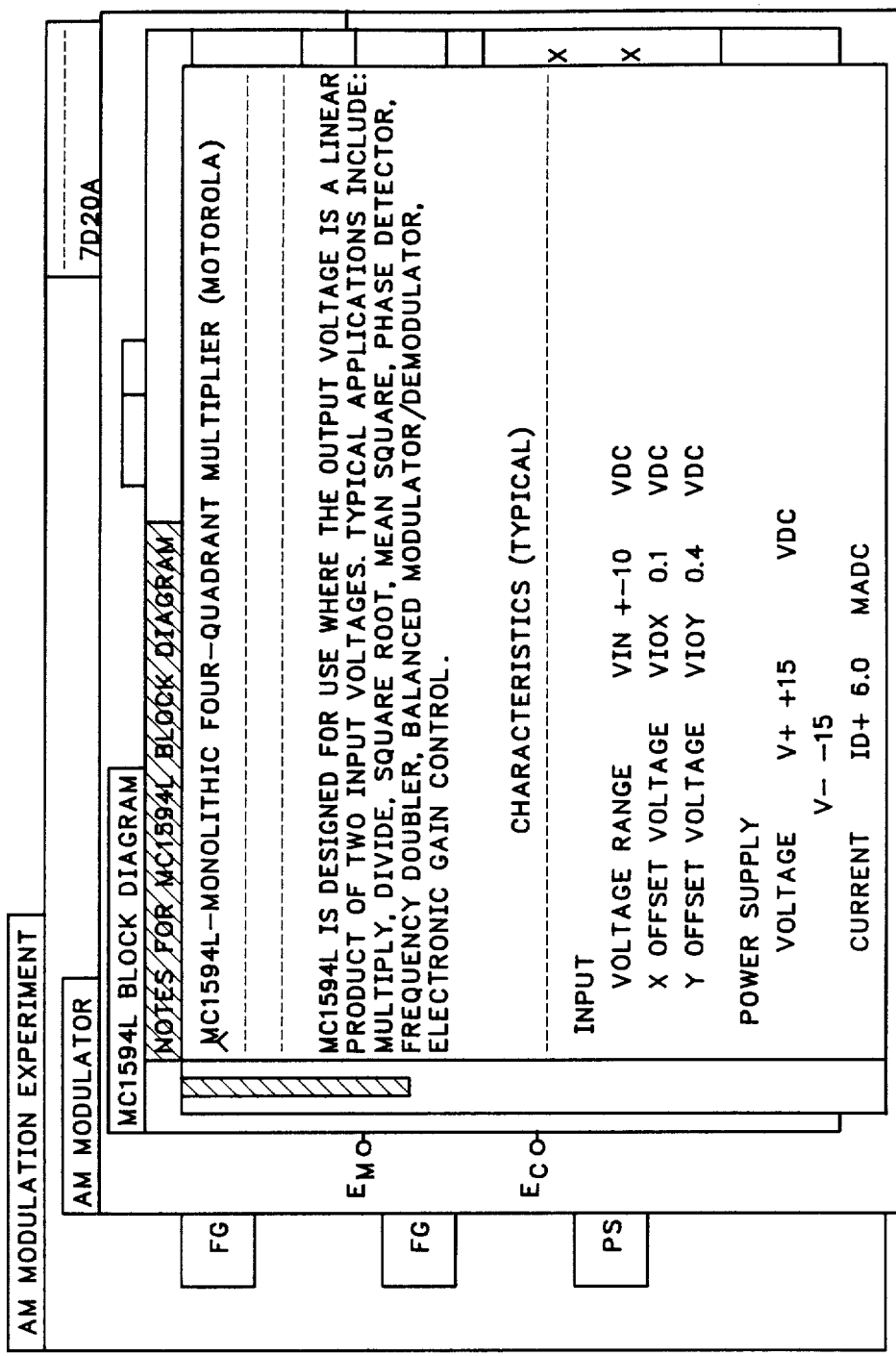
Figure 30:
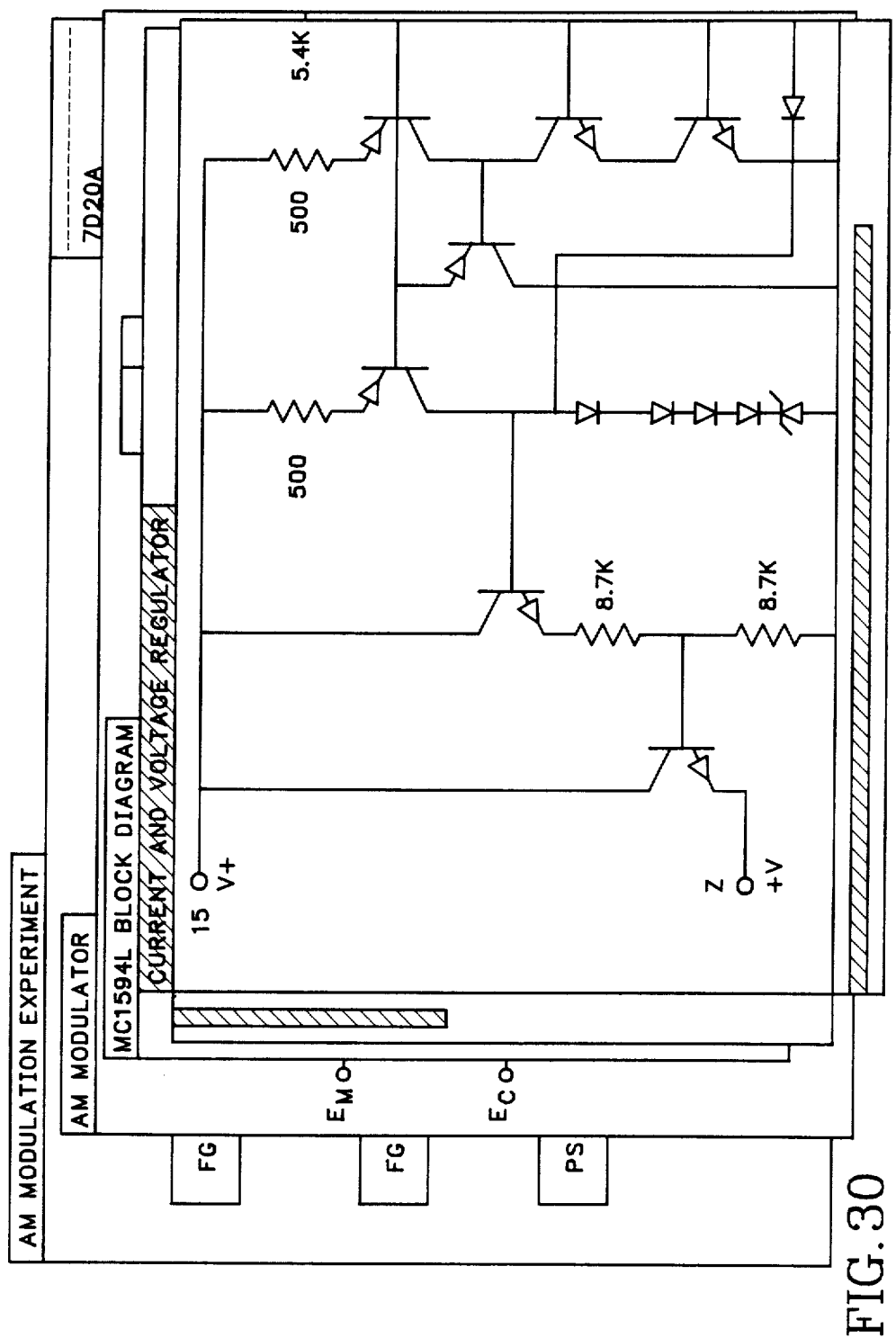

Referring to FIG. 25, the user has selected block 118, the device under test, for viewing prestored background information. At the first level below that of block 118, a prepared schematic of the device under test is displayed in FIG. 25a. Referring to FIG. 26, the user has selected an integrated circuit at the center of the schematic. The selection provides two options: "open sublevel" and "information." The "information" option enables the user to examine or add notes about the device, as shown in FIG. 27. The "open sublevel" brings up a block diagram for the selected circuit device, as shown in FIG. 28. This information would ordinarily come from the data book about the circuit device, which can be input by the user or obtained online or in machine readable form from the vendor. By selecting the block diagram, the user can descend to another level of detail, again using the two options "open sublevel" and "information." FIG. 29 shows textral information regarding the block diagram of FIG. 28. FIG. 30 shows a schematic for one of the blocks in the block diagram of FIG. 28.

2.2.10 Other Block Editing Functions

A number of functions, not shown in the drawings, are included in the block diagram editor program. These functions do, however, appear on the menus. Their operation is described as follows:

To erase an entire diagram, the user selects "clear" in the BlockEditor menu. A confirmation prompt asks the user if he really wants to clear the diagram. A "yes" selection will completely erase the diagram. A "no" selection will return control to the BlockEditor, leaving the diagram unchanged.

The software also permits the user to display the labels associated with input and output terminals of blocks. When the user selects "show labels" from the BlockEditor menu, labels will appear for all of the inputs and outputs on the currently-displayed blocks. To restore the diagram without labels, the user selects "repaint" from the BlockEditor menu. To change the input or output labels, the user selects either "label input" or "label output" from the block menu. The cursor will change to either the label input or the label output cursor. The user positions the cursor on top of the input or output to be relabeled and clicks the red mouse button. A prompt appears requesting the user to type in the new name. When completed, to exit this mode, the user selects "clear mode" from the BlockEditor menu. To view the new labels, the user selects "show labels" from the BlockEditor menu as described above.

The system also provides error messages to the user. Some of the actions that produce an error message include: connecting an output to an output or an input to an input; putting a block too close to another block; or trying to make more than one connection to an input or output terminal. Pressing the red mouse button will erase the error message so that the user can continue editing. If the user is doing something other than positioning a block, he releases the red mouse button to continue editing. If positioning a block, the user moves the cursor to the desired block location and then releases the red button.

2.2.11 Adding Blocks to the Resource List

Blocks can be added to the system resources list, as shown in resource pane 106. The procedure for adding a block has two major parts: first, add a star interface function to the Function Execution Library software (FIG. 3) to enable the block to be executed and, second, add the block to the resource list. The first step in the procedure is explained below in Section 4.5, which describes the block function building procedures in detail.

After the star function has been created, the user adds the function to the BlockEditor resource list as follows: The user selects "add block" from the BlockEditor menu. The user then places as many blocks in the editor pane as are desired to be added to the resource list. The user then selects "add input" from the block menu, and adds the appropriate number of input circles by clicking the red mouse button on the left side of the block once for each input to be added. Next, the user selects "add output" and adds output dots to the right side of the block. If too many inputs or outputs were added, they may be deleted by selecting "remove input" or "remove output" from the block menu. The user places the cursor over the input or the output to be removed and clicks the red mouse button. The user then selects "clear mode" once the correct number of inputs and outputs have been applied to the blocks in the editor pane.

Next, the user selects "label block" from the BlockEditor menu and selects a block to be labeled. The block must be labeled with the name of the execution manager star routine. The initial block label designates the block function and is always remembered even when the block is relabeled.

The user will then be prompted to build the block parameters by editing the following line:
('question1' 'answer1' 'question2' 'answer2' 'question3' 'answer3' 'question4' 'answer4' 'question5' 'answer5' 'question6' 'answer6').

The workspace in which this line appears contains a standard Smalltalk editor. The user replaces the "questionm" with the name of the parameter "answerm" with an appropriate default answer, leaving quotes around the questions and answers. If the user desires the answer to be a set of buttons, "answerm" (including quotes) is replaced with #("button1" "button2" "button3"). The labels given to the buttons will be the actual text sent to the star routine at the time of diagram execution, as shown in the example below. The user may add more questions/answers pairs as needed and should delete unused pairs. If the block does not have any parameters, the user selects all of the text between parentheses and deletes it. The user then selects "accept" from the BlockEditor menu in the editor pane once the parameters have been specified.

As an example, the "polar" block parameters (APPENDIX C) are specified as follows:
('units' #('RAD' 'GRAD' 'DEGREE') 'unwrap' #('TRUE' 'FALSE') 'delay' '1.0')

At this point, the user can give the block input and output terminals meaningful names and, if desired, can relabel the block. When the block is finished, the user selects it and positions it in the resource list pane 104, as previously described.

2.2.12 Simulation Block

In development of electrical circuits and other physical devices, it is conventional practice to develop a computer simulation of the device prior to making it. Once the device is built, it is tested and its operation compared to the results of the simulation. Conventionally, these steps are performed in separate sequential operations and, typically, the comparison is made manually. This is time consuming, error-prone and offers little opportunity to test alternative operating conditions.

The present invention enables simultaneous generation and comparison of simulation and actual test data. This is done by adding the simulation program for the device under test as a functional block as well as the information provided in Section 2.2.9. Such a block is added in accordance with the procedures described in Section 2.2.11 and the Sections referenced therein.

3.0 INTERNAL STRUCTURE OF BLOCK EDITOR

This section provides an overview of the 23 Smalltalk object classes which constitute the BlockEditor program, together with their relationships. Throughout this section, the Smalltalk naming conventions are used—class names and global variables are capitalized and instances of classes are not capitalized.

3.1 Classes Central to the Block Editor

Figure 3A:
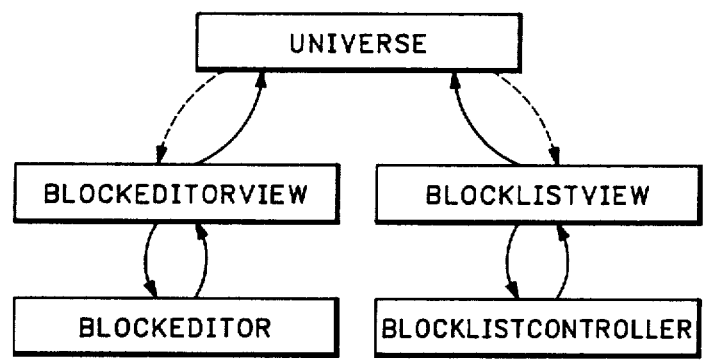
FIG. 3a is a diagram of the Block Editor Model-View-Controller relationships in the software structure of FIG. 3, the dotted lines indicating dependency relationships.

The block editor is most simply described as a model with two view-controller pairs. The model is class Universe, with the two view-controller pairs being BlockEditorView—BlockEditor and BlockListView—BlockListController. FIG. 3a shows these relationships, with dotted lines indicating dependency relationships.

3.1.1 Universe

Class Universe maintains all the data about the block diagram and the system resources in data base 87 (FIGS. 3 and 3c). The blocks and connections data structures it contains are sent to the execution manager for preprocessing by the diagram scanner 352 preparatory to execution by IBLOSIM (blocks 354 and 356 in FIG. 3c). The instance variables in Universe are:

blocks: a dictionary of blocks and galaxies, i.e., groups of blocks (stars), which point to corresponding displayBlocks and displayGalaxies. The blocks and galaxies correspond to the blocks and macros of a block diagram.

connections: a dictionary of connections which point to displayConnections.

savedBlocks: points to the global variable CannedBlocksList, which is a dictionary containing the resources available to the block editor. This list is displayed in the BlockListView. The format of CannedBlocksList is the same as that of blocks.

dataDisplays: a dictionary containing the names of blocks which perform data display functions (such as the graph or scalar blocks). Entries point to the corresponding object which does the actual data display.

listIndex: the index of the currently selected resource in the BlockListView.

onGalaxy: a Boolean which is true if this BlockEditor is editing a galaxy (macro), false otherwise.

currentGalaxy: if onGalaxy is true, this points to the galaxy (macro) being edited.

modelPtr: if onGalaxy is true, this points back to the parent universe or galaxy.

3.1.2 BlockEditor

The BlockEditor class is the controller for the block editor. It receives all the mouse activity (keyboard activity is usually requested by the other classes) and, if necessary, asks the universe to modify itself. Some activities, such as adding/moving a connection, or building a galaxy, require that the controller collect a large amount of data and then send it to the universe. The BlockEditor also contains the method which initiates the execution manager. The instance variables for BlockEditor are:

form: contains the current form of the cursor.

tool: if the block editor is in a mode (for example, adding inputs), this contains the symbol for the method to execute when the red button is clicked. Usually it is nil.

currentSel: contains the currently selected block or connection.

3.1.3 BlockEditorView

BlockEditorView class is the view for Universe and BlockEditor. It handles all the display activity for the block editor. BlockEditorView is a fairly standard view, and has no instance variables.

3.1.4 BlockListController

BlockList Controller is the controller for the resource list pane. The only reason for its existence is the addition of the resource list pane yellow button menu.

3.1.5 BlockListView

This is the view for the resource list pane. It is only used because the standard SelectionInListView pluggable view does not understand the broadcast messages from class Universe.

3.1.6 Block

The Block class manages all the logical data for each block. The instance variables for Block are:

inputs: an OrderedCollection of the block input names. This list has a one-to-one correspondence with the inputs instance variable in class DisplayBlock.

outputs: like inputs, except deals with the block output names.

name: the name of the block. The displayBlock label is derived from name.

function: the name of the BLOSIM star routine associated with this block.

parameters: an Array containing the block's parameters.

insideInfo: a pointer to a user-viewable information about this block; presently limited to Schematics.

3.1.7 DisplayBlock

The DisplayBlock class manages all the data relating to the display of the block. The instance variables for DisplayBlock are:

position: the location of the upper-left hand corner of the block in the BlockEditor view.

form: a copy of the block's form; needed because not all blocks are the same size.

extent: the block's size.

myBlock: a pointer to the displayBlock's block.

inputs: an OrderedCollection of the points representing the block's inputs, sorted in y order.

outputs: an OrderedCollection of the points representing the block's outputs, sorted in y order.

label: a DisplayText representation of the displayBlock's name.

inputExtent, outputExtent, labelExtent: each extent represents the minimum extent the displayBlock can be and still be large enough to display the inputs, outputs, and label, respectively. The actual extent is the largest of the three.

parameters: points to the blockParams for this displayBlock.

3.1.8 Connection

The connection class maintains the information relating to the connections between blocks. The instance variables for Connection are:

fromBlock: the name of the block from which the connection is coming.

blockOutput: the name of the specific output of fromBlock from which the connection is coming.

toBlock: the name of the block to which the connection is going.

blockInput: the name of the specific input of toBlock to which the connection is going.

3.1.9 DisplayConnection

The DisplayConnection class, a subclass of the standard Smalltalk class LinearFit, handles the data related to the actual display of a connection. Most of the data storage and display is dealt with in LinearFit. The only instance variable is:

myConnection: pointer to the connection associated with the displayConnection.

3.1.10 Galaxy

The Galaxy class maintains the information about macros. It is a subclass of Block. Instance variables of Galaxy are:

blocks: a dictionary of the blocks that constitute the galaxy. It is organized exactly like the blocks dictionary in Universe.

connections: a dictionary of all the connections internal to the galaxy. It is organized exactly like the connections dictionary in Universe.

inConnections: an Ordered Collection of the inside-to-outside connections of the galaxy which maps block inputs and outputs to the macro diagram's inputs and outputs.

3.1.11 DisplayGalaxy

The DisplayGalaxy class is a subclass of DisplayBlock. The only difference between a displayBlock and a displayGalaxy is that a displayGalaxy has a patterned fill. It has no instance variables.

3.2 Classes Supporting Block Parameterization

Figure 3B:
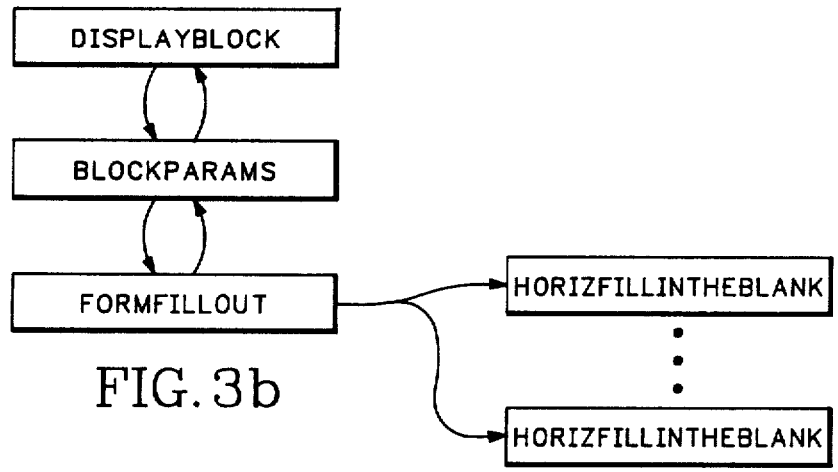
FIG. 3b is a diagram of the DisplayBlock Block-Params-FormFillOut relationships in the software structure of FIG. 3, each question/answer pair being one "HorizFillInTheBlank."

The block editor has a number of support classes which manage block parameter acquisition, as shown in FIG. 3b. The actual parameters for each block are created when the corresponding displayBlock is labeled for the first time. The user is prompted to substitute the parameters for items in a list, as described in Section 2.2.11. This builds a template that is used to build the formFilloutView whenever "set parameters" is selected from the block menu. The parameter instance variable in the display Block points to the blockParams for that block.

3.2.1 BlockParams

BlockParams contains the template of questions and default answers used to build the formFillout for the block parameters. More than one displayBlock can have a formFillout on the display screen at the same time, allowing the user to edit them concurrently. When "accept" is received by the formFillout, it sends the blockParams the message "finishUp." The blockParams then stores the new parameter values into the template and sends the new parameter values to the displayBlock. The instance variables for BlockParams are:

template: an OrderedCollection of three-element OrderedCollections. Each three-element orderedCollection represents one parameter. The first element is a string containing the parameter name, such as 'risetime' or 'units.' The second element is the default answer (for single-valued parameters) or an array of strings (for buttons as shown in FIGS. 14 and 15). The second element could contain values such as '1.5' or #('RAD' 'GRAD' 'DEGREE'). The third element is the current answer, such as '1.7' or 'DEGREE.' The arrow after the parameter name in the formFillout is added during the creation of the formFillout.

showDefaults: a Boolean, which if true, will show the default answer, and if false, will show the current answer.

ansOC: anOrderedCollection used in the BlockContext which is executed when the formFIllout is accepted. The new parameters are stored into ansOC.

displayBlock: points back to the displayBlock associated with this blockParams.

3.2.2 FormFillout

FormFillout, a subclass of standard Smalltalk class FillInTheBlank, takes a collection of questions and answers and prompts the user to edit the answers. The user then accepts the answers, whether or not any editing has taken place. This closes the formFilloutView. FormFillout is the model for FormFilloutView and FormFillout Controller. The instance variables for FormFillout are:

okayToLeave: a Boolean which is true if the formFillout is scheduled, false if the formFillout has control.

BlockParam: points back to the blockParams which invoked this formFillout. This is used to determine where to send the new parameters.

3.2.3 FormFilloutController

FormFilloutController is the controller for FormFillout. It waits for an accept message, and then tells all the subcontrollers to perform their accept actions. It has no instance variables.

3.2.4 FormFilloutView

FormFilloutView is the view for FormFillout. It is a subclass of FillInTheBlankView. FormFilloutView builds the view and starts up the controller. A formFilloutView consists of messageView-answerView pairs, which are basically fillInTheBlankViews displayed horizontally instead of vertically. The buttonViews are a group of OneOnButtons with a ValueHolder as their connector. FormFilloutView has no instance variables.

3.2.5 HorizFillInTheBlank, HorizFillInTheBlankView, SimpleMinded-Controller

These three classes make up a FillInTheBlank that is displayed horizontally instead of vertically. They are used in the FormFilloutView.

3.2.6 Template

Template is used by BlockParams to get the question/default answer pairs. The instance variables for Template are:

text: the string that the user edits to create the question/default answer pairs. The resulting array is returned to BlockParams.

3.2.7 ValueHolder

ValueHolder is used to store the value of the currently selected button (e.g., 1=sine, 2=square, 3=triangle in parameter view 168 in FIG. 14). When the valueHolder receives the accept message from the formFilloutController, it sends that value to be stored in blockParams. The instance variables for ValueHolder are:

value: the label of the currently selected button.
acceptBlock: the BlockContext evaluated by the valueHolder upon receiving the accept message.

3.3 Additional Support Classes

The block editor has three additional support classes which deal with XY-scrolling and aligning the BlockEditor view on a grid.

3.3.1 XAxisScrollController

XAxisScrollController represents control for scrolling using an x-axis scroll bar. It is a subclass of ScrollController which creates an x-axis scroll bar. The x-axis scroll bar is controlled in a manner analogous to the y-axis scroll bar. The instance variables for XAxisScrollController are:

xScrollBar: inside white, the outer rectangle.
xMarker: inside gray, the inner rectangle.
xSavedArea: the area the xScrollBar overlaps, restored whenever the xScrollBar is hidden.

3.3.2 GriddedTopView

GriddedTopView forces the BlockEditor view to always be aligned on a 6×6 grid. This is done by modifying the method getFrame. It eliminates the problem of moving or collapsing and reopening a block editor and being unable to draw straight lines. GriddedTopView has no instance variables.

3.3.3 GriddedTopViewController

GriddedTopViewController modifies the blueButton messages "close" and "move." The change to close adds a confirmer to forestall premature closing of a block editor. The change to move forces the BlockEditor view to always align on a 6×6 grid. GriddedTopViewController has no instance variables.

3.4 Internal Structure of the Block Editor

FIGS. 31 through 41 illustrate the state diagram of the Block Diagram Editor. The states of the system primarily change as a result of mouse movements and button presses.

Referring to the Main Control Loop State Diagram (FIG. 31), the editor is started up by issuing the Smalltalk statement:

BlockEditor openOn: (Universe new) The block editor is started with all parameters set to their initial states. The Universe instance variables are set to:
blocks: empty dictionary
connections: empty dictionary
savedBlocks: CannedBlocksList
dataDisplays: empty dictionary
listIndex: nil
onGalaxy: false
currentGalaxy: nil
modelPtr: nil
The BlockEditor instance variables are initialized to:
form: arrow cursor form
tool: nil
currentSel: nil Next, a window 100 is created as shown in FIG. 7. The entries in the resource list 106 are taken from the Universe savedBlocks dictionary. When this window is activated (by selecting it with the mouse), the "Main control loop" 200 (FIG. 31) takes control. When in the BlockEditor window 100 (FIG. 6), there are three areas in which mouse activity will take place: the editing pane 104, the resource list pane 106 and the title tab area 102. Moving the cursor (with the mouse) into one of these areas causes the control loop state for that area to be entered, i.e., one of "Editor Pane Control Loop" 201, "Resource List Pane Control Loop" 202 or "Title Tab Control Loop" 203 in FIG. 31.

When a mouse button is pressed, the control state is changed to the appropriate button activity state, 204, 205, 206, 207 or 208. Note that the blue button mouse activity 206 is independent of the area in which the mouse cursor is positioned. The following paragraphs describe the activities in each state.

3.4.1 Editor Pane Red Button Activity States

Figure 32:
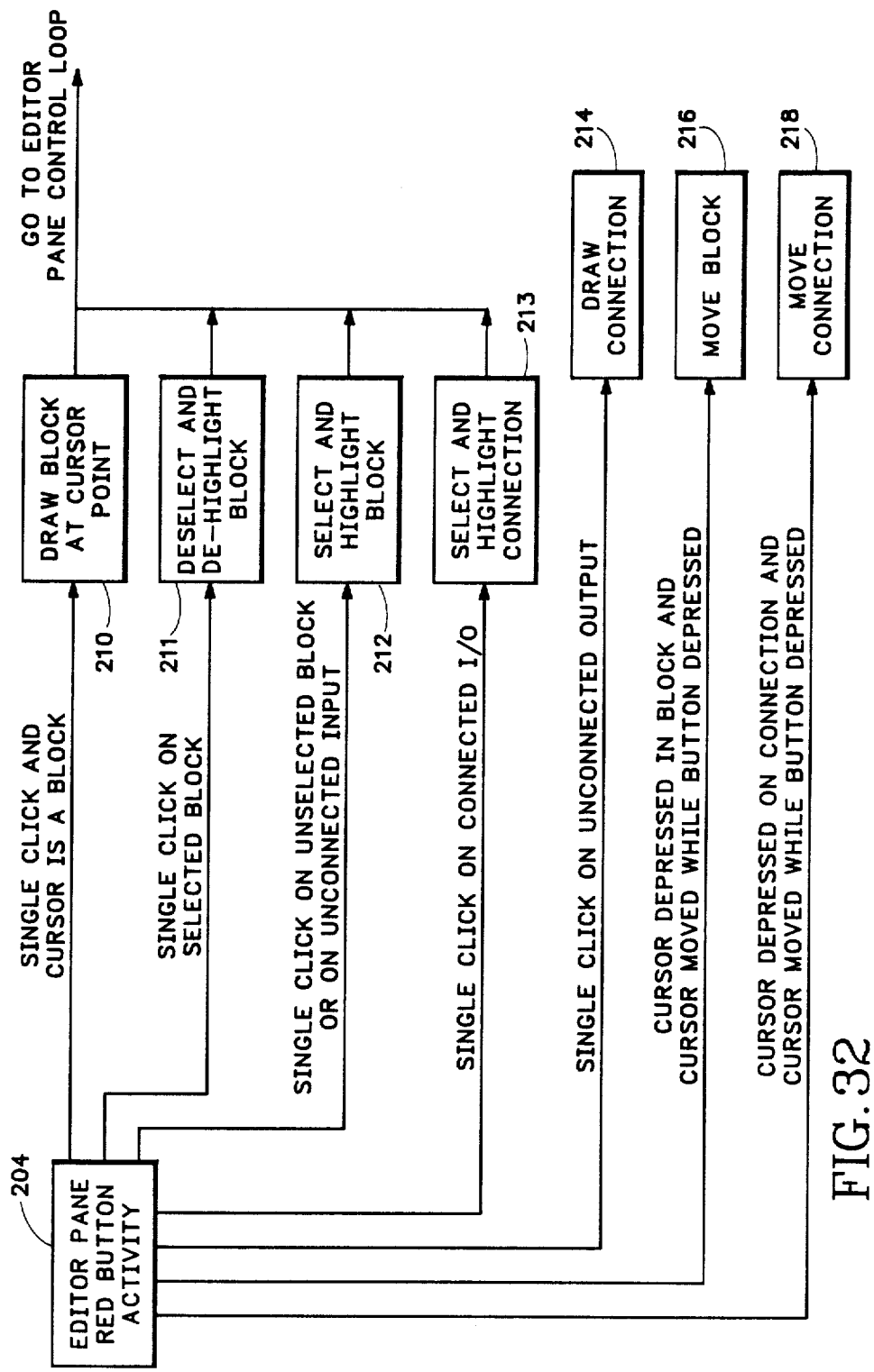
FIG. 32 is a state diagram of the "editor pane red button activity" state in FIG. 31.

While in the editor pane 106, the Red Button (BLOCK 204) controls the placement of blocks and connections in the diagram. The mouse button activity for this editing is shown in FIG. 32 for the overall activity, in FIG. 32a for drawing connections, in FIG. 32b for moving blocks and FIG. 32c for moving connections. Each activity is identified as a block by a reference numeral and figure number(s). The blocks and connections are functionally identified in the drawings, and their operations are further described below.

3.4.1.1 Draw block at cursor point 210 (FIG. 32)

Drawing a block at a cursor point consists of taking the form (e.g., a rectangle) specified by DisplayBlock form and placing it at the cursor location.

3.4.1.2 Selecting/highlighting and deselecting/dehighlighting blocks 211, 212 (FIG. 32)

Block selections are identified internally by the cursor type. Selecting a block makes the cursor type (BlockEditor "form") that block. Similarly, deselecting a block sets the cursor to the normal (arrow) cursor. Highlighting a block is accomplished by bit-anding the pixels of the block form with a halftone form and displaying the result. Dehighlighting a block reverts to drawing the block in its normal form.

3.4.1.3 Select and highlight connection 213 (FIG. 32)

Selecting a connection set the cursor type (BlockEditor "form") to the connection. The connection is highlighted by anding the solid line representing the connection with a halftone form.

Figure 32A:
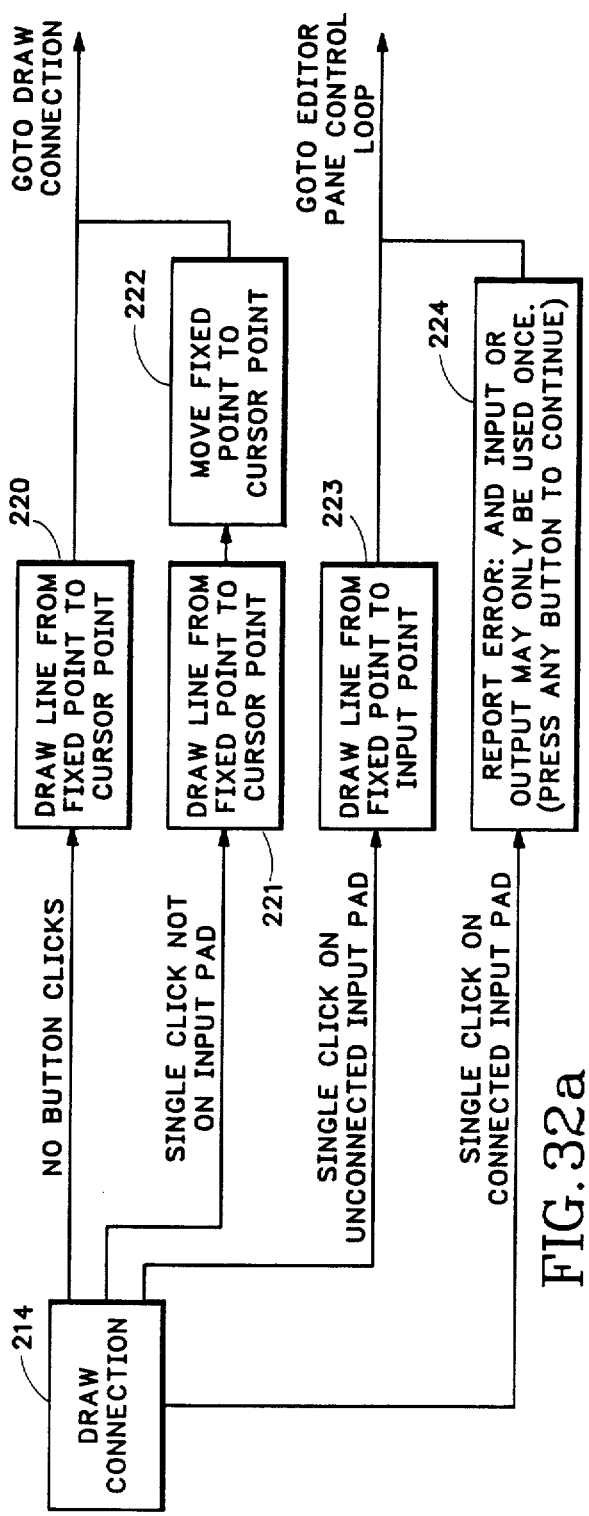
FIGS. 32a, 32b and 32c are state diagrams for the "draw connection," "move block" and "move connection" states in FIG. 32.

3.4.1.4 Draw connection 214 (FIGS. 32, 32a)

The draw connection state 214 is entered by a single click of the mouse button on an unconnected output. A new instance of Connection is created with the instance variables set to:
fromBlock: the block containing the output just clicked on
blockOutput: the name of the output just clicked on
toBlock: nil
blockInput: nil
Also a new instance of displayConnection is created and initialized to:
collectionOfPoints: empty list myConnection: pointer to the just-created
Connection instance. A connection is constructed by moving the mouse (state 220) and clicking at desired locations (states 221, 222) to change the direction of the line. The location on the diagram of each of these boundary points is added to "collectionOfPoints." This process continues until an unconnected input block pad is reached (state 223) or another output or connected input pad is reached (state 224). When an unconnected input is reached, "toBlock" is set to the block containing the input and "blockInput" is set to the name of the input. The displayConnection object is added to the Universe "connections" dictionary.

Figure 32B:
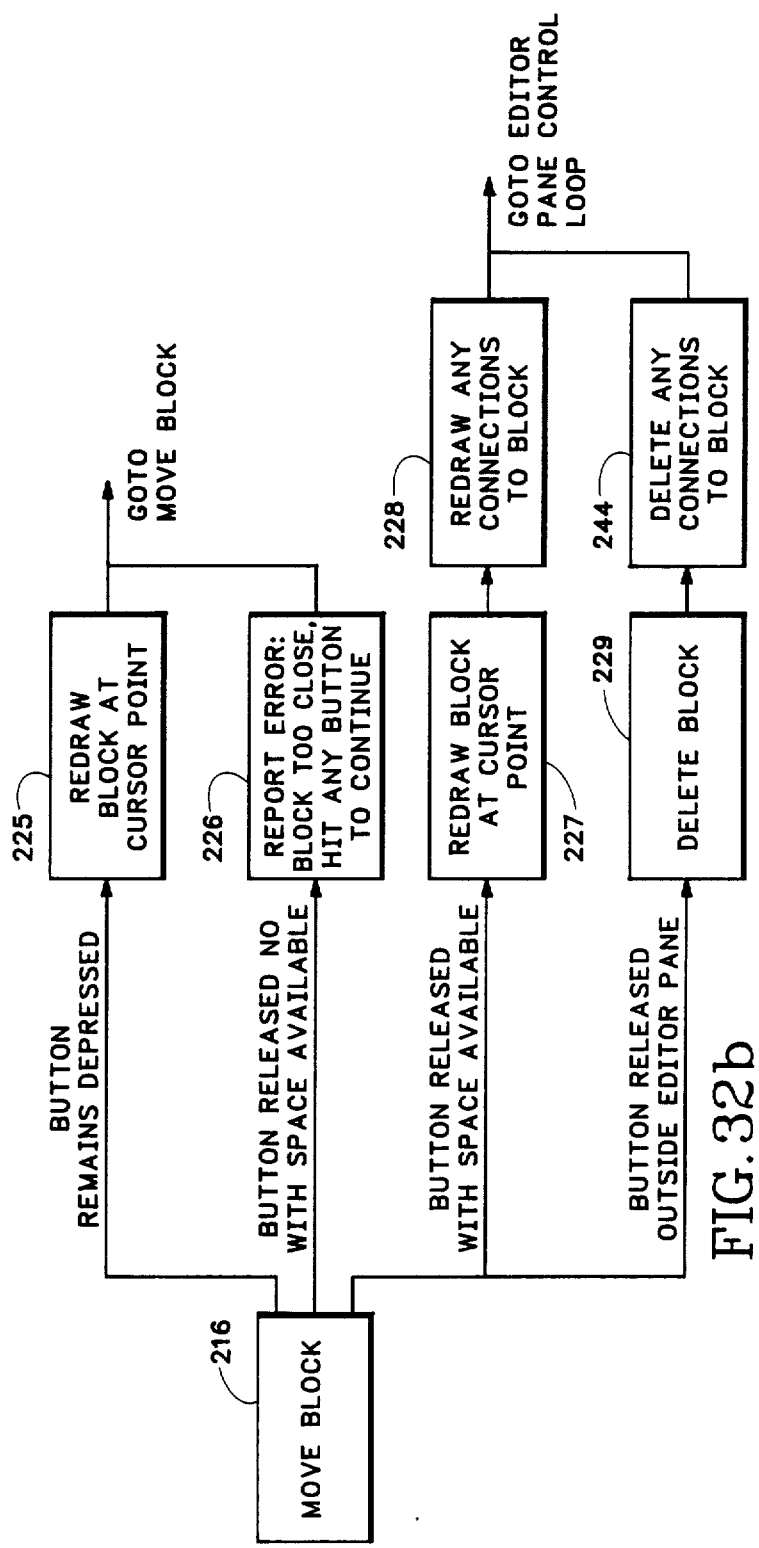
Figure 32C:
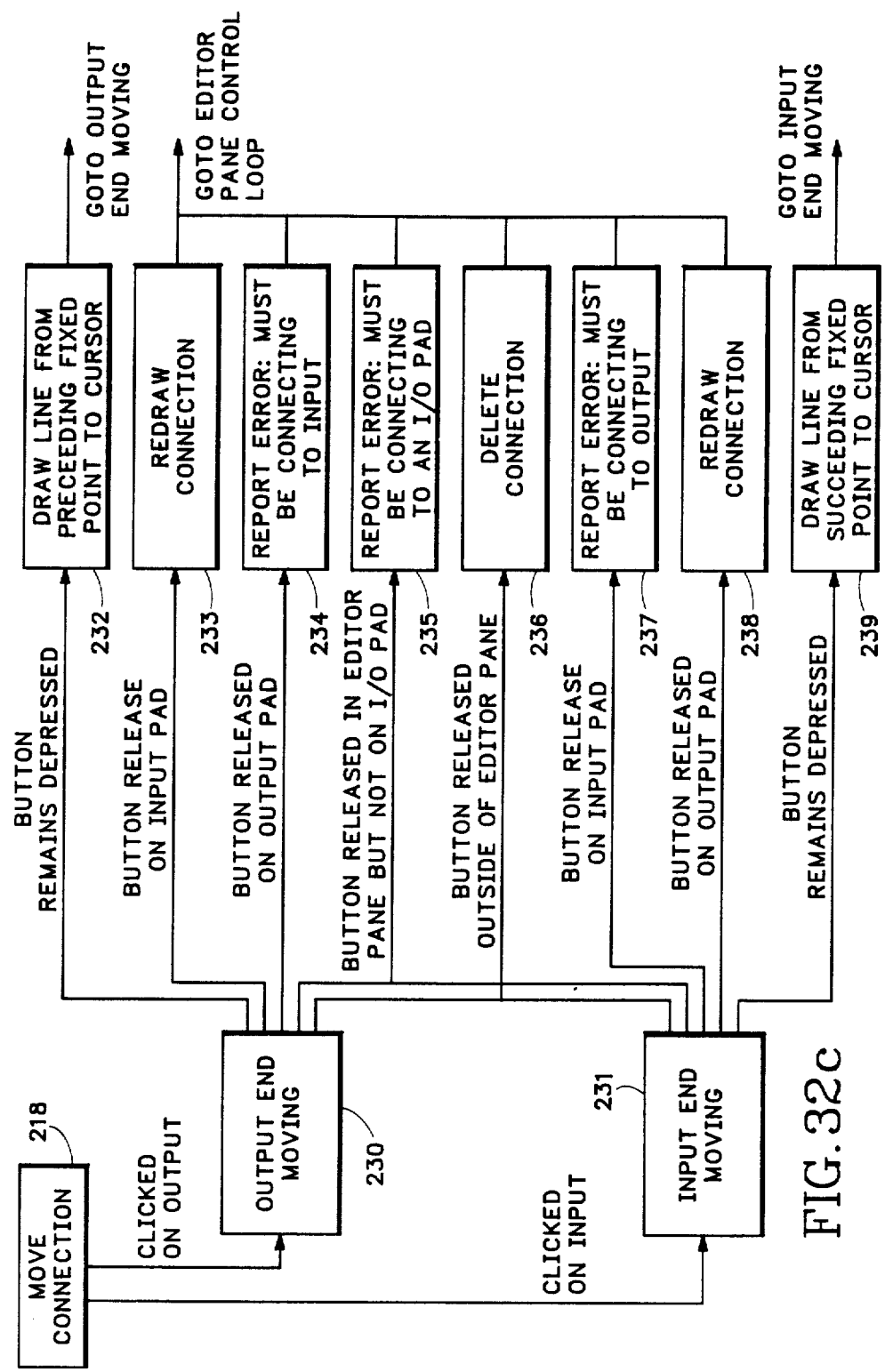

3.4.1.5 Move block 216 (FIGS. 32, 32b)

The move block state 216 is entered when the mouse button is depressed within the cursor in a block and the cursor is moved while the button is depressed. The block is continuously redrawn following the cursor while the button is depressed (state 225). If the button is released while the cursor is in editor pane 104, the block is drawn one last time at the current cursor position (state 227), any connections to the block are redrawn (state 228) and block data base is updated to show the new position of the block by setting DisplayBlock "position" to the coordinates of the current mouse position. If the button is released with cursor outside the editor pane, the block is deleted (state 229) and the connections to the block are deleted (state 244).

3.4.1.6 Move connection 218 (FIGS. 32, 32c) The move connection state 218 is entered when the cursor is depressed on a connection and the cursor moved while the button is depressed. There are two types of connection moves: moving the output end of the connection (state 230) and moving the input end of the connection (state 231). Both operate in a similar manner in that while the button remains depressed the connection line is continuously updated to follow the cursor (states 232 or 23). Where the cursor is located when the button is released determines the final state entered for moving the connection. When moving the input end of the connection, the final cursor location must be on an unused input pad (state 238) to successfully move the connection. Similarly, when moving the output end of the connection, it must terminate on an unused output pad (state 233). If the button is released with the cursor outside the editor pane, the connection is deleted (state 236). Any other termination point results in an error (state 234, 235, 237) and the connection is unchanged.

Once a new location has been successfully identified, the Connection instance variables "fromBlock," "blockOutput," "toBlock" and "blockInput" are updated to reflect the changes made.

Figure 33:
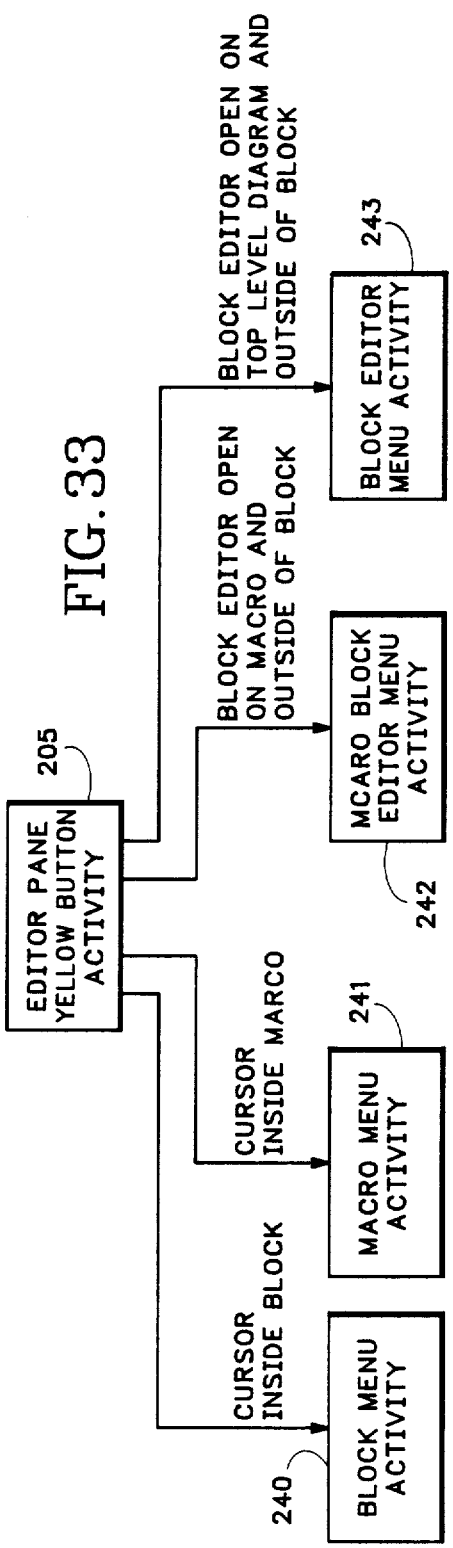
FIG. 33 is a state diagram of the "editor pane yellow button activity" state in FIG. 31.

3.4.2 Editor Pane Yellow Button Activity States 205 is further detailed in FIG. 33.

While in the editor pane 106, the yellow button's control depends on where in the editor pane the cursor is. The activity is split into four possible states which depend on the mouse position and how the block editor was opened. These state transitions are: cursor inside a block (state 240), cursor inside a macro (state 241), block editor open on a macro and cursor outside a block (state 242), and block editor open on a top level diagram and cursor outside a block (state 243).

3.4.2.1 Block Menu Activity

Figure 34:
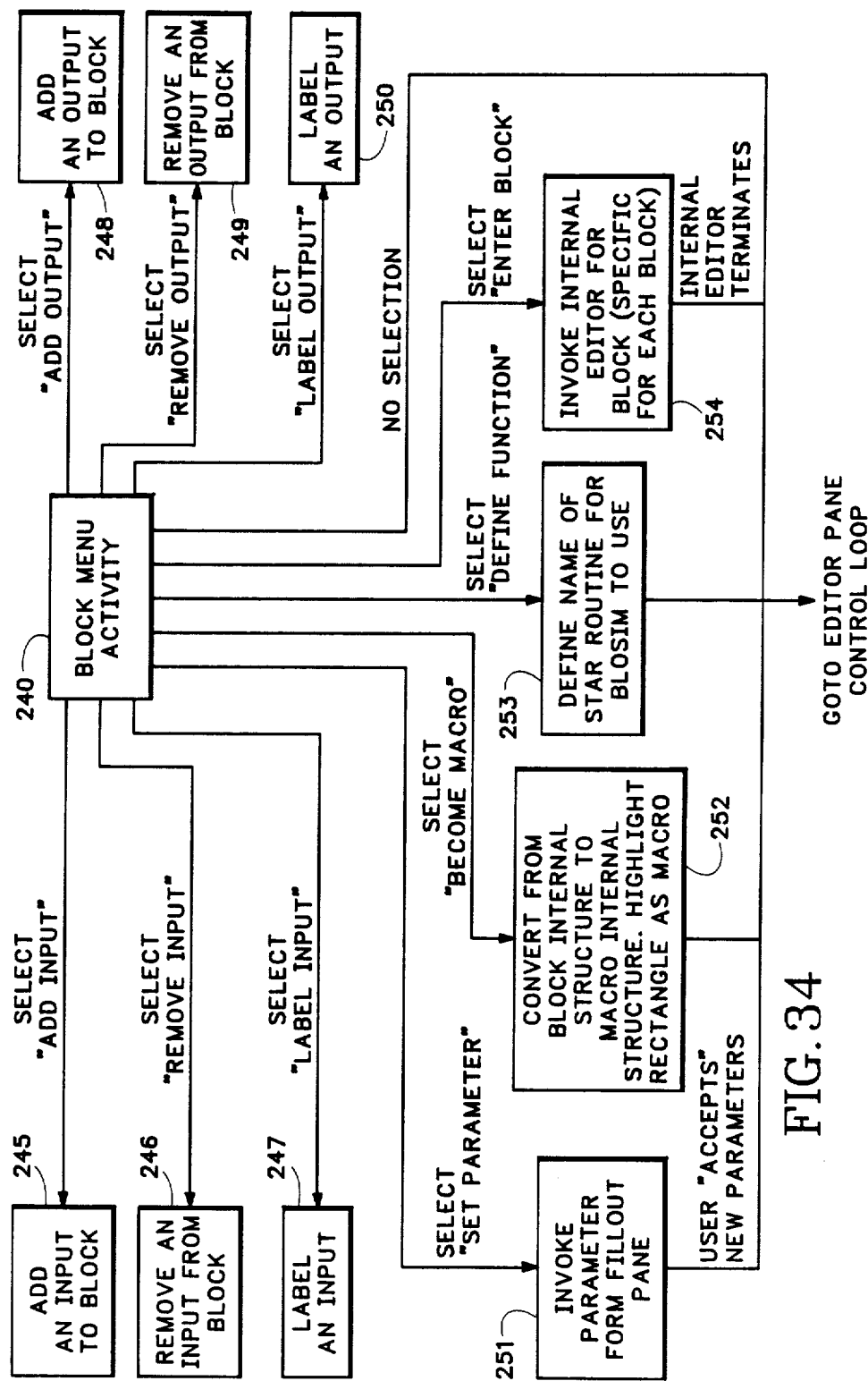
FIG. 34 is a state diagram of the "block menu activity" state in FIG. 31.
Figure 34A:
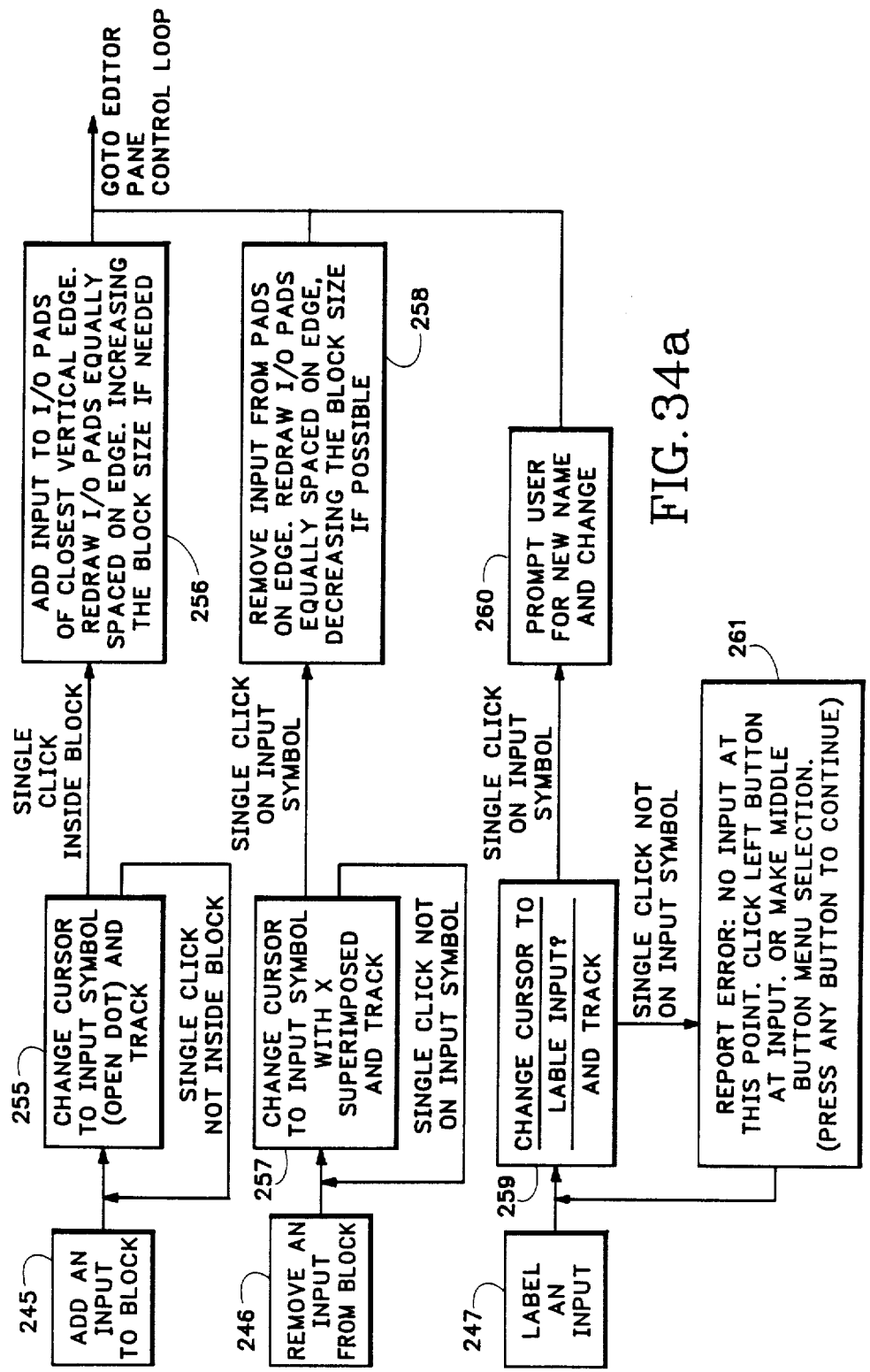
FIG. 34a shows the Block Input state diagrams for the "add an input to block," "remove an input from block" and "label an input" states in FIG. 34.
Figure 34B:
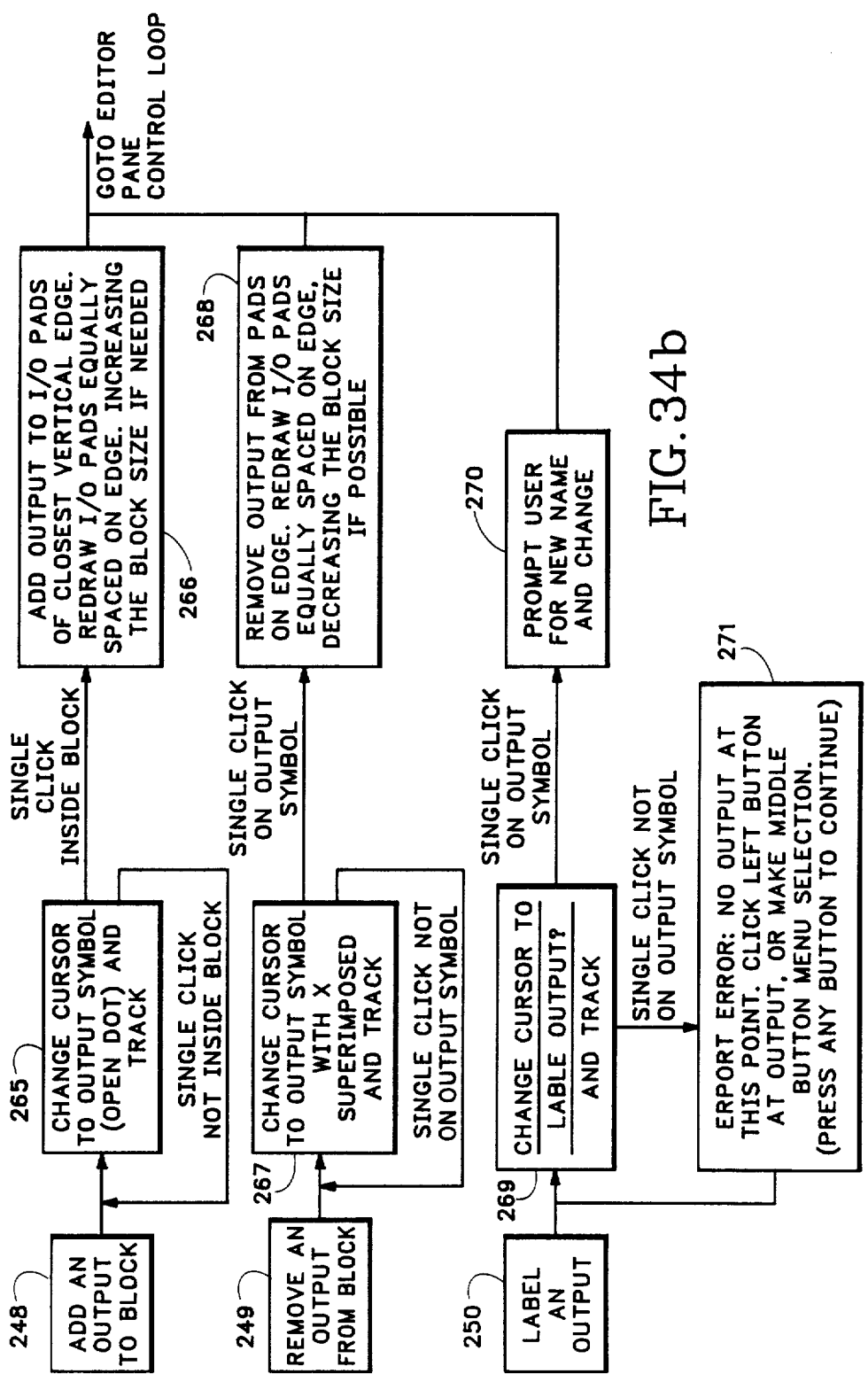
FIG. 34b shows the Block Output state diagrams for the "add an output to block," "remove an output from block" and "label an output" states in FIG. 34.

The Block Menu Activity state 240 (FIG. 34) is entered from state 205 whenever the cursor is in the editor pane and inside a block and the yellow button is pressed. Entering this state brings up a pop-up menu 116 as shown in FIG. 13. Selecting one of these menu items enters a new state as shown in FIG. 34. Three of these states deal with processing the inputs to blocks and are further expanded in FIG. 34a. Also three of these states deal with block outputs and are further expanded in FIG. 34b. These other states are described as follows:

Convert block internal form to macro internal form 252 (FIG. 34):

A new instance of Galaxy is created with the following instance variables set to:
Galaxy inputs: set to Block inputs
outputs: set to Block outputs
name: Block name
function: nil
parameters: nil
insideInfo: nil This is followed by creating a new instance of DisplayGalaxy and copying the DisplayBlock instance variables to the DisplayGalaxy instance variables. The Universe "blocks" dictionary is updated by replacing the Block that was changed to the new Galaxy.

Invoke internal editor block 254 (FIG. 34):

If the Block "insideInfo" instance variable is not nil, then the object this variable points to is called with the message "edit." It is assumed that any objects placed here know how to edit themselves.

Invoke parameter form fillout pane 251 (FIG. 34):

When the "set parameters" menu item is selected, the DisplayBlock "parameters" object (an instance of BlockParams) is given control to display and allow the user to edit the parameters. Upon "accepting" the modified parameters, a new list of current values is generated and stored in the Block "parameters" instance variable.

Define internal block functions 253 (FIG. 34):

Prompts for the name of the star routine to be called by BLOSIM when this block executes. The name of this star function is stored in the Block "function" instance variable.

Add an input to block 245 (FIGS. 34, 34a):

The cursor is changed to an input symbol and tracks the mouse until the red button is clicked inside a block (state 255). The input node is added to the ordered collection for Block "inputs" and DisplayBlock "inputs." The DisplayBlock "inputExtent" is recomputed to insure sufficient size is available to display the additional input. The block is then redrawn with the additional input added (state 256).

Remove an input from block 246 (FIGS. 34, 34a):

The cursor is changed to an input symbol with a superimposed X and tracks the mouse until the red button is clicked on an input symbol (state 257). The selected input node is removed from the ordered collection for Block "inputs" and DisplayBlock "inputs." The DisplayBlock "inputExtent" is recomputed to possibly reduce the size of the displayed block. The block is then redrawn with the input removed (state 258).

Label an input 247 (FIGS. 34, 34a):

The cursor is changed to the label input prompt and tracks the mouse until the red button is clicked on an input symbol (state 259). The user is prompted for a new name and the name of the symbol is changed (state 260). The name of the symbol is changed by modifying the name in the ordered collection associated with the selected input node for the Block "inputs" instance variable.

Add an output to block 248 (FIGS. 34, 34b):

The cursor is changed to an output symbol and tracks the mouse until the red button is clicked inside a block (state 265). The output node is added to the ordered collection for Block "outputs" and DisplayBlock "outputs." The DisplayBlock "outputExtent" is recomputed to insure sufficient size is available to display the additional output. The block is then redrawn with the additional output added (state 266).

Remove an output from block 249 (FIGS. 34, 34b):

The cursor is changed to an output symbol with a superimposed X and tracks the mouse until the red button is clicked on an output symbol (state 267). The selected output node is removed from the ordered collection for Block "outputs" and DisplayBlock "outputs." The DisplayBlock "outputExtent" is recomputed to possibly reduce the size of the displayed block. The block is then redrawn with the output removed (state 268).

Label an output 250 (FIGS. 34, 34b):

The cursor is changed to the label output prompt and tracks the mouse until the red button is clicked on an output symbol (state 269). The user is prompted for a new name and the name of the symbol is changed (state 270). The name of the symbol is changed by modifying the name in the ordered collection associated with the selected output node for the Block "outputs" instance variable.

Figure 35:
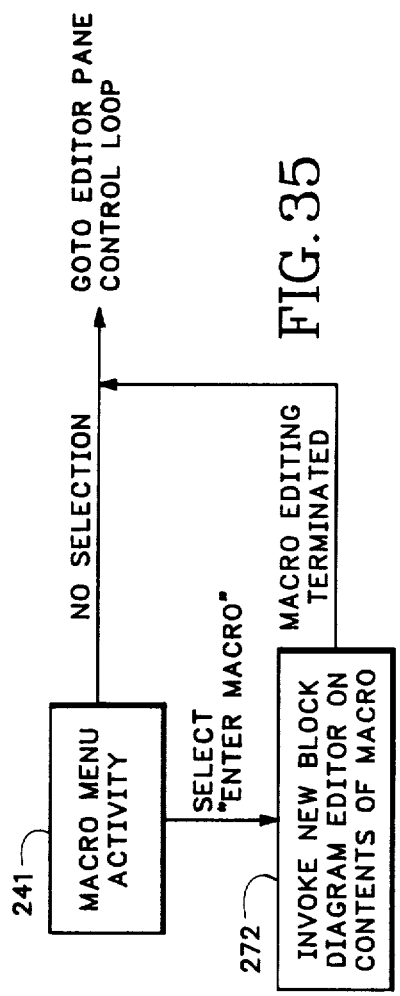
FIG. 35 is a state diagram of the "macro menu activity" state in FIG. 33.

3.4.2.2 Macro Menu Activity 241 (FIGS. 33, 35)

The macro menu activity state 241 is entered when the cursor lies within a macro block instead of a normal block. Entering this state brings up a one item pop-up menu for entering the macro. If this item is selected, a block diagram editor is invoked on a copy of the macro (state 272). After making changes to the macro with the editor, the user "accepts" the changes with the yellow button in the editor pane, which causes the copy of the original macro to be saved as the macro (described in the macro BlockEditor menu activity in FIG. 36). The macro block editor is then closed with the blue button pop-up entry "close."

In invoking the block editor on the macro, the macro must first be converted to the object Universe. This is done by creating a new instance of Universe with the instance variables set to:
- blocks: copy of the Galaxy blocks dictionary
- connections: copy of the Galaxy connections dictionary
- dataDisplays: dictionary of block name in the macro
- savedBlocks: CannedBlocksList
- listIndex: nil
- onGalaxy: true
- currentGalaxy: pointer to the current macro being expanded
- modelPtr: pointer to parent Universe

Figure 36:
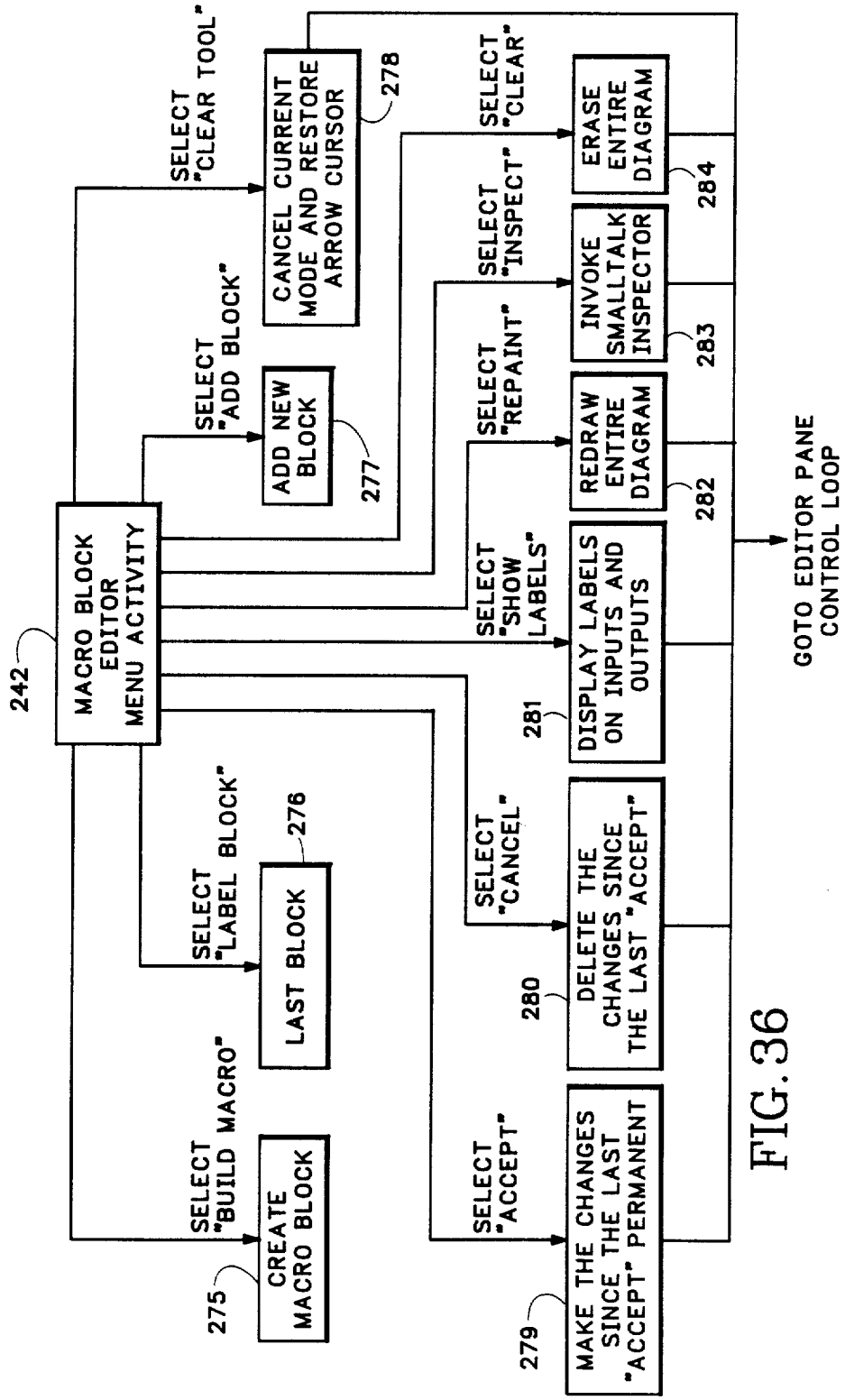
FIG. 36 is a state diagram of the "macro block editor menu activity" state in FIG. 33.
Figure 37:
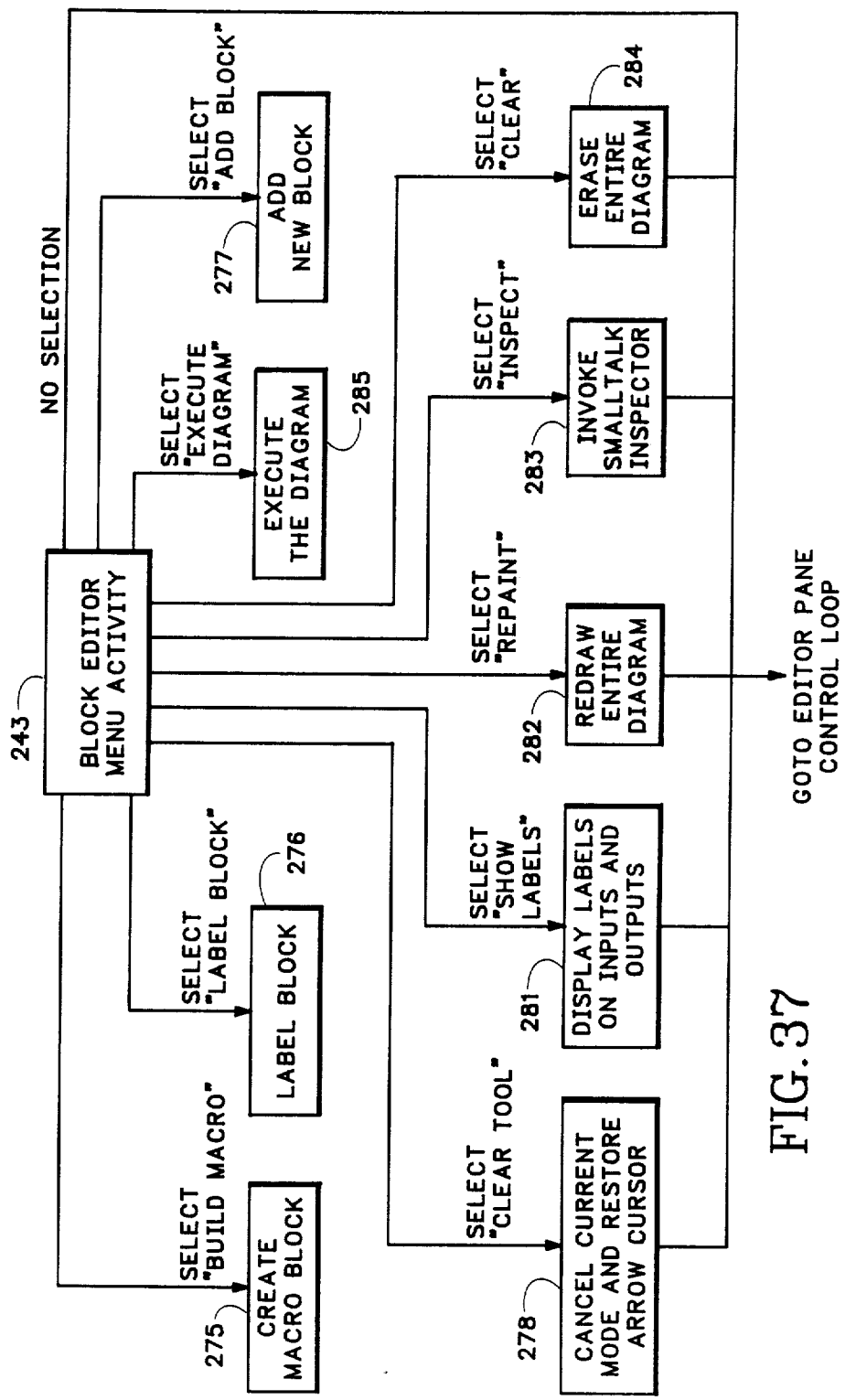
FIG. 37 is a state diagram of the "block editor menu activity" state in FIG. 33.

3.4.2.3 Macro BlockEditor Menu Activity (FIGS. 33, 36) and BlockEditor Menu Activity 243 (FIGS. 33, 37)

The BlockEditor Menu Activity States 242 and the Macro BlockEditor Menu Activity States 243 are nearly identical. The "Execute diagram" state 285 in the BlockEditor Menu Activity (FIG. 37) is replaced with the "accept" 279 and "cancel" 280 states (FIG. 36). The activities that are common to both states 242, 243 are first described, followed by the dissimilar activities.

Figure 37A:
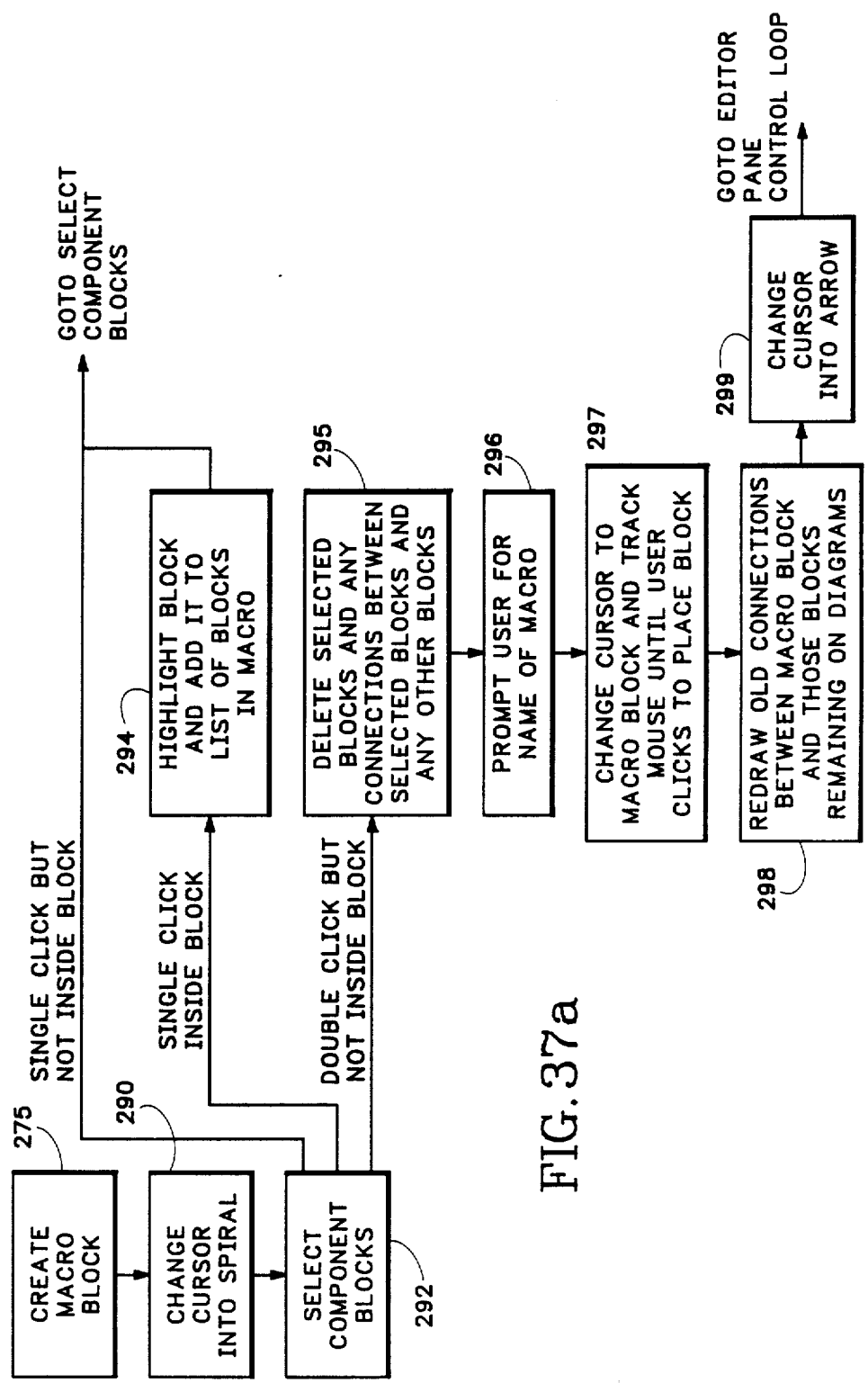
FIG. 37a is a state diagram of the "create macro block" state in FIGS. 36 and 37.

Create macro block 275 (FIGS. 36, 37, 37a):

Referring to FIG. 37a, the cursor is changed to a spiral (state 290) and a new instance of a Galaxy is created with instance variables (blocks, connections and ioConnections) set to nil. Blocks to be included in the macro are selected and added to the Galaxy "blocks" instance variable (state 292, 294). Once the selection process is complete (i.e., double click not inside a block) the connections between selected blocks are transferred to the Galaxy "connections" dictionary and connections between macro blocks and other blocks are transferred to the Galaxy "ioConnections" dictionary. The selected blocks and associated connections are deleted from the Universe "blocks" and "connections" dictionary (state 295). A name for the macro is obtained from the user (state 296) and stored in the Galaxy "name" instance variable. The user then positions the macro in the editor pane (state 297). The macro is then added to the Universe "blocks" dictionary. This operation is followed by reconnecting the connections between external blocks and the macro (state 298) and then resetting the cursor to normal mode (state 299).

Figure 37B:
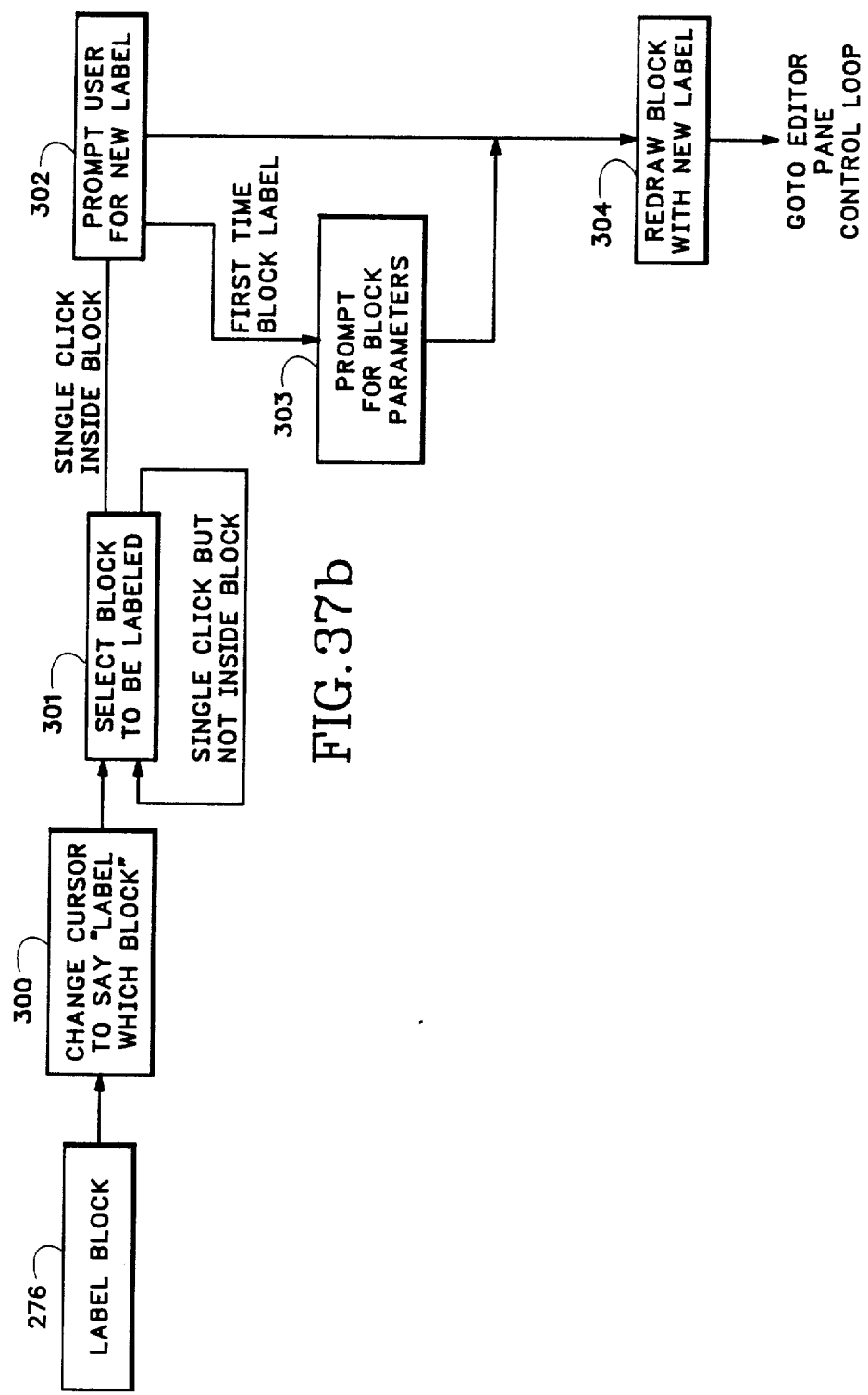
FIG. 37b is a state diagram of the "label block" state in FIGS. 36 and 37.

Label block 276 (FIGS. 36, 37, 37b):

Referring to FIG. 37b, upon entering state 276, the cursor is changed to "Label which block" (state 300). A loop is entered until the user selects a block (state 301). At the prompt for the new label (state 302), the new label is read.

If this is the first time the block has been labeled (i.e., it is a new block), then the block parameters are prompted for. An array of strings is displayed in an editing window in which standard Smalltalk editing facilities are used to construct a list of parameters and their initial values. A simple template is used for the parameter name and default value (see Section 3.2.1). Upon completing the parameter definitions, a new instance of BlockParams is created with:
- template: set to the user generated list
- displayBlock: points to the DisplayBlock in which these parameters are associated The DisplayBlock "parameters" instance variable is loaded with a pointer to this instance of BlockParams. The Block "parameters" instance variable is loaded with the default parameter values.

From the new block label a new DisplayBlock "labelExtent" is computed. The displayBlock extent is then set to the maximum of "inputExtent," "outputExtent" and "labelExtent." The block is then redrawn at its current position.

Add new block 277 (FIGS. 36, 37, 37c):

Referring to FIG. 37c, in state 277, a new instance of Block and DisplayBlock are created with the instance variables set to the following:

| Block | | |
|---|---|---|
| | inputs: | empty ordered collection |
| | outputs: | empty ordered collection |
| | name: | nil |
| | function: | nil |
| | parameters: | nil |
| | insideInfo: | nil |
| DisplayBlock | | |
| | position: | nil |
| | form: | default rectangle |
| | extent: | default size of block |
| | myBlock: | pointer to just created Block |
| | inputs: | empty ordered collection |
| | outputs: | empty ordered collection |
| | label: | nil |
| | inputExtent: | default size of block |
| | outputExtent: | default size of block |
| | labelExtent: | default size of block |
| | parameters: | nil |

The cursor is changed to an unlabeled rectangle (state 305) and tracks the mouse until the red button is clicked. If there is no space for the block, an error message is issued and the process repeated (state 306). If there is space available for the block, it is placed at the current location (state 307) and the DisplayBlock "position" is set to the current cursor location. This newly created block is added to the "blocks" dictionary for the Universe and the DisplayBlock is added to "dataDisplays" dictionary for the Universe.

The display block form, size and appearance is determined from the number of inputs, the number of outputs and the label. The size of the form is always adjusted so that sufficient room exists for all inputs to neatly fit on the left edge of the block, all outputs to neatly fit on the right edge of the block and the label to be centered in the block. Any time the number of inputs, number of outputs or the label is changed, the DisplayBlock "Extent" is determined from the maximum of the "inputExtent," "outputExtent" and "labelExtent." A new DisplayBlock "form" is created with a rectangle drawn within it, the label properly centered and all inputs and outputs evenly spaced on the form.

Cancel current mode and restore arrow cursor 278 (FIGS. 36, 37):

In state 278, the current mode is canceled by deselecting any blocks by setting Universe "listIndex" to nil. The cursor is set to normal (arrow) by setting BlockEditor "form" to the arrow cursor.

Make changes since last "accept" permanent 279 (FIG. 36):

In state 279, changes to a macro are made permanent by selecting the "accept" yellow button Macro BlockEditor Menu item. When this action is invoked, information in the macro (Galaxy) pointed to by Universe currentGalaxy is updated to:
 Galaxy blocks: set to a copy of current Universe blocks
 Galaxy connections: set to a copy of current Universe connections
 Galaxy ioConnections: set to an ordered collection of the current unconnected inputs and outputs.

Delete the changes since the last accept 280 (FIG. 36):

In state 280, changes made to a macro while in a block editor can be canceled by selecting the "cancel" yellow button Macro BlockEditor Menu item. When this action is invoked, information in the current Universe is reset to the macro (Galaxy) information pointed to by currentGalaxy in the following manner:
 Universe blocks: copy of the Galaxy blocks dictionary
 Universe connections: copy of the Galaxy connections dictionary Display labels on inputs and outputs 281 (FIG. 36, 37):

In state 281, for each block in the Universe "blocks" dictionary, the name of each block input (from Block "inputs" ordered collection) and output (form Block "outputs" ordered collection) is displayed next to the block input and output locations on the display.

Redraw entire diagram 282 (FIGS. 36, 37):

Erases the BlockEditor pane, then displays each block in the Universe "blocks" dictionary followed by a display of each connection in the Universe "connections" dictionary.

Erase entire diagram 284 (FIG. 36, 37):

The BlockEditor pane is erased followed by setting the following Universe instance variables:
 blocks: empty dictionary
 connections: empty dictionary
 dataDisplays: empty dictionary
 listIndex: nil Execute the diagram 285 (FIG. 37, 38):

The operation of state 285 is described in Section 4.0.

Figure 31:
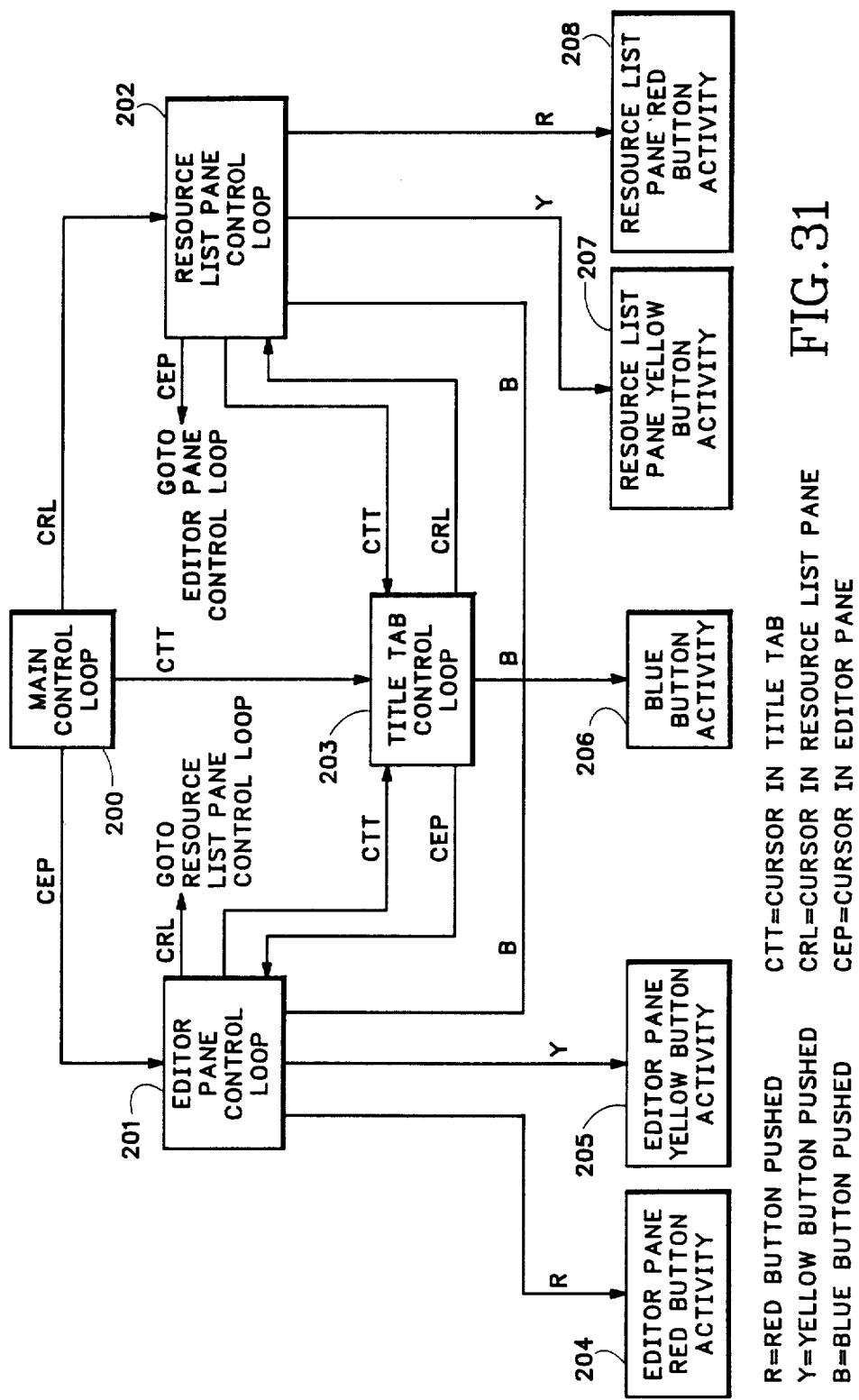
FIG. 31 is a top level state diagram for the block diagram editing software utilized in the invention.
Figure 39:
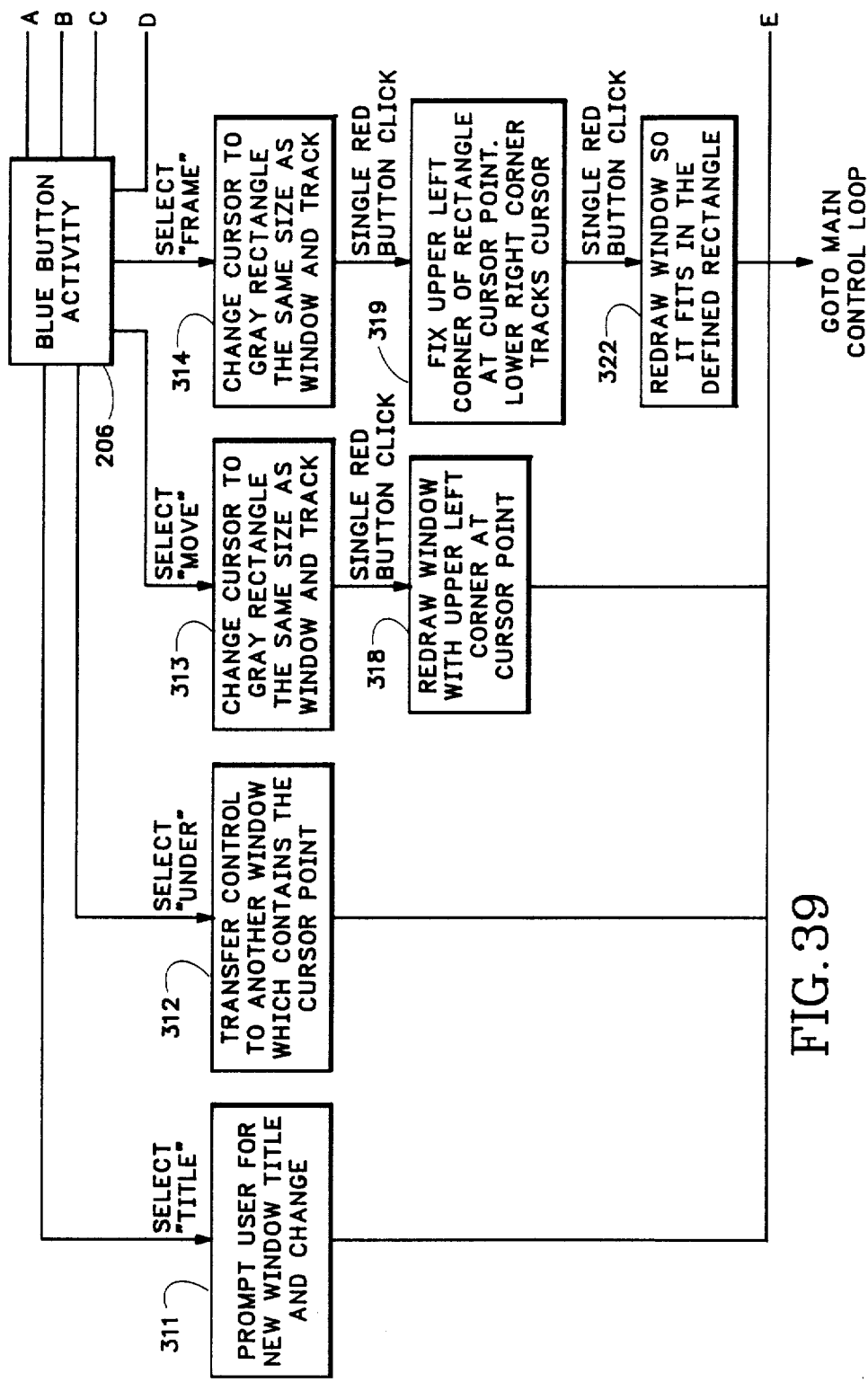
FIG. 39 is a state diagram of the "blue button activity" state in FIG. 31.
Figure 39:
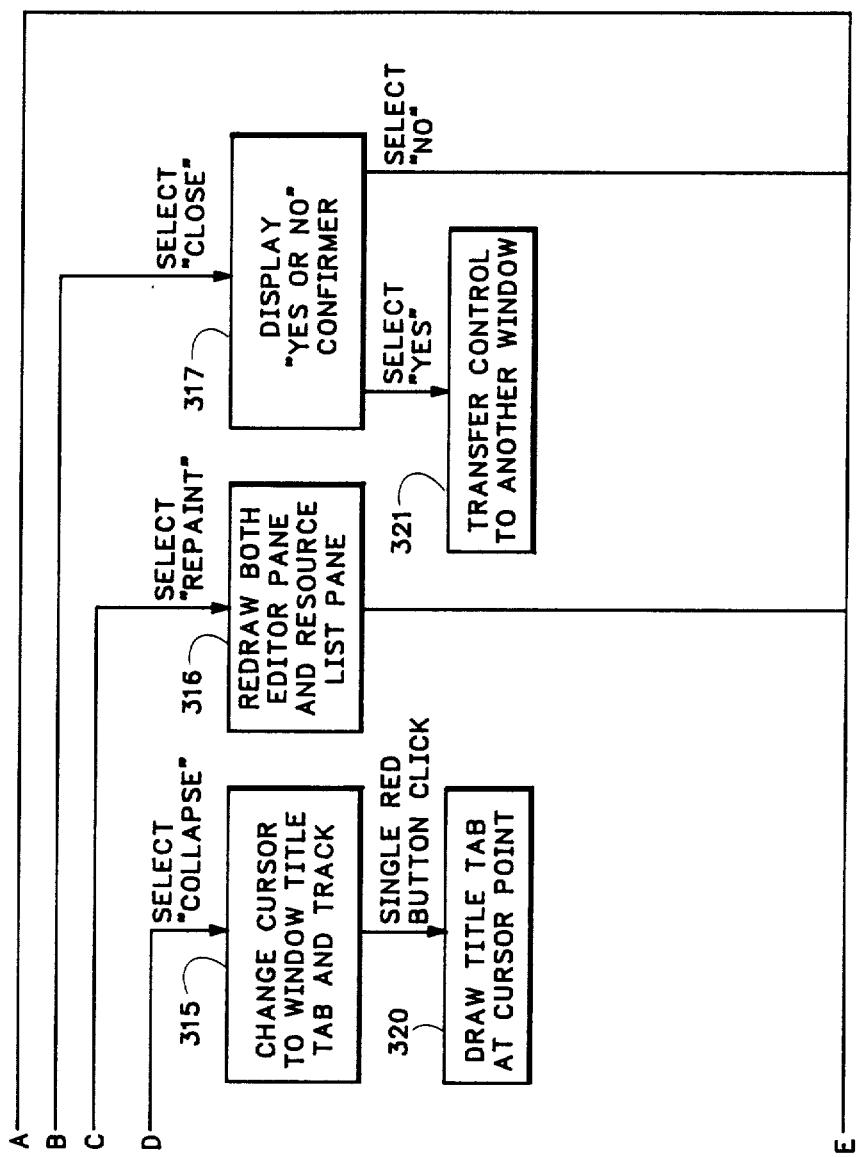

3.4.3 Blue Button Activity 206 (FIGS. 31, 39)

This activity is the conventional blue button activity for Smalltalk windows.

3.4.4 Resource List Pane Yellow Button Activity 207 (FIGS. 31, 40)

Referring next to FIG. 40, when in the Resource list pane 106, pressing the yellow button menu brings up a pop-up menu. The pop-up menu has one entry in it: "remove entry." Selecting this entry and releasing the mouse button will cause a selected item in the resource list to be removed. If no item is selected, then the action is ignored. Removing an item from the resource list is accomplished by deleting the selected item from the dictionary in the Universe savedBlocks instance variable. Once it is deleted, the modified list is redisplayed.

3.4.5 Resource List Pane Red Button Activity

Referring to FIG. 41, while in state 208 the red button is used to select items in the resource list for placement in the editor pane 106. When an item is selected (state 330), the following information is established:
 Universe listIndex: set to the index of the selected menu item
 BlockEditor form: set to the form of the block from DisplayBlock of the selected block
Similarly, if a item is de-selected (state 332):
 Universe listIndex: set to nil
 BlockEditor form: set to the normal (arrow) cursor
The Smalltalk environment provides the basic methods needed to highlight items in the resource list (state 331).

4.0 COMPONENTS OF THE EXECUTION MANAGER

This section describes the major components of the execution manager in eater detail with reference to FIGS. 3, 3c and 4. Referring first to FIG. 3c, the execution manager consists of several major components. Beginning at "execute diagram" block 350, these are:

The diagram scanner 352—which reduces the program represented by a block diagram to a netlist of blocks and connections.

The netlist interpreter 354—which reads the netlist and executes its meaning.

The block functions 368—which implement the meaning of the blocks in a block diagram.

The server/display controller 362—which monitors and handles the interprocess communication from the block functions to the Smalltalk process, storing and retrieving information in display memory 86.

The data display objects (see FIG. 3)—which receive and display data that is channeled through the server 362 from memory 86. Although the data display objects are created and managed by the execution manager, they may alternatively be classified as components of the user interface, as shown by blocks 85, 89 and 91.

The diagram animator—which binds the actual execution of a block function with the display of a given block in a diagram. This function, whose operation is shown in FIG. 4, is embedded in server 362 and block 85. These major components are described below.

4.1 The Diagram Scanner

The diagram scanner 352 is initiated when the "execute diagram" pop-up menu item is selected from the block editor's middle mouse button menu. The menu selection results in a call to the BlockEditor method or routine executeDiagram which initiates an execution cycle. First, the block diagram is checked for validity. A diagram is considered valid if all block inputs and outputs are properly connected. If all blocks are not properly connected, an error message is displayed on the screen and the execution cycle is terminated.

If the current diagram is valid, the execution cycle continues. At this point, the C process (which contains the netlist interpreter and the block function code) is forked as a child process of the Smalltalk process and the two interprocess communication channels (pipes) are established. One pipe 98 is used for the Smalltalk process to send information (netlist, etc.) to the C process and the other pipe 99 enables information transfers from the C process to the Smalltalk process.

Once the communication channels are established, the mainline of the recursive diagram scanner 352 (BlockEditor method expandMacro) is called. The term "macro" is used to denote a collection of connected blocks represented as a single block. The expandMacro method creates the netlist by recursively expanding the internal structure of each of the blocks in a diagram. The recursion, in effect, "flattens out" a sequence of possibly nested macros into a list of block functions and their connections. Since a complete block diagram can be thought of as a single block, the data structures constituting the entire block diagram are sent to expand-Macro to begin the expansion.

The internal structure of the expandMacro method is as follows. First, each block in the internal structure of the block being expanded is examined. If it is a macro itself, a recursive call is made to expandMacro to expand its internal structure. If not, the block represents a single block function and information about the block is sent down the pipe 98 to the netlist interpreter. The information sent is the block's name (same as its label in the diagram), the block's function (a string that informs the interpreter which block function to execute on the block's behalf) and the static parameters of the block (e.g., dc offset, frequency, etc. for a sinewave generator block).

When all the block information for a particular level of recursion has been sent, information corresponding to the connections of the blocks (at this level of recursion) is sent to the interpreter. Each connection is described by the names (labels) of the blocks at either end (as seen on the diagram) and the labels of its input and output. The description of the connections of the current macro with the previous level in the recursion is the last information sent for the given level.

The keyword "END" is sent to the interpreter when the complete netlist for each expanded macro has been sent. When the "END" corresponding to the entire diagram has been sent, the netlist expansion is complete. At this point, there is a return from the original call to expandMacro and the executeDiagram method once again has control. Its last action is to call the BlockEditor method server, which will monitor communications via pipe 99 from the C process. A description of the server follows the description of the netlist interpreter and the block functions.

4.2 Netlist Interpreter and Block Functions

The netlist interpreter 354 provides the ability to execute the meaning of a netlist. It is essentially a control program that schedules, executes and monitors the execution of the block function application code.

The interpreter is based on the block simulation program called IBLOSIM (for Interactive BLOck SIMulator) which is built up around the block simulator (BLOSIM) program developed at U.C. Berkeley by David Messerschmitt. BLOSIM, indicated in FIG. 3c by block 356, requires that the topology and block parameters be specified at compile time. Each time a change is needed in the topology, a source code file must be edited, recompiled and re-linked into an executable module. In contrast, IBLOSIM allows specification of the topology and parameters as a stream of ASCII text, i.e. a netlist.

As used in the netlist interpreter, IBLOSIM includes a module 354 which reads a stream of ASCII text describing the diagram's topology and block parameters and makes this information available to BLOSIM for establishing the required internal topology. It also includes driver modules 366 that read in and interpret parameters for each block, thus preparing function calls for the block's execution by BLOSIM. Changing the topology or parameters only requires construction of the appropriate text stream or netlist. Recompilation or relinking of a source code file to form an executable module is unnecessary.

The block functions 368 contain the application code for each block and are equal to "stars" in BLOSIM terminology. A macro (called a "galaxy" in BLOSIM terminology) is therefore represented by one or more block functions. More specifically, a block function is unique data space for information about a particular block and the C code that implements its functionality. The C code includes the "block function driver routine" and the "block function routine." A listing of a typical block function appears in APPENDIX F and descriptions of the block functions available in the resource list pane 106 are contained in TABLES 1, 2 and 3.

The interpreter 352 reads the block name, function and connection information sent by the diagram scanner 352. The first time each block name is encountered, a block function is created by block initialization procedure 358. This procedure sets up a data field in data storage 94 for the called block function, the code for which is stored in block 368. The interpreter passes control to the corresponding block function driver routine, which is responsible for allocating the data area for this block function and reading and storing any parameters that may follow in pipe 98. When the driver exits, it returns control to the interpreter to read more block names or connection information.

After all the blocks in the diagram are processed, the interconnections are processed by "generate connection list" block 360. This procedure uses the netlist interconnect information to define data flow channels between the data fields set up in the execution data storage 94.

When the netlist has been completely processed, the interpreter 354 schedules and executes the application through BLOSIM 356. It continues to pass control to the various block function routines until the execution is complete.

Referring to FIG. 4, as the block functions execute, they may communicate, via the pipes 98 and 99, with the Smalltalk process. This is done by message server/display controller 362 (FIG. 3c), which includes interface software to communicate between the C process and the Smalltalk process. The interpreter itself sends some messages to the Smalltalk process directly. The legal data and message transfers are each described below. The action taken by the Smalltalk process upon receipt of each message is discussed in detail in the next section.

All current block functions request that their corresponding display block in the block diagram be set to reverse video while they execute. BLOSIM 356 notifies the message server/display controller 362 when a block function is about to commence execution, and again when it is finished. The keyword "invert" is sent to the Smalltalk process by each block function along with the display block's name. The server/display controller 362 channels this request to the display block code that performs the "inversion." The inversion code responds by sending the block function a signal (the character '@') that the display block has been inverted, at which point the block function continues executing.

An error may occur during the execution of a block function. The block function can report the error by sending the keyword "error" to the Smalltalk process followed by an error message. The server intercepts "error" and causes the message to be displayed.

Various block functions also report the results of an execution. These results typically take two forms. One form is a waveform (essentially as an array of elements). A block function may communicate a waveform to the Smalltalk process by sending the keyword "graph" down pipe 99. The server reads this and enables an appropriate data display object to read additional data from the block function, including values that parameterize the waveform data (scale factors, units, etc.) and the waveform data itself.

The keyword "digitizer" can also be used to send a waveform to the Smalltalk process. This keyword produces similar results to "graph," but can be manipulated during execution to modify the acquisition window of data returned, as described above.

The other form is a scalar value (such as a waveform maximum value). A block function can send a scalar to the Smalltalk process by sending the keyword "scalar" down the pipe 99 followed by the value to display. The server/display controller 362 again reads the keyword and a data display object is caused to display the value.

As mentioned above, the interpreter also talks directly to the Smalltalk process. This communication is necessary to implement the animation of "macro" display blocks as further discussed in the next section.

4.3 The Server/Display Controller, the Data Display Objects and Diagram Animator The server/display controller 362 (or simply "server") is the portion of the Smalltalk process that handles all transmissions from the C process. As mentioned above, the server is given control when the diagram scanner has finished sending the netlist to the interpreter. The server recognizes and acts upon the following keywords: "graph," "scalar," "error," "digitizer," "invert," "disarm" and "arm".

The keywords "invert," "arm" and "disarm" all pertain to diagram animation. The server reads the "invert" keyword followed by the name of the block within the block diagram that is to be set to reverse video. The BlockEditor method invertDisplayBlock performs the actual inversion. When read by the server, the keyword "arm" results in a call to the BlockEditor method armMacro. This keyword is also followed by the name of the block (a macro in this case) that is to be inverted. The next inversion request, from a block that is part of the internal structure of the currently-armed macro, is dealt with in a special manner by BlockEditor method invertDisplayBlock. It causes the armed macro's display block to be animated (i.e., set to reverse video). Subsequent block inversion requests, from other blocks composing the macro, are ignored by invertDisplayBlock until the "disarm" keyword is received by the server, causing a call to BlockEditor method disarmMacro.

The keywords "graph," "digitizer," "scalar" and "error" all pertain to data display objects, which display the various bloc function results to the user. In addition to recognizing these keywords, the server is responsible for creating the data display objects and channeling the data from the block functions to the data display objects.

As a result of the diagram execution, the server might receive the keywrd "graph" followed by the name of the block function that wishes to have a waveform displayed. The server maintains a list of the current data display objects in display information storage 86. If no data display object by that name exists, the server creates one and gives it access to the communication channel so that it can read the waveform data. If the display object already exists, the server simply passes control to the object and does not create a new one.

The "scalar" keyword results in the same scenario as above except a scalar data display object is created and/or given control.

The keyword "digitizer" (or another keyword corresponding to a physical instrument) accesses the signal viewing function 364, described in further detail in Section 5.0. The keyword "digitizer" acts like "graph" except the data display object has a special feature: it knows how to directly access the parameters of the corresponding display block in the original block diagram. Therefore, a block can be re-parameterized and the diagram re-executed without returning to manipulate the original block diagram.

The "error" keyword differs from the other keywords in that its corresponding data display object (the "errorLog") is used by the entire diagram (versus the individual block association of the other display objects). The server creates the "errorLog" when the first error message is encountered from any block and channels all subsequent error messages (from any block) to the "errorLog."

4.4 Interprocess Communication Formats

The interprocess communication has been described in general terms in the previous sections. This section describes the data communication formats in more detail.

The block editor maintains the parameters for each block in a given diagram essentially as an array of strings (i.e., character arrays). The fields of the block and connection data structures that are accessed by the diagram scanner are also strings. The diagram scanner currently does no conversion of these fields. Therefore, the entire netlist is seen by the C process as a stream of ASCII text.

The netlist interpreter and the block functions use standard C language I/O routines to access the Smalltalk-to-C pipe [The C fscanf() function is used]. White space characters in the pipe stream are seen as delimiters by the standard I/O routines. Therefore, parameters, block names, etc. may not contain blanks, tabs, carriage returns, etc.

ASCII transmission of waveform data to the Smalltalk process, however, is prohibitively slow. Therefore, C-to-Smalltalk pipe communication uses binary transmission for waveform data and other numeric values [the C fwrite() function is used for binary data] and uses ASCII transmission for string data [the C fprintf() function is used for character data]. The diagram animation handshaking is also currently implemented using standard I/O routines. Interprocess signaling is an alternative that may be used.

An operative system as described above has successfully demonstrated execution of signal processing and data acquisition built using the block editor. Due to the use of BLOSIM, however, the multiple process, multiple language design of the Execution manager was, to some extent, expedient rather than chosen. In addition, the functionality of the Execution manager (and the Experiment Manager as a whole) is currently restricted by the BLOSIM paradigm: an execution cycle using BLOSIM is essentially a "batch" operation. Since the data generation capabilities and the data display capabilities of the system currently reside in separate processes, the interprocess communication of waveform and other data is necessary and represents a considerable overhead. Binary pipe communication (versus ASCII) for interprocess transfers of waveform data is used to improve performance.

Several design alternatives exist, however, that could result in further improved performance. For one, the display operations in the system could be performed directly by the block functions. The user interface would need to orchestrate the display, but waveform data transfers would be eliminated. Another alternative would be a single language/single process port, eliminating netlist and waveform data transmission altogether. Waveform data areas could be directly accessed by all parts of the system.

Additional design alternatives exist for other aspects of the Execution manager. The diagram scanner is currently activated only when a diagram is complete. Alternatively, the scanner could be active during the diagram construction phase. The netlist would thus be complete and ready for shipment or use when a diagram is executed. Along the same vein, the netlist interpreter could be replaced by an incremental compiler that emits the necessary object code as a diagram is constructed. This would eliminate the interpretation phase. Or, the interpreter could be made to execute portions of a block diagram as the user is constructing them. This would provide the user with immediate feedback at each ste of the construction process.

4.5 Block Function Building Procedure and Example

The next subsection describes how the general "star"-building techniques described in the above-referenced Messerschmitt BLOSIM paper have been modified to create the Experiment Manager's block functions. A C-code listing of a hypothetical example block function, with comments, is provided in APPENDIX F. The example block function has one input and one output and does no processing. It shows the basic features that are common to the Experiment Manager's block functions. The last subsection briefly describes the functionality of the current Experiment Manager block functions with reference to TABLES 1, 2 and 3.

4.5.1 Building a Block Function

The stars described in the BLOSIM paper communicate values (i.e., SAMPLEs) of a single simple type (type "long" integer in C terminology). The definition of SAMPLE was changed, for use as a pointer in the Experiment Manager, to be a pointer to a complex structure. This allows the block functions to communicate data of essentially any type to each other. See APPENDIX E for the definition of a SAMPLE.

The "type" field of the SAMPLE data structure allows each block function to check the type of the data it receives to verify that it is as expected. The current legal values of the SAMPLEs transmitted can be of type "short," "long," "int," "float," "double," "char *" (character string) or "WAVEFORM *" (pointer to a waveform) [For the definition of the WAVEFORM data structure, see file "wav.h" in Appendix C of "Signal Processing and Display Programs" manual (TEK Part No. 070-6168-00), published by Tektronix, Inc. (1986).].

The stars described in the BLOSIM paper typically read from and write to standard text files (or stdin and stdout). The Experiment Manager block functions use the pipe communication scheme described in Section 4.4. These block functions access the pipes through two global filenames defined as follows:

extern FILE *commandFile;
    extern FILE *responseFile;

where "commandFile" refers to the Smalltalk-to-C pipe. and "responseFile" refers to the C-to-Smalltalk pipe.

The user generated function "universe" in BLOSIM is replaced by the netlist interpreter 354 (FIG. 3c) which reads the topology description from the commandFile pipe. To properly handle star initialization, each star function has a star function driver routine (see "star example" in APPENDIX F). The star function driver routine takes care of reading the parameter data over the pipe and initializing the data storage area for the star.

The BLOSIM stars do not need to know their names. Each Experiment Manager block function, however, needs access to its name in order to communicate effectively with the user interface (reverse video animation, error logging, etc.). Therefore, each block function stores its own name in its data area when its driver routine executes.

Unlike the BLOSIM stars, each Experiment Manager block function calls the C function invertBlock() to request that its display block be set to reverse video. Function invertBlock() makes the reverse video request and waits for an appropriate signal from the Smalltalk process. The function is only called if the block function is about to execute its application code (e.g., create a waveform, access and process an input, etc.).

The BLOSIM star routines typically print error messages to stdout. Experiment Manager block functions use the special errorLog() function to report errors to the Smalltalk process.

4.5.2 Descriptions of Block Functions

The majority of the Experiment Manager's block functions perform signal processing functions. These block functions look very much like the example given in the previous section except various calls are made to a signal processing library approximately at the pointed indicated in the example. A brief description of these block functions is contained in TABLE 1.

Several of the Experiment Manager's block functions perform instrument control functions. These block functions use RS-232 communications to talk to a GPIB controller which, in turn, controls the actual instruments. A brief description of the instrument control block functions is contained in TABLE 2.

Several other block functions currently exist that do not fit into the above categories. These are described in TABLE 3. The Resource column of each table refers to the names given to the blocks in the resource list pane of the block editor. The Block Function column holds the actual string used to name the block function and block function driver routines. In many cases the Resource name and the Block Function name are the same. Several of the resources have multiple rows in the Inputs, Outputs and Comments columns. The different rows refer to different alternatives. For example, the "add resource" in TABLE 1 accepts three alternatives for its inputs and has corresponding output and comment fields. It accepts two waveforms as inputs or two scalars as inputs or a waveform as its first input and scalar as its second input.

5.0 SIGNAL VIEWING CONTROL

5.1 Functional Overview of Digitizer Control

Figure 42:
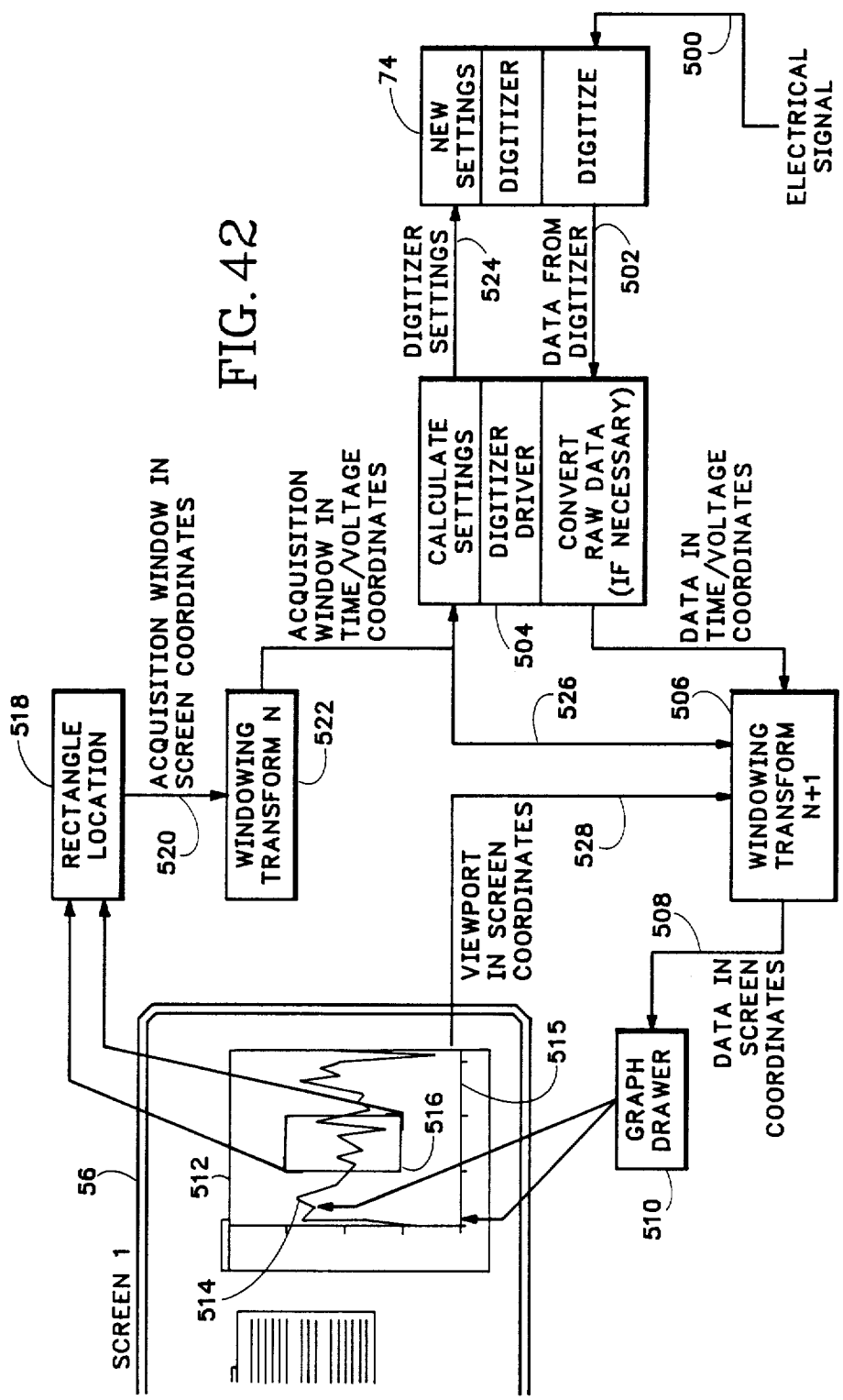
FIG. 42 is a functional block diagram of signal viewing control of a digitizer during block diagram execution.

Referring to FIG. 42, the system of FIG. 5 is illustrated in a functional block diagram to show digitizer, data flow and display screen operation during signal viewing control. When actuated with initial or default settings, the digitizer 74 receives an electrical signal in analog form from a device under test 76. The digitizer conventionally digitizes the analog signal and transmits raw digital data via communication path 502 to the digitizer driver 504. Path 502 comprises the three communications elements illustrated in FIG. 5. Raw digitizer data flows over the GPIB bus 66 to the transmission protocol converter 64. The raw data is transmitted over the RS-232 bus 62 to workstation 54.

Returning to FIG. 42, the digitizer driver converts raw data to time/voltage coordinates. Within workstation 54, programming, described in further detail below, performs a windowing transform, indicated by functional block 506, which transforms the data from time/voltage coordinates into screen coordinates. This data is then transferred as indicated by arrow 508, to a graph drawer, indicated by functional block 510. The graph drawer includes conventional graphing and CRT display control software, which causes a graphical representation of the electrical signal to be displayed in a window 512 on CRT display 56 as a waveform 514 on graticule 515.

Smalltalk-80 windowing and graphing software provides a capability of graphically defining a rectangular portion of a screen display. Conventionally, this software recalls from computer memory the data pertaining to the selected portion of the displayed waveform and displays such selected portion in enlarged format within window 512. The accuracy of the enlarged displayed waveform is limited, however, to the accuracy and resolution with which the electrical signal was acquired and digitized to provide waveform 514. Signal viewing control enables the user to overcome this limitation by reacquiring a new electrical signal and waveform to be displayed, by adopting rectangle 516 as specified by the user, as a desired acquisition window for controlling the digitizer to reacquire the electrical signal.

To do this, signal viewing control includes software, indicated by functional block 518 for establishing the location and size of the desired acquisition window. The window location is transmitted, as indicated by arrow 520, in the form of screen coordinates for the corner points of rectangle, to a windowing transform function, indicated by block 522. This windowing transform function converts rectangle 516 from the screen coordinate system to the time/voltage coordinate system of the signal, producing the acquisition window. This new window is output to the digitizer driver 504. Upon receiving the acquisition window in time/voltage coordinates, the digitizer driver calculates new digitizer settings and transmits these via communications path 524 over the GPIB bus to the digitizer.

Such coordinates are also input within the computer to windowing transform 506, as indicated by data flow path 526. Similarly, location and dimensions of display window 512 are input in the form of screen coordinates to the windowing transform as indicated by data flow path 528. These data are employed, as described hereinafter, in redefining the windowing transform of block 506 that is to be applied to the next set of digitized electrical signal data to be acquired.

Controlled by these new settings, digitizer 74 acquires a new electrical signal from the device under test, for a signal acquisition window that corresponds as closely to desired acquisition window 516 as the built-in setting options of the particular model of digitizer permit.

The electrical signal is acquired and digitized according to the new acquisition window. The digitized waveform is input to the workstation, being converted to time/voltage coordinates by the digitizer driver 504. The new data is processed through the windowing transform 506, as modified by the screen coordinates and time/voltage coordinates input via paths 526 and 528 and forwarded to graph drawer 510 for display on the screen. The new signal, which approximates that portion of waveform 514 within rectangle 516 but in greater detail, is then displayed in enlarged form within display window 512. The succeeding sections of this description describe the structure and operation of the preferred form of software for implementing the above-described system in greater detail.

5.2 Description of Digitizer Control Software

Figure 43:
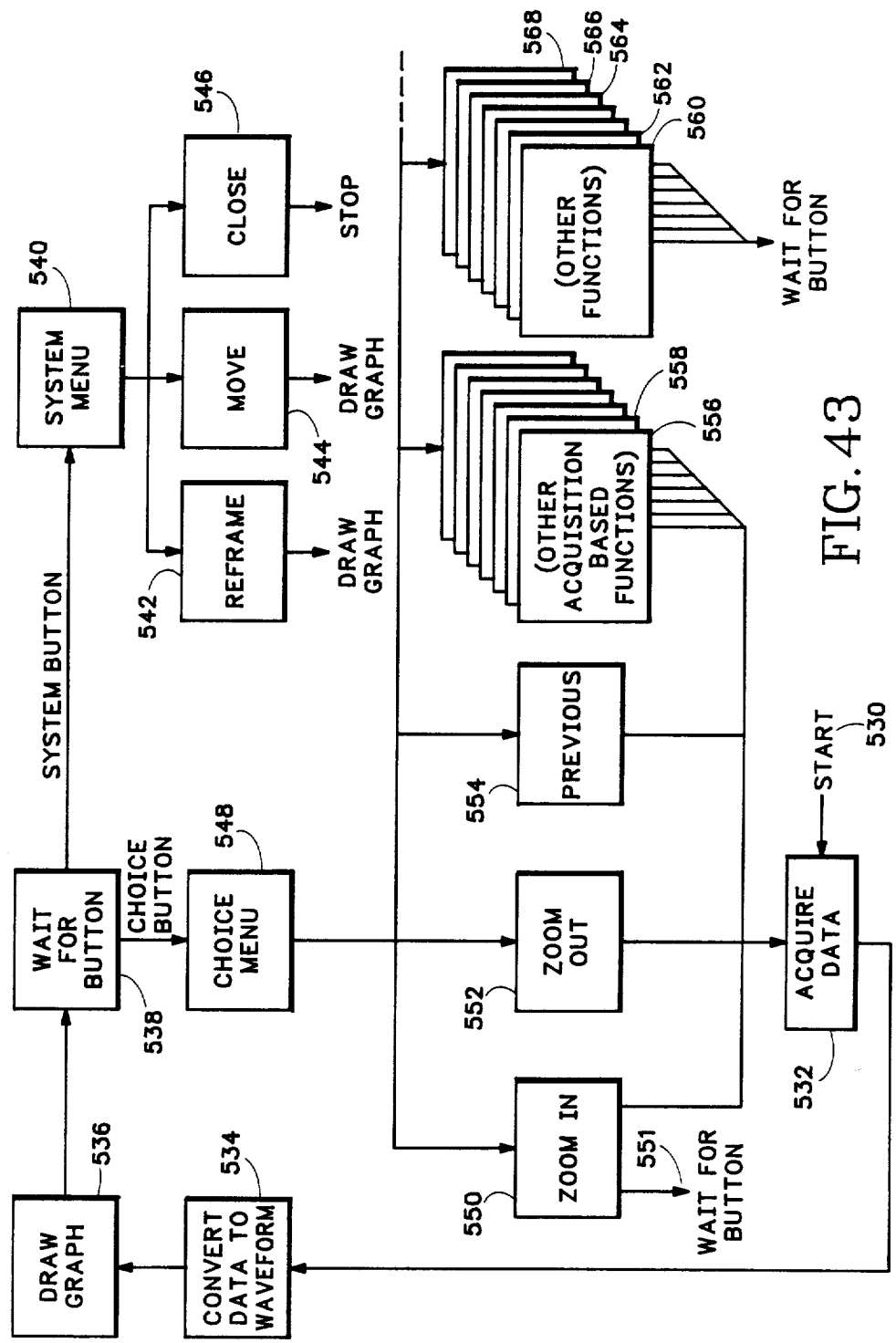
FIG. 43 is a top level state diagram of the procedure for signal viewing control.

FIG. 43 shows a top level state diagram for the signal viewing software. This description proceeds in the same manner as the foregoing general description, commencing with a program START 530, which enters the routine at an "acquire data" state indicated by block 532. Once initial data is acquired, control of the program shifts to the "convert data to waveform" state, indicated by block 534. Blocks 532 and 534 include the functions performed by the digitizer driver 504. Following conversion, the waveform data is input to a "draw graph" state 536. In this state, a graphing software module causes the waveform to be displayed on display screen 56. After displaying the waveform, program control is transferred to a "wait" state 538.

In the "wait" state, the computer waits for the user to depress one of the three control buttons on mouse 60. If the user presses the system button, program control switches to the system menu state 540. From this state, the user can select from among several conventional graphing software functions: a reframe function 542, a move function 544, and close function 546. Operation in the system menu state 540 is conventional and therefore need not be further discussed.

When the user selects the choice button on the mouse, this action causes conventional software to display a choice menu, as indicated by block 548. The choices displayed in the choice menu enable the user to select from among several options, to determine the choice of a signal acquisition window to be used by the digitizer 74 in acquiring and digitizing a next electrical signal data set.

The first choice is the "zoom in" state, indicated by block 550, operation of which was discussed above with reference to FIGS. 15-19. The second choice is the "zoom out" state, indicated by block 552, which enables the user to enlarge the signal acquisition window by a predetermined amount. Other states that the user may select include recalling a previous window stored in computer memory 34 (block 554) and "vertical" and "horizontal" states, indicated by blocks 556 and 558, which enable the user to control the signal acquisition window in a single dimension at a time. Similarly, the user can select a trigger level for the acquisition window (block 560), select a trigger slope (block 562), or perform other acquisition-based functions as called for by the particular kind of instrument being used.

All of these functions return to the "acquire data" state 532 upon execution. The "zoom in" state includes a "wait" state 551, which operates while the user is selecting a window size for rectangle 516. The rectangle coordinates are finally established by the user depressing the third, or pointing, mouse button to indicate the desired acquisition rectangle's origin, moving the mouse while holding the third button down until the desired rectangle has been indicated, and then releasing the button. This action returns the control to the "acquire data" state 532.

Additional, conventional control functions can also be provided on the choice menu, such as cursor control (block 564), delta cursors (block 566), save/use data control (block 568), and others as will be understood by those skilled in the art.

Figure 44:
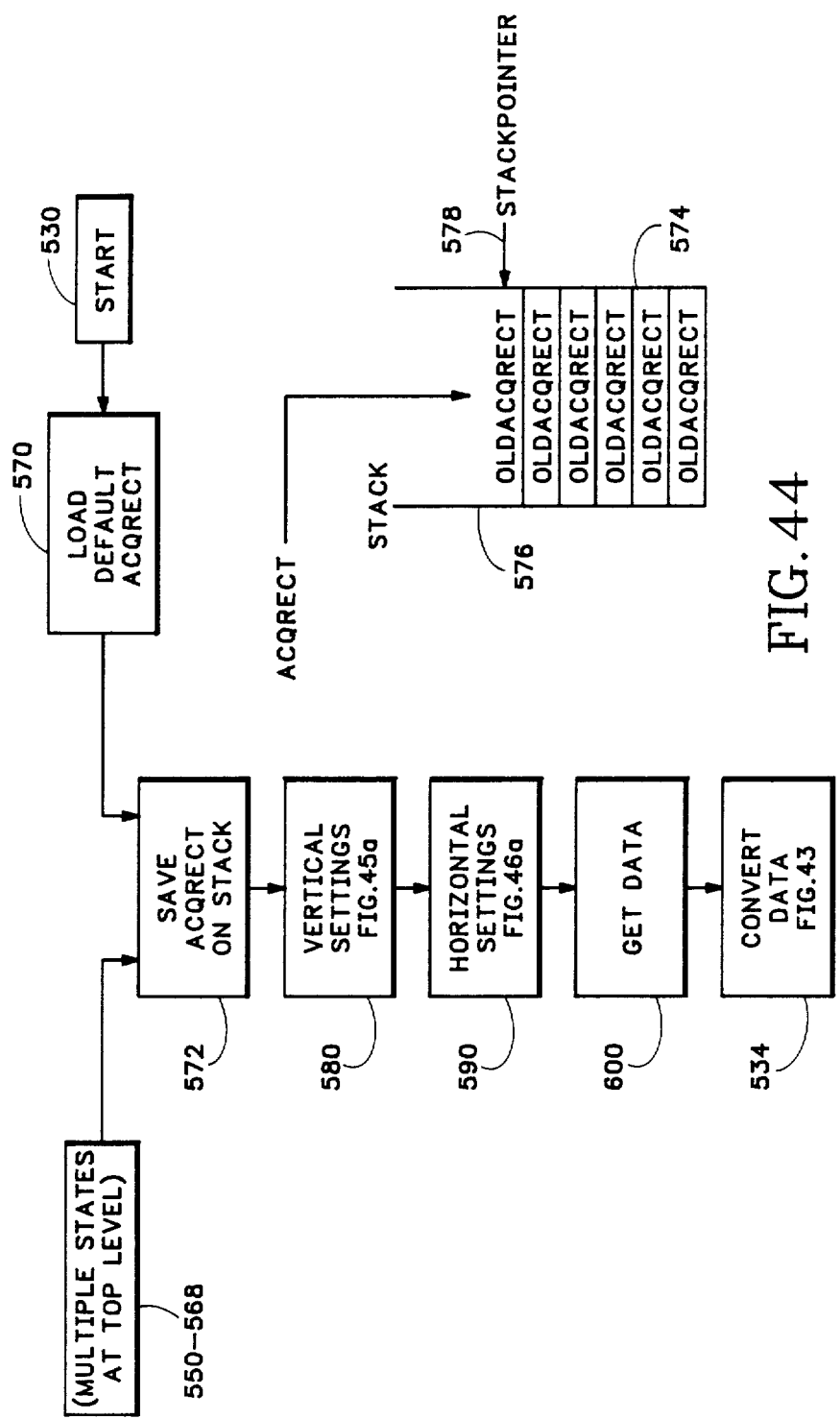
FIG. 44 is a state diagram of the "acquire data" state in FIG. 43.

FIG. 44 illustrates the "acquire data" state 532 in greater detail. Operation of the signal viewing program commences at START block 530. Upon startup, the first procedure is to load default settings for an initial signal acquisition window of the digitizer, as illustrated by block 570. These settings are saved by procedure 572, which inputs the settings as a first acqRect 574 into a push-down stack 576, operation of which is conventionally controlled by use of a stack pointer 578. The default settings are then input to a "vertical settings" state, which is illustrated in general by block 580 and in further detail in FIG. 45a. Once the vertical settings are established, program control is shifted to a "horizontal settings" state as shown generally in block 590 and in further detail in FIG. 46a.

Once the vertical and horizontal settings have been established, program control is shifted over to a "get data" state 600. In the "get data" state, the first step is a "send settings" procedure. In this procedure, the vertical and horizontal settings that were previously determined are sent to the digitizer via the digitizer driver, using the appropriate protocols for RS-232 and IEEE488 communications. These settings are embodied in computer-type commands formatted so as to be understood and implemented by the programmable digitizer. The digitizer responds by executing the commands and acquiring a new electrical test signal from the device under test for the signal acquisition window as specified in the settings commands. A portion of the electrical signal within the acquisition window is digitized in accordance with the settings and formatted for transmission as a digital data stream back to the computer. Next, a "read data" procedure causes the computer to acquire the digital data from the digitizer via the IEEE488 and RS-232 buses, with the appropriate protocol conversion being made by protocol converter 64.

Referring to FIG. 43, the acquired data is passed to a "convert data to waveform" state 534. In this state, the raw data from the digitizer, for the electrical signal acquired within the previously specified acquisition window, is transformed into a waveform data structure conforming to the requirements of the data formats required by the graphing software for displaying graphical data on display 56. Some models of digitizer return their data as an array of numbers scaled correctly to represent voltages, as well as returning information about the horizontal scale factor (time between elements), location of time 0 (or location in time of an array element), and the horizontal and vertical units of measure. For digitizers that behave in this manner, the "convert to waveform" procedure is not required.

The next step is the "draw graph" state 536, detailed in FIG. 43. In this state, the first procedure is an optional "draw raticule" procedure. This procedure draws a graph graticule 515 (FIG. 42), if required, and relabels the dimensions on the axis as necessary. The next procedure is "plot data." This procedure transforms each element of the waveform in the waveform data structure created by procedure 534 from waveform coordinates to screen coordinates. The screen coordinate points for the waveform are then displayed according to applications requirements, e.g., along graticule 515, within the boundaries of window 512 on display 56. An example of this software is included in the Tektronix Plot-10 TM software, which is commercially available.

After the new waveform is displayed, program control shifts to the "wait" state 538. A discussion of operation of the signal viewing software from "choice menu" state 548 is presented after a more detailed discussion of operation in the "vertical settings" and "horizontal settings" states.

5.3 Vertical and Horizontal Settings

Referring to FIG. 44, whenever the user specifies an acquisition rectangle 516 (FIG. 42), the computer needs to determine appropriate vertical and horizontal component settings to send to the digitizer. Any desired acquisition rectangle (AcqRect), such as rectangle 516 in FIG. 42, can be set to have a vertical component 516Y (FIG. 45b) and a horizontal component 516X (FIG. 46b).

A test instrument, such as a digitizer, is conventionally designed to provide a set of ordered vertical ranges, expressed in volts peak-to-peak and commonly called the range setting 602. A selected range has a center which is located relative to the origin (zero volts) by an amount of offset 604, conventionally expressed as a percentage, + or −, of vertical range. Finally, the test instrument is constrained to operate within a range of minimum and maximum offsets (minOffset 606 and maxOffset 608). An offset outside of this range would cause the range 602 to exceed the upper or lower limits of the instrument's operational capability.

A user of a manually-controllable test instrument typically manipulates the range and offset controls until the display "looks right." This is done interactively by changing the range setting to obtain the proper size of display of the desired signal and altering the offset setting whenever a change in the range setting causes a portion of the waveform to be lost above or below the signal viewing area. This kind of interactive control cannot conveniently be performed on a programmable test instrument, because of the need to translate changes in settings into computer commands for controlling the settings.

The present invention eliminates this difficulty by enabling the user to graphically specify the desired acquisition window 516, having a vertical component 516Y and a horizontal component 516X. By procedures 580 (FIG. 45a) and 590 (FIG. 46a), the system can automatically determine from the desired acquisition rectangle components, the vertical and horizontal component settings for the test instrument that best fit the desired acquisition rectangle.

Figures 45A, 45B:
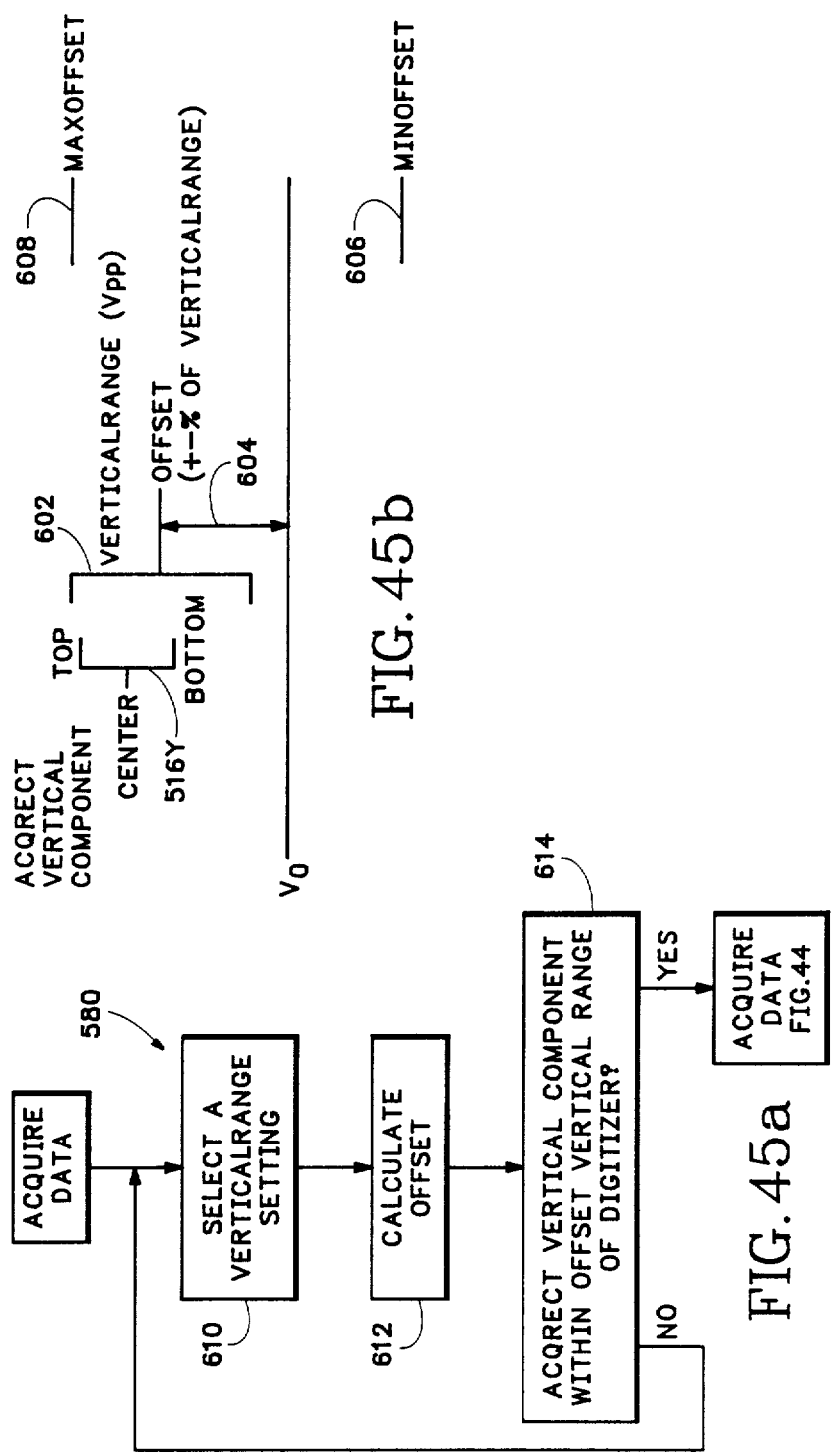
Figure 46B:
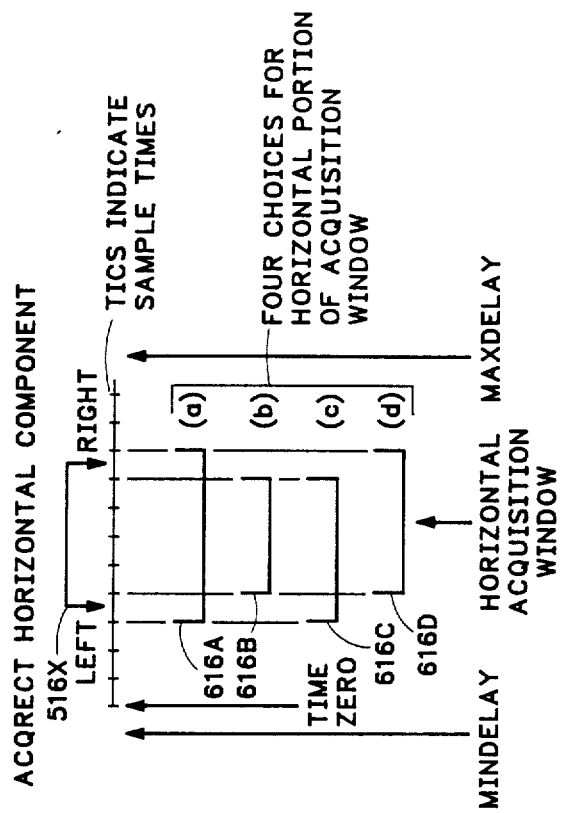
Figure 64A:
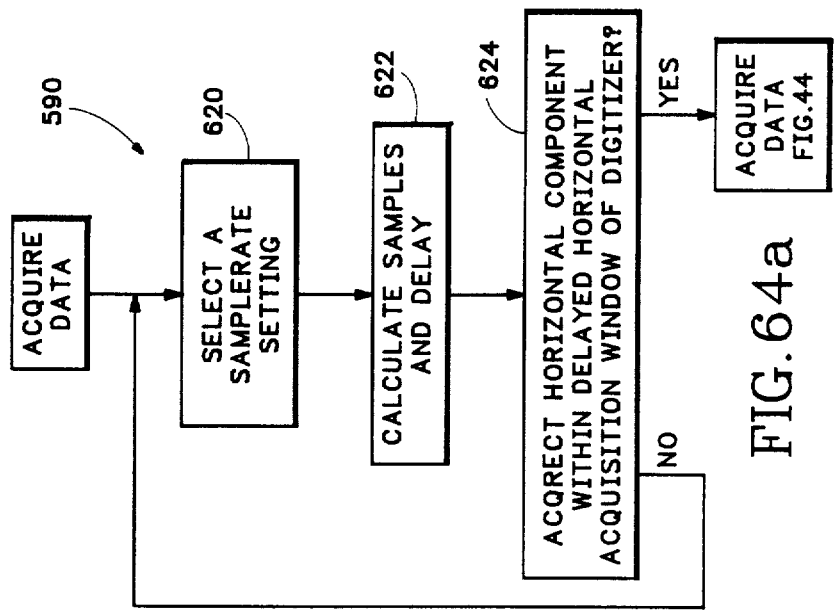

Procedure 580, shown in FIG. 45a, automatically determines the vertical settings for the test instrument that best fit the vertical component 516Y of the desired acquisition rectangle 516. The first step in the "vertical settings state 580" is to select from a prestored range table, a range setting, as shown by block 610. The next procedure, shown in block 612, calculates an offset value—within the limits of prestored minOffset 606 and maxOffset 608—that most nearly centers the range 602 around the acquisition rectangle's vertical component 516Y, without violating the minimum and maximum offset constraints of the instrument. The last procedure, shown in block 614, determines whether the selected range setting and calculated offset setting combine to encompass the desired acquisition rectangle vertical component 516Y. If they do not, and there remain range settings in the table to check, control is returned to block 610 and another range setting is selected and tested as described above.

Briefly, this procedure calls for choosing the smallest range setting in volts peak-to-peak and offset such that:
minOffset $\leq$ offset $\leq$ maxOffset ;
acqRect top $\leq$ range * offset/100 + range/2 ; and
acqRect bottom $\geq$ range * offset/100 − range/2.
If no combination of range and offset are adequate, the largest range setting should be used. Additionally, the user can be notified of this condition.

An operative example of software implementing the "vertical settings" state in Smalltalk-80 language in workstation 50 appears in the program listing of APPENDIX H. APPENDIX G lists the definitions of the signal viewing variables used above and in APPENDICES H and I. APPENDIX G also includes an example of default settings for the digitizer.

Referring to FIG. 46a, the "horizontal settings" state 590 similarly determines and sets the digitizer settings for the horizontal component 516X of the desired acquisition rectangle 516. As shown in FIG. 46b, four different horizontal digitizer windows can be established around the horizontal component 516X of the acquisition rectangle.

The first choice is a horizontal acquisition window 616A which completely encompasses the horizontal component 516X by including the sample point at or immediately before the earliest (or left) edge of the horizontal component and the sample point at or immediately after the latest (or right) edge of the horizontal component.

The second choice is a window 616B that encompasses the horizontal component by including the sample point at or immediately after the earliest (or left) edge of the horizontal component and the sample point at or immediately before the latest (or right) edge of the horizontal component.

The third choice is a horizontal acquisition window 616C that encompasses the horizontal component by including the sample point at or immediately before the earliest (or left) edge of the horizontal component and the sample point at or immediately before the latest (or right) edge of the horizontal component.

The fourth choice is a window 616D that encompasses the horizontal component by including the sample point at or immediately after the earliest (or left) edge of the horizontal component and the sample point at or immediately after the latest (or right) edge of the horizontal component.

Referring to FIG. 46a, the acquisition window's horizontal component is expressed in terms of a number of samples corresponding to the length of the acquisition window's horizontal component 516X, and a delay, also expressed as number of samples, of the beginning of the acquisition window from the origin (time=0). In FIG. 46b, the tic-marks along the horizontal axis indicate time intervals at which the test instrument takes samples. The typical test instrument has a set of available sampling rates and both a minimum and a maximum delay, all of which are provided to the computer for use in determining the horizontal acquisition window settings for the test instrument.

In FIG. 46a, the first step in "horizontal settings" state 590 is to select a sampleRate setting, as shown by block 620, from a prestored table of such settings available to the instrument.

The next procedure, shown in block 622, calculates a delay setting (i.e., within the prestored limits of min- Delay and maxDelay) to offset the beginning (or left) edge of the horizontal acquisition window of the digitizer with respect to the beginning (or left) edge of the desired horizontal acquisition window. This setting can be the sample immediately preceding or following the beginning of the desired horizontal component. The test used to select the exact value of delay depends upon the user's choice of horizontal component 616A, 616B, 616C or 616D.

Procedure 622 also calculates the total number of samples that would be produced, given the delay and sampleRate settings, and limits that number to a prestored value specifying the maximum number of samples to be taken, maxSamples. The test used to select the exact value of delay again depends on the user's choice of horizontal component 616A, 616B, 616C, or 616D.

The last procedure, shown by block 624, determines whether the selected sampleRate, the selected delay setting, and the calculated number of samples combine to encompass the desired acquisition rectangle horizontal component in the manner desired (i.e., window 616A, 616B, 616C, or 616D). If they do not, and there are sampleRate settings left to check in the table, control is returned to block 620 and another sampleRate setting is selected and tested, as described above. Otherwise, control is transferred back to the block 532 of the top level state shown in FIG. 43.

Briefly summarizing, this "horizontal settings" procedure calls for choosing the highest sample rate (i.e., most samples per second) such that:

minDelay < delay < maxDelay ;

samples < maxSamples ;

acqRect left > delay/sampleRate ; and acqRect right < delay + samples/sampleRate .

APPENDIX I is a program listing written in Smalltalk-80 language for the "horizontal settings" state, implementing horizontal acquisition window 616X. APPENDIX G defines the signal viewing variables used above and in APPENDIX I.

5.4 Operation in the Menu Choice State

Referring back to FIG. 43, after an initial signal has been acquired and a corresponding waveform displayed on the display screen, and the signal viewing program is in the "wait" state 538, the user can invoke the choice menu (block 548) by depressing the choice button on mouse 60.

Referring to FIG. 16a, an initial waveform for the AM Modulation Experiment has been acquired and displayed on display 56 within window 172. The dimensions of the initial acquisition window and graticule were set in accordance with the initialization or default settings of procedure 570 (FIG. 44). When the user presses the choice button on the mouse, a procedure 548 causes menu 173 to be displayed on the screen in the location of the mouse cursor. The menu displays a set of commands available to the user, the topmost one of which is initially highlighted. The user can change commands by moving the mouse and thereby the highlight down through the list of commands.

Selecting the first command invokes the "zoom in" state, as shown in FIG. 17. The first step in the "zoom in" state, is a "rectangle from user" procedure. This procedure is a standard Smalltalk-80 routine that prompts the user to designate a rectangle on the display screen which encompasses a portion of the signal of interest to the user. The prompt is in the form of a corner symbol initially positioned within window 512 on display 56. The user can locate the corner symbol anywhere on the display screen to designate, by pushing and holding down the mouse's pointer button, an upper left hand corner of a desired acquisition window. The location of this designated corner will be interpreted with respect to the acquisition window of the currently-displayed waveform, even if the designated corner is not within the boundary of the displayed window 172.

Next, by moving the mouse while holding down the pointing button, the user can move the lower right corner to form rectangle 174, which is highlighted or shaded on the display. When rectangle encompasses the portion of waveform that is of interest to the user, the user releases the mouse button. The designated area is then stored, in terms of screen coordinate system, as a variable screenRect.

Program control is then shifted to a procedure which compares the extent of variable screenRect with an arbitrary, prestored minimum value minimumZoomExtent. If the extent of the screenRect is less than this minimum value, control is passed to the "wait for button" state 551 (FIG. 43) to enable the user to designate another operation. This mechanism of checking for a very small rectangle prevents activity when the pointing button is inadvertently pressed and immediately released, and when the user wishes to cancel a "zoom-in" operation.

Operation of the "acquire data" state, as previously described, causes a new electrical signal to be acquired by the digitizer from the device under test and a new waveform to be displayed on display 56, as shown in FIG. 17a, in a modified graticule that displays the new coordinates for acquisition rectangle 174. Because the signal is reacquired by the digitizer, the waveform displays the signal features in substantially greater detail than the corresponding signal features for the waveform in FIG. 16a.

Routines 538 and 548 (FIG. 43) can be actuated by the user to again invoke the choice menu 173, this time selecting the "zoom out" state. In this state, the acquisition rectangle used in the prior operation is expanded by a prestored expansion factor expressed as a percentage of the horizontal and vertical components. After the zoom out settings have been determined and transmitted to the digitizer and by the computer, the digitizer obtains a third electrical signal from the device under test and returns the digitized version of such signal to the computer. The computer then displays the signal, as a waveform having a coordinate system that is modified to reflect the enlarged, zoom out acquisition window.

Again invoking menu 173, the user can designate and recall the "previous window," i.e., corresponding to the window of FIG. 16a. This procedure sets the acquisition rectangle, acqRect, equal to the last one stored in the stack 576, as shown in FIG. 44. A new waveform is then acquired from the device under test by the digitizer for the previous window. Essentially the same signal features are displayed but the waveforms are not necessarily identical. They can vary in both magnitude and shape and in delay position along the horizontal axis. This is because the new waveform is not merely a replay of data previously stored for the prior waveform but is a waveform for a signal newly acquired by the digitizer within the same acquisition window. This feature of the invention enables multiple tests of the same signal features to be run repeatedly, e.g., for comparative analysis.

The choice menu (state 548) can also be invoked to select the "horiz" procedure. The "horiz" procedure causes the test system to obtain a test signal within a signal acquisition window which has the same vertical component as the prior window, but has a horizontal component that is greatly extended in both the negative and positive directions relative to the signal feature shown. Selection of the "vert" command in menu 173 performs essentially the same expansion as "horiz" but in the vertical dimension.

From the foregoing description, it should be apparent to those skilled in the art that other programmable, two-dimensional signal acquisition instruments, such as a spectrum analyzer, can be similarly controlled. The same principles can also be applied to the control of programmable stimulus-type instruments, as summarized below.

5.5 Stimulus Instrument Control

Stimulus-producing test instruments (those producing electrical, mechanical, acoustical, etc. signals) often have more than one setting required to define their operation. When a combination of settings dimensions can be presented as a multi-dimensional graph, the settings thus represented may be adjusted simultaneously.

This multi-dimensional control is achieved by representing the values of the various settings as a single point in the multi-dimensional space. Control over the various settings is achieved by adjusting the position of a representation of that point in the space. An example of such control is presented in the following Power Supply Control description, FIGS. 47 and 48, and APPENDIX J.

Figure 49:
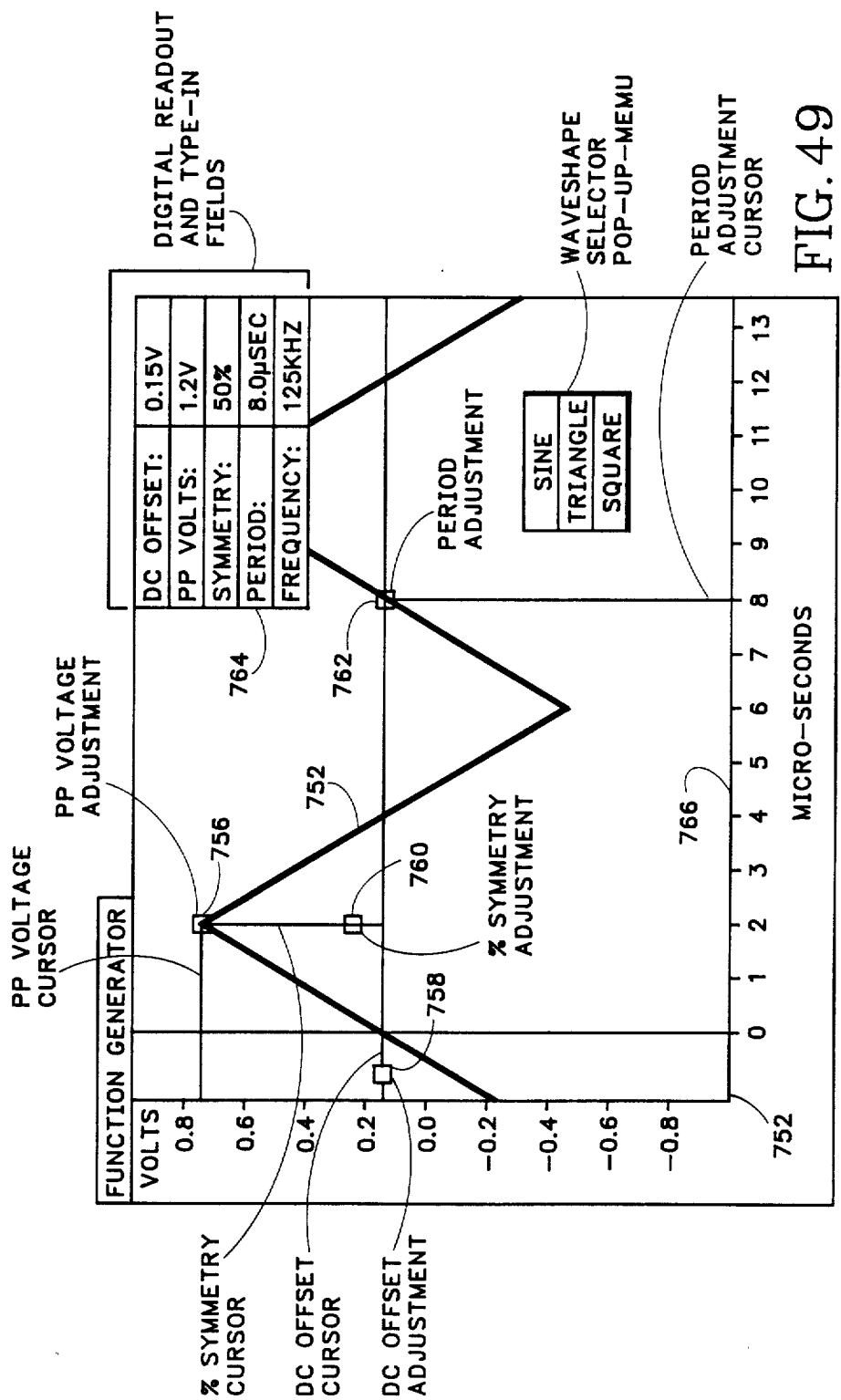
FIG. 49 shows how the user controls operation of a function generator via signal viewing control.

Another form of graphical control involves presentation of some prototypical signal with "adjustment points" graphically depicted. Each adjustment point controls a single parameter of the stimulus signal with immediate graphical feedback of the overall effect. FIG. 49 shows application of such method of control to a programmable waveform generator.

5.5.1 Power Supply Control

Figure 47:
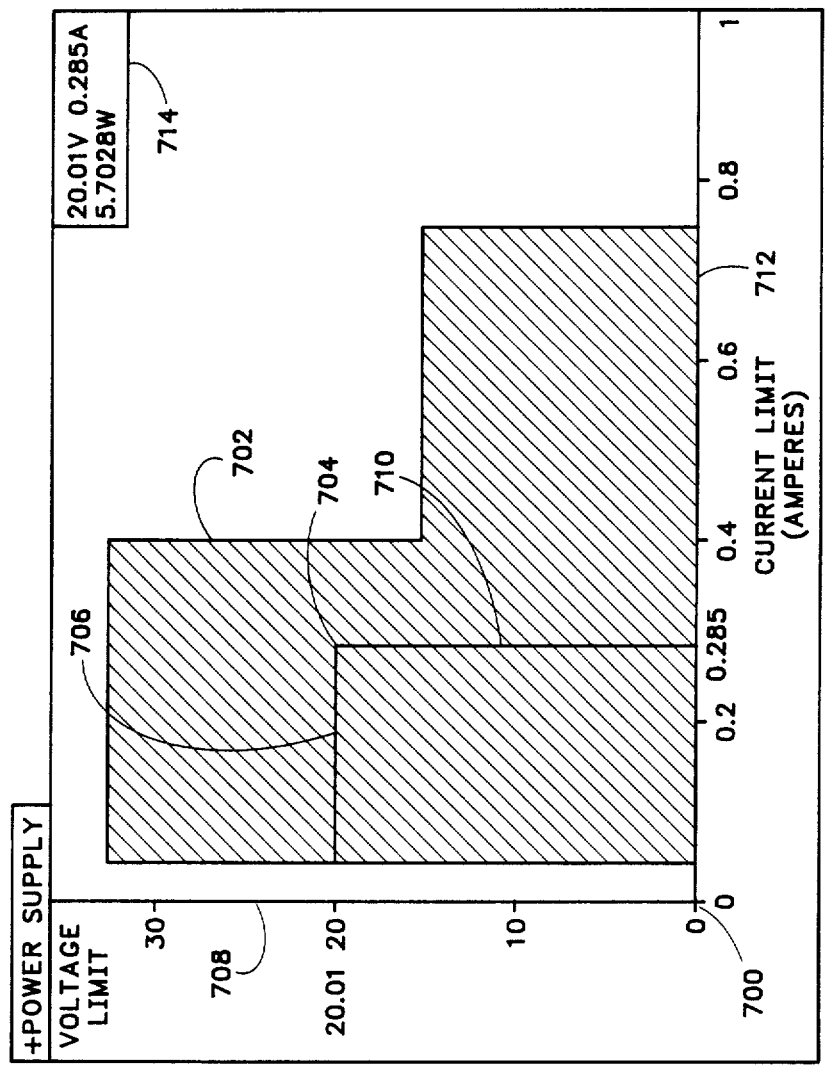
FIG. 47 shows how the user controls operation of a power supply via signal viewing control.

FIG. 47 demonstrates control over a power supply as an example of a stimulus-producing test instrument. Power supplies are typically controlled in terms of maximum voltage and current limits. These limits must be set by the user within the operating region for the particular power supply being used. Information about the operating region is typically provided to the user in the form of numbers defining upper and lower current and voltage capabilities of the power supply. The user must then keep these numbers in mind, or look them up, when setting the current and voltage limits of the instrument for an experiment.

In this example of the invention, these features are displayed for the positive power supply section of a Tektronix PS5010 power supply in a two-dimensional graph 700 representing current in the x dimension and voltage in the y dimension. The graph's dimensions are established to contain the power supply's operating region. (An additional 5% expansion is depicted for viewing convenience but is not necessary.) The darkened gray area 702 represents the actual operating region of the power supply. The shape of the operating region happens to be L-shaped for this particular power supply but need not be. Other models of power supply commonly have a triangularly shaped operating region.

The power supply's combined operating point 704, composed of the voltage setting and current setting operating points (i.e., positions on their respective axes), is constrained to be within this region. A horizontal line 706 extends from the combined operating point toward the graph's voltage axis (where current is zero) to the y-axis graticule 708. A vertical line 710 extends from the combined operating point toward the graph's x axis (where voltage is zero) to the x-axis graticule 712. These lines serve to delineate the level or operating point of each power supply setting.

Settings are often combined mathematically to produce a value of additional interest. By providing a two-dimensional representation, not only can the individual dimensions be represented, but their combined effect can also be shown. In this example, the power (in watts) provided by the instrument is the product of the voltage and current settings, and is shown by the intersection of the two lines at the combined operating point.

A digital readout 714 of voltage, current, and power is provided in the upper right corner of the graph to facilitate precise control. The placement of this readout is arbitrary. For example, the voltage readout may be displayed attached to the voltage line in some way, e.g., to the left in the graticule area. The current readout may be displayed attached to the current line, e.g., centered and to the right. The power readout might be attached to the intersection of the operating point lines.

Figure 48:
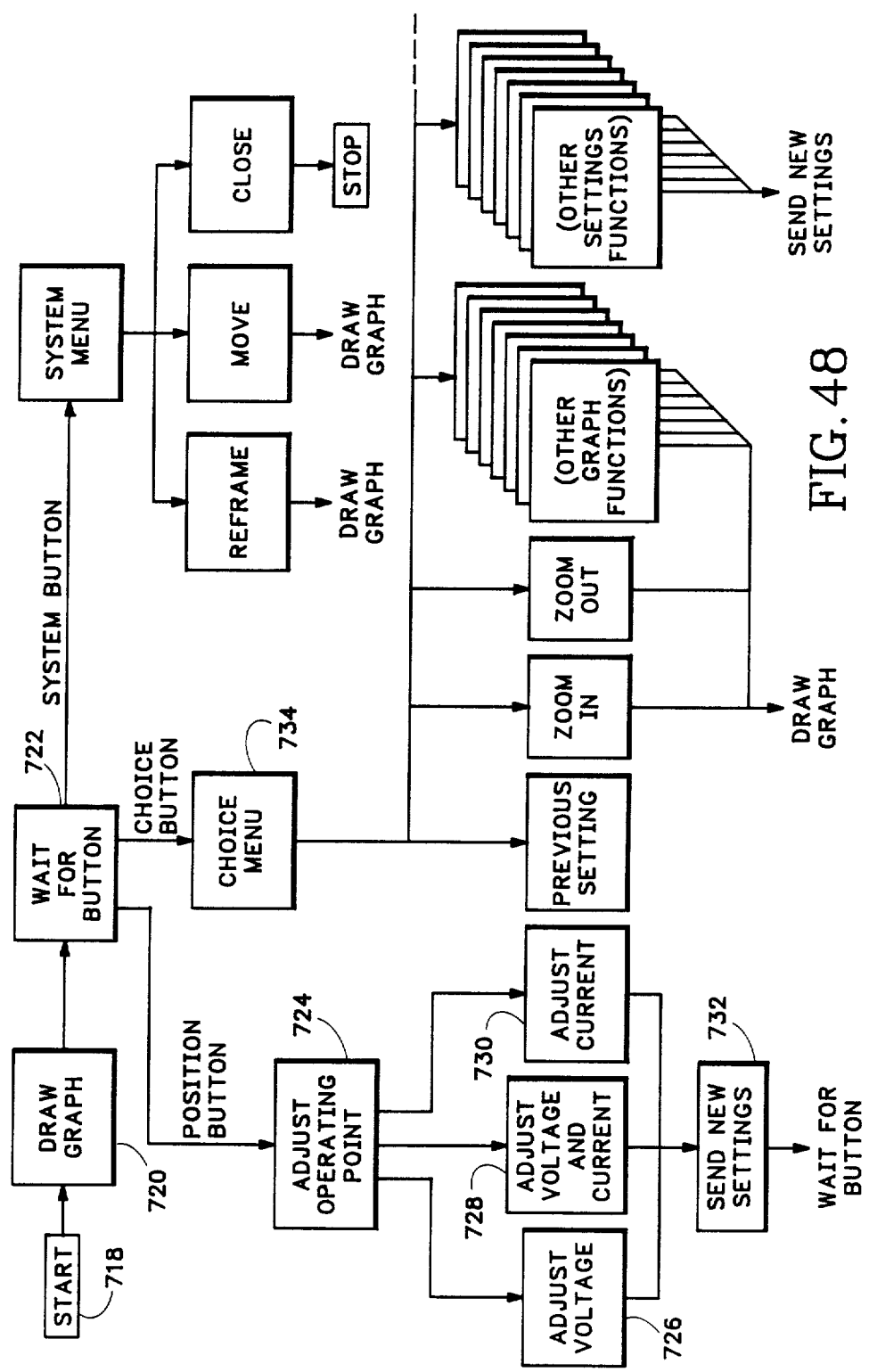
FIG. 48 is a top level state diagram of the procedure for signal viewing control of a power supply.

User control is implemented by power supply control software diagrammed in FIG. 48 and listed in part in APPENDIX J. When this routine is invoked (START block 718), the first procedure is "draw graph" 720, as explained above. Shifting to a "wait" state 722, the user controls the power supply by moving a cursor (by activating a mouse, joystick, or other two-dimensional graphic input device) within the constraint region 702. Depressing the selector or position button adjusts the operating point (block 724) in a manner depending on the position of the cursor. In a preferred implementation, the cursor will then jump to:

(1) the center point of the voltage line 706 (block (726),
(2) the combined operating point 704 (block 728), or
(3) the center point of the current line 710 (block 730), depending upon which was closest when the selector button was depressed. In a variation of this interface, small targets might be attached to the lines' mid-points and to the combined operating point. Th user would select the desired type of interaction by moving the cursor near the appropriate target before depressing the selector button.

Once the cursor is attached to one of these points, moving the cursor will change:
 (a) the position of the voltage operating point, if (1) above, without modifying the current setting
 (b) the position of the combined voltage and current operating point if (2) above,
 (c) the position of the current operating point, if (3) above, without modifying the voltage setting. APPENDIX J lists the method for selecting among points 704, 706 and 710, and the method of adjustment upon selecting the combined operating point 704.

In a simplified implementation, the cursor can be made to always jump immediately to the combined operating point, thus denying independent setting of voltage or current operating points.

Once the desired settings are established, they are converted to power supply control commands by routine 732. Three ways of dealing with the resulting power supply settings are reasonable:

(1) sending the voltage and current operating points to the power supply as a user slides the lines within the display, (2) sending the operating points only after the user has positioned the new combined operating point, or (3) holding the operating points for later setting by some other part of a larger instrument system.

As used in the BLOCK DIAGRAM EDITOR SYSTEM, the third alternative is preferred for making initial settings, followed by use of the second alternative to enable interactive control during execution of an experiment.

A choice menu (block 734) may also be implemented to facilitate operation of the power supply. As shown in FIG. 48, choices can include "zooming in" on a user-designated subsection of the operating region to provide finer placement of the operating points and, thus, finer control. A "zoom out" function can be provided to undo the effects of a "zoom in" function. A "previous setting" choice can restore the previous combined operating point from a stack of operating points saved as settings were adjusted. A "power on" and a "power off" choice may be provided for turning the supply's output switch on and off. Further choice menu items may be implemented for directly setting operating points for specific applications (e.g., for logic families: "TTL" (5 V, maximum current); "ECL" (−5.2 V, maximum current)).

5.5.2 Signal Generator Control

Another form of graphical control involves presentation of some prototypical signal with "setting points" graphically depicted. Each adjustment point controls a single operating point of the stimulus signal in two dimensions with immediate graphical feedback of the overall effect. This form of control is to be distinguished from systems, the Macintosh music systems, for example, which use "sliders" to establish setting values (one dimension each) by positioning each slider along a graticule and adopting the position of each as one parameter of a waveform to be generated. The waveform, however, is not displayed and graphically manipulated by movement of the sliders in such systems. This form of graphical control also differs from a known cursor tracking system for "drawing" a waveform to be "played" by the system. The latter system converts screen points of a waveform drawn by the user into amplitude samples and passes the samples through a digital-to-analog converter to produce an analog signal closely approximating the user-drawn waveform.

FIG. 49 shows a user interface to a signal generator (such as the Tektronix FG5010). A two-dimensional graph 750 displays a waveform 752. A pop-up-menu 754 is used to specify which waveform type (sine, square, or triangle) is to be generated. This selection is "digital" in nature: only one of a set of choices is available, with no intermediate forms. In the displayed example, the "triangle" waveform has been chosen. A graphical representation of the waveform is displayed with rectangular targets over points representative of the waveform's operating points: target 756 for peak-to-peak amplitude; target 758 for dc offset; target 760 for percent waveform symmetry; and target 762 for period. In this example, the operating points are adjusted by moving a cursor into (or near) a particular target, depressing a selection button on the mouse to select the nearest target and, while the button is depressed, moving the mouse to move the selected target. As the target is moved, the displayed representation of the signal generator's output waveform is adjusted to illustrate the change. The actual operating point values may be displayed in a readout window 764. As in the power supply example, the operating points are constrained by the design of the instrument. In this example, adjustment simply stops when these limits are reached (i.e., continued movement of the mouse produces no effect).

When an operating point, such as frequency, may be adjusted over several orders of magnitude (e.g., 0.002 Hz to 20 MHz in the FG5010), two different techniques are used to illustrate the effect on the displayed waveform. Small or slow movements cause the signal representation to change, allowing the operating point to be established with great precision. When large or fast movements of the positioning device are detected, the period graticule 766 adjusts, rather than the signal representation. By pushing the operating point target, the user causes the graticule to adjust, achieving the same effect: the representation of the output waveform is properly displayed with respect to the graph.

Having illustrated and described the principles of our invention in a preferred embodiment with an operative example thereof, it will be appreciated by those skilled in the art that the invention may be modified in arrangement and detail without departing from such principles. We claim all modifications coming within the spirit and scope of the following claims.

Table 1 - Signal Processing block functions

| Resource | Block Function | Inputs | Outputs | Parameters | Comments |
|---|---|---|---|---|---|
| add | add | 1.waveform<br>2.waveform | 1.waveform | none | The input waveforms are added element-by-element. |
| | | 1.waveform<br>2.scalar | 1.waveform | | The scalar is added to each element of the input waveform. |
| | | 1.scalar<br>2.scalar | 1.scalar | | The input scalars are added. |
| diff | diffe | 1.waveform | 1.waveform | 1.impulse response length | The input waveform is differentiated. |
| div | div | 1.waveform<br>2.waveform | 1.waveform | none | Waveform 1 is divided by waveform 2 on an element-by-element basis. |
| | | 1.waveform<br>2.scalar | 1.waveform | | Each element of the input waveform is divided by the scalar. |
| | | 1.scalar<br>2.scalar | 1.scalar | | Scalar 1 is divided by scalar 2. |
| integrate | integ | 1.waveform | 1.waveform | none | The input waveform is integrated. |
| mult | mult | 1.waveform<br>2.waveform | 1.waveform | none | The input waveforms are multiplied element-by-element. |
| | | 1.waveform<br>2.scalar | 1.waveform | | Each element of the input waveform is multiplied by the scalar. |
| | | 1.scalar<br>2.scalar | 1.scalar | | The input scalars are multiplied. |
| polar | polars | 1.real waveform<br>2.imaginary waveform | 1.magnitude waveform<br>2.phase waveform | 1.phase units<br>2.wrapping<br>3.delay | The block function performs rectangular to polar coordinate conversion of the input waveforms. |
| range | minmaxm | 1.waveform | 1.scalar | none | The block function outputs the maximum waveform value minus the minimum waveform value. |
| rfft | rffts | 1.time domain waveform | 1.real waveform<br>2.imaginary waveform | none | An fft is performed on the input time domain waveform. |
| sine | sinew | none | 1.waveform | 1.duration units<br>2.duration<br>3.amplitude<br>4.frequency<br>5.phase<br>6.dc offset | A sinewave is generated. |
| sub | sub | 1.waveform<br>2.waveform | 1.waveform | none | Waveform 2 is subtracted from waveform 1 on an element-by-element basis. |
| | | 1.waveform<br>2.scalar | 1.waveform | | The scalar is subtracted from each element of the waveform. |
| | | 1.scalar<br>2.scalar | 1.scalar | | Scalar 2 is subtracted from scalar 1. |

Table 2 - Instrument Control block functions

| Resource | Block Function | Instrument Controlled | Inputs | Outputs | Parameters | Comments |
|---|---|---|---|---|---|---|
| ps5010 | ps5010 | Tektronix PS 5010 Programmable Power Supply | none | 1.an integer "signal" indicating the power supply has received its parameters and its output is on. | 1.negative voltage 2.negative current 3.positive voltage 4.positive current | This block function allows GPIB control of the power supply. |
| fg5010A | Afg5010 | Tektronix FG 5010 Programmable 20MHz Function Generator | none | 1.an integer "signal" indicating the function generator has been parameterized and output is on. | 1.waveform type 2.peak-to-peak 3.frequency 4.DC offset 5.% symmetry | This block function allows GPIB control of a function generator. |
| fg5010B | Bfg5010 | same as above | same as above | same as above | same as above | same as above |
| 7d20A | A7d20 | Tektronix 7D20 Programmable Digitizer | 1.an integer "signal" indicating that a waveform can be acquired by the digitizer. | 1.waveform | 1.start time 2.lowest voltage 3.duration 4.voltage range 5.trigger level 6.trigger slope 7.channel 8.signal maximum 9.signal minimum 10.output on-off | This block function allows GPIB control of a digitizer. |
| 7d20B | B7d20 | same as above | same as above | same as above | same as above | same as above |

Table 3 - Miscellaneous block functions

| Resource | Block Function | Inputs | Outputs | Parameters | Comments |
|---|---|---|---|---|---|
| amModulator | amModulator | 1.an integer "signal" 2.an integer "signal" 3.an integer "signal" | 1.an integer "signal" | none | This block function is used for synchronization purposes. It only creates an output signal when it has seen a signal on each of its 3 inputs. In our examples the input signals come from 2 function generator block functions and 1 power supply block function. |
| constant | constant | none | 1.scalar | 1.a value | This block function outputs the value supplied as its parameter. |
| fork | fork | 1.waveform | 1.waveform 2.waveform | none | This block function outputs 2 identical copies of its input. |
| | | 1.scalar | 1.scalar 2.scalar | | |
| graph | waveprint | 1.waveform | none | none | This block function sends a waveform (on the C-to-Smalltalk pipe) to the Smalltalk process to be graphed. |
| scalar | scalar | 1.scalar | none | none | This block function sends a scalar value (on the C-to-Smalltalk pipe) to the Smalltalk process to be displayed. |
| sink | sink | 1.a SAMPLE | none | none | This block function discards any input it receives. |

Table 4 -- Extended Block Editor Menu Functions

| | |
|---|---|
| label | change a label on a block |
| undo | undo the last operation |
| copy | place a copy of a selected object into a save buffer |
| paste | place a copy of the save buffer on the diagram |
| flip | reverse a block on the diagram (inputs and outputs move to opposite sides of the block) |
| rotate | rotate the block by 90 degrees. |
| commit | replace the current saved block diagram with the current diagram |
| cancel | replace the current block diagram with the saved block diagram |
| show labels | toggle for displaying labels on the block inputs and outputs. |
| build macro | build a macro from selected parts on the diagram |
| clear | delete the current block diagram and clear the editting window |
| repaint | repaint the editor pane |
| save | Save the diagram |
| load | Read in a saved block diagram |
| execute | Begin execution of the the diagram |

APPENDIX A -- Program Listing for I/O Driver Module: fg5010A

```
            break;

case 2:
            sprintf(IOmessage, "FG5010A:OUT OFF;");
            if (IOdriver(IOmessage) != NOERROR)
                {printf("IO driver error\n");}
            retCode = 0;
            break;

default:
            break;
        }
    state->entryCount++;
    return(retCode);
}

..uASettings(param)
.RAMSPTR    param;
{

/* SEND SETTINGS */ sprintf(IOmessage, "FG5010A:OUT OFF;");
    if (IOdriver(IOmessage) != NOERROR)
        {printf("IO driver error\n");}
    sprintf(IOmessage, "FG5010A:%s;", param->waveshape);
    if (IOdriver(IOmessage) != NOERROR)
        {printf("IO driver error\n");}
```

APPENDIX A -- Program Listing for I/O Driver Module: fg5010A

```c
/* FG5010A.c IO driver compatible version of the fg5010A driver.
   02-16-1986 version. */
/* ----------------------------------------------------------------- */
/*            GLOBAL INFORMATION for function generator()           */
/* ----------------------------------------------------------------- */ include <stdio.h>
include <math.h>
#include "type.h"
#include "spd.h"
#include "sp.h"

extern FILE * IOChannel; /* Pointer to /dev/comm file */ typedef struct {
    int       entryCount;
    TATE,    *STATEPTR;

/* These are additional function generator settings that may be changed by the user */ typedef struct {
    char    waveshape[10]; /* "SINE", "SQUARE", "TRIANGLE" */
    double  amplitude;
    double  frequency;
    double  offset;
    double  symmetry;
    char    name[80];
} PARAMS, *PARAMSPTR;  /* PARAMS names the data type, *PARAMSPTR names
                         pointers to structures of type PARAMS */

/* ----------------------------------------------------------------- */
/*              DATA GLOBAL TO function generator                   */
/* ----------------------------------------------------------------- */ static char   IOmessage[200];

/* ----------------------------------------------------------------- */
/*              DRIVER FOR DIGITIZER()                              */
/* ----------------------------------------------------------------- */ star Afg5010(info)

sprintf(IOmessage, "FG5010A:AMPL %5.3f;", param->amplitude);
    if (IOdriver(IOmessage) != NOERROR)
        {printf("-IO driver error\n");}
    sprintf(IOmessage, "FG5010A:OFFS %4.3f;", param->offset);
    if (IOdriver(IOmessage) != NOERROR)
        {printf("-IO driver error\n");}
    sprintf(IOmessage, "FG5010A:FREQ %e;", param->frequency);
    if (IOdriver(IOmessage) != NOERROR)
        {printf("-IO driver error\n");}
    sprintf(IOmessage, "FG5010A:SYM %2.0f", param->symmetry);
    if (IOdriver(IOmessage) != NOERROR)
        {printf("-IO driver error\n");}
    return;
} sendASettings(param);  /* send new settings */
    &(param->frequency),
    &(param->offset),
    &(param->symmetry));

info->no_output = 1;
info->no_input = 0;
star_setup (info, Afg5010, (char *)param, sizeof(PARAMS));

return (0);
}

/* ----------------------------------------------------------------- */
/*       FG5010(): Star routine for FG5010 function generator.     */
/* ----------------------------------------------------------------- */

Afg5010(param, size, state)

PARAMSPTR    param;
int          size;
STATEPTR     state;
{
    char      *alloc_state_var();
    ERRORTYPE samp_alloc();
    SAMPLE    cur_sample;
    ERRORTYPE errorcode;
    int       length_output_fifo(), maxlength_input_fifo(), length_input_fifo();
    int       retCode = 0;

if (state == NULL) {                /* First call */
        state = (STATEPTR) alloc_state_var(1, sizeof(STATE));
        if (size != sizeof(PARAMS)) return(1);
        if (no_output_fifos() != 1) return(2);
        if (no_input_fifos() != 0) return(3);
        state->entryCount = 1;
    }
```

```
CHAINPTR Info;
{
    int        A7q5010();
    PARAMSPTR  param;
    POINTER    para_allocate();
    char       *strcpy();

param = (PARAMSPTR) para_allocate (sizeof(PARAMS));
    strcpy(param->name, Info->blockname);

fscanf(Info->inputfile,
           "%s %if %if %if %if",
           param->waveshape,
           &(param->amplitude),
```

```
switch (state->entryCount) { case 1:
        InvertBlock(param->name);

sprintf(IOmessage, "FG5010A:OUT ON");
        if (IOdriver(IOmessage) != NOERROR)
            {printf("IO driver error\n");}
        if(samp_alloc(&cur_sample) != NOERROR)
            printf("samp_alloc was unable to allocate SAMPLE space\n"
        cur_sample->type = INT_SAMPLE;
        cur_sample->uval.ival = 1;

retCode = put (0, &cur_sample);
        if (retCode == -1) retCode = 0;
```

APPENDIX B -- Program Listing for I/O Driver Module: A7d20

```
/* A7d20.c  IO driver compatible version of the A7d20 driver.
   02-25-1986. */
/*
   ================================================================
                    GLOBAL INFORMATION FOR A7d20()
   ================================================================
*/ include <stdio.h>
include <math.h>
#include "type.h"
#include "spd.h"
#include "sp.h"
#include "digstructures.h"

extern FILE *IOChannel;  /* Pointer to /dev/comm file */ define OVERDRIVEFACTOR 200.0 /* max divs a sig peaktopeak can cover */ def struct {
    int    dummy;
} STATE, *STATEPTR;
/* These are additional digitizer settings that may be changed by the user typedef struct {
    int    channel;           /* 1 or 2 */
    float  triglevel;         /* in divisions */
    char   trigSlope[8];      /* "PLUS" or "MINUS" */
} SETTINGS;

typedef struct {
    RECTANGLE  AcqRect;
    SETTINGS   Settings;
    float      maxsignal;
    float      minsignal;
    char       useWfFlag[4];  /* NO - Don't send waveform to next star
                                 YES - Send waveform to next star */
    char       title[NAMELENGTH];
} PARAMS, *PARAMSPTR; /* PARAMS names the data type, *PARAMSPTR names
                        pointers to structures of type PARAMS */
```

```
/*
   ================================================================
                        DRIVER FOR DIGITIZER().
   ================================================================
*/ star_A7d20(Info)
CHAINPTR Info;
{
    int        A7d20();
    PARAMSPTR  params;
    POINTER    para_allocate();
    char       *strcpy();
    float      tempChannel;

params = (PARAMSPTR) para_allocate (sizeof(PARAMS));

fscanf(Info->inputfile,
           "%f %f %f %f %s %f %f %f %s",
           &(params->AcqRect.origin.x),
           &(params->AcqRect.origin.y),
           &(params->AcqRect.extent.x),
           &(params->AcqRect.extent.y),
           &(params->Settings.trigLevel),
           params->Settings.trigSlope,
           &tempChannel,
           &(params->maxsignal),
           &(params->minsignal),
           params->useWfFlag);

params->Settings.channel = (int) tempChannel;
    strcpy(params->title, Info->blockname);

Probe = 1.0;
    Info->no_output = 1;
    Info->no_input = 1;
    star_setup (Info, A7d20, (char *)params, sizeof(PARAMS));

return (0);
}
```

```
/* ----------------------------------------------------------------
        DATA GLOBAL TO digitizer
   ---------------------------------------------------------------- */ extern FILE    *responseFile;

static char    RawData[1030]; /* remember to mask: (RawData[i] & 0377) */
static char    IOmessage[200];
static int     RawSize;

static WINDOWTRANSFORM RawToWfTransform;

static double  Volts;
static double  Position;
static double  HorizTime;
static double  Trigpos;
static double  Probe;
static double  xZero;   /* index of trigger point in RawData */
```

APPENDIX B -- Program Listing for I/O Driver Module: A7d20

```
char      *alloc_state_var();
ERRORTYPE samp_alloc();
SAMPLE    cur_sample, x;
WAVEFORM  *wave;
INDEX     wdim[3];
ERRORTYPE errorcode = NOERROR;
ERRORTYPE create_wf();
int       length_input_fifo(), maxlength_input_fifo();
int       tupletype[4];
int       start, stop;
FILE      *fopen();

if (pState == NULL) {   /* first call */
    pState = (STATEPTR) alloc_state_var(1, sizeof(STATE));
    if(size != sizeof(PARAMS)) return(1);
    if(no_output_fifos() != 1) return(2);
    if(no_input_fifos() != 1) return(3);
    } if (get(0, &x) == 0) { invertBipck(param->title);

if ((x->type != INT_SAMPLE) || (x->uval.ival != -1))
        print("invalid sample sent to A7d20\n");

Probe = 1.0;

newVertSettings(param);      /* Calculate and send
                                  * new vertical settings
                                  */
    newHorizSettings(param);

acquireRawData();            /* Get raw waveform data */ sprintf(IOmessage,
        "A7d20:CH%ld COUP: GND",
        param->Settings.channel);
    if (IODriver(IOmessage) != NOERROR)
        {print("IO driver error\n");}

/* Find first and last points in RawData
```

```
/* ----------------------------------------------------------------
        A7d20(): Star routine for 7D20 digitizer.
   ---------------------------------------------------------------- */

A7d20(param, size, pState)
    PARAMSPTR  param;
    int        size;
    STATEPTR   pState;
{

/* Send waveform to next BLOSIM star if useWfFlag is set
 */
if (strcmp(param->useWfFlag, "NO")) {

/* allocate space for cur_sample
     */
    if(samp_alloc(&cur_sample) != NOERROR)
        printf("samp_alloc unable to allocate SAMPLE space\n");

/* place pointer to waveform in sample
     */
    cur_sample->type = WAVE_SAMPLE;
    cur_sample->uval.wave = wave;

/* output the sample
     */
    if((errorcode = put(0, &cur_sample)) == -1)   errorcode=0;

} return(errorcode);
} static acquireRawData()
{
    int   rawDataSize = 0;
    int   i, strcmp();
    char  hold[16];
    char  *strcpy();
    char  header[32], highByte, lowByte;

/* tell 7D20 to get and hold the next waveform
     */
    sprintf(IOmessage, "A7d20:TR HOLDNEXT: ON");
    if (IODriver(IOmessage) != NOERROR)
        {printf("IO driver error\n");}
```

```
*/
waveformLimits(param, &start, &stop);

/* Allocate space for BLOSIM waveform
*/
wdim[0] = stop - start + 1;
tupletype[0] = W_FLOAT;
if ((errorcode = create_wf(1, wdim, 1, tupletype, &wave)) != NOERROR)
    printf("create_wf: reports ERRORCODE %d \n", errorcode);

/* Make BLOSIM waveform
*/
makeWaveform(wave, start, stop, param);  /* Make BLOSIM waveform */

/* Send data to smalltalk
*/
dataToSmalltalk(param, wave);
```

APPENDIX B -- Program Listing for I/O Driver Module: A7d20

```
sprintf(IOmessage, "A7d20:CURVE?");
if (IODriver(IOmessage) != NOERROR)
    {printf("IO driver error\n");}
sprintf(IOmessage, "A7d20:");
if (IODriver(IOmessage) != NOERROR)
    {printf("IO driver error\n");} fscanf(IOChannel, "%[^%] %c %c %c", header, &highByte, &lowByte);

/* Ask for and get raw data. Throw away checksum, cr, & lf
*/
fread(RawData, sizeof(*RawData), 9, IOchannel);
fread(RawData, sizeof(*RawData), (unsigned) RawSize, IOchannel);
fflush(IOchannel); rewind(IOchannel);
sprintf(IOmessage, "A7d20:AQ HOLD: OFF;");
if (IODriver(IOmessage) != NOERROR)
    {printf("IO driver error\n");}
return;
} static newVertSettings(param)
PARAMSPTR param;
{
    verticalSettings(param);

/* User Parameters
    */
    sprintf(IOmessage, "A7d20:CH1d VO:%e;", param->Settings.channel, Volts);
    if (IODriver(IOmessage) != NOERROR)
        {printf("IO driver error\n");}
    sprintf(IOmessage, "A7d20:CH1d POSI:%e;", param->Settings.channel, Position);
    if (IODriver(IOmessage) != NOERROR)
        {printf("IO driver error\n");}
    sprintf(IOmessage, "A7d20:CH1d COUP: GND;", param->Settings.channel);  /* Input coupling */
    if (IODriver(IOmessage) != NOERROR)
        {printf("IO driver error\n");}
```

```
/* Wait for acquisition
*/
strcpy(hold, "OFF");
while(strcmp(hold, "ON")) {
    sprintf(IOmessage, "A7d20:AQ? HOLD");
    if (IODriver(IOmessage) != NOERROR)
        {printf("IO driver error\n");}
    sprintf(IOmessage, "A7d20:\0");
    if (IODriver(IOmessage) != NOERROR)
        {printf("IO driver error\n");}
    fscanf(IOchannel, "%*[^;]%*c %s", hold);
    fflush(IOchannel); rewind(IOchannel);
} getNewRawToWfTransform();

/* Ask for Curve Data
*/
```

```
if (IODriver(IOmessage) != NOERROR)
    {printf("IO driver error\n");}
sprintf(IOmessage, "A7d20:TR SO: MO;");         /* trigger source */
if (IODriver(IOmessage) != NOERROR)
    {printf("IO driver error\n");}
sprintf(IOmessage, "A7d20:CURS DEL: OFF;");     /* delta cursors off */
if (IODriver(IOmessage) != NOERROR)
    {printf("IO driver error\n");}
sprintf(IOmessage, "A7d20:CS HM: ALLOW;");
if (IODriver(IOmessage) != NOERROR)
    {printf("IO driver error\n");}
sprintf(IOmessage, "A7d20:CURS 1: 0;");          /* high magnification off */
if (IODriver(IOmessage) != NOERROR)
    {printf("IO driver error\n");}
return;
} static newHoritSettings(param)
PARAMSPTR param;
{
    horizontalSettings(param);

/* Send settings
    */

/* User Parameters
    */
    sprintf(IOmessage, "A7d20:HOR TI:%e;", HoriTime);
    if (IODriver(IOmessage) != NOERROR)
        {printf("IO driver error\n");}
    sprintf(IOmessage, "A7d20:TR POSI:%3.0f;", TrigPos);
    if (IODriver(IOmessage) != NOERROR)
        {printf("IO driver error\n");}
    sprintf(IOmessage, "A7d20:TR SLOPE: %s;", param->Settings.trigSlope);
    if (IODriver(IOmessage) != NOERROR)
        {printf("IO driver error\n");}
    sprintf(IOmessage, "A7d20:TR LEVEL:%e;", param->Settings.trigLevel);
    if (IODriver(IOmessage) != NOERROR)
        {printf("IO driver error\n");}
```

```
/* Digitizer constants
*/
sprintf(IOmessage, "A7d20:CH2 INV:OFF;");        /* ch2 invert */
if (IODriver(IOmessage) != NOERROR)
    {printf("IO driver error\n");}
sprintf(IOmessage, "A7d20:CH1d VA: OFF;", param->Settings.channel);
                                                  /* variable gain */
if (IODriver(IOmessage) != NOERROR)
    {printf("IO driver error\n");}
sprintf(IOmessage, "A7d20:TR MO: %s;");           /* trigger mode */
if (IODriver(IOmessage) != NOERROR)
    {printf("IO driver error\n");}
sprintf(IOmessage, "A7d20:TR COUP: AC;");         /* trigger coupling */
if (IODriver(IOmessage) != NOERROR)
    {printf("IO driver error\n");}
sprintf(IOmessage, "A7d20:HOR CL: INT;");         /* horiz clock source */
if (IODriver(IOmessage) != NOERROR)
    {printf("IO driver error\n");}
sprintf(IOmessage, "A7d20:LO OFF;");              /* long report form */
```

APPENDIX B -- Program Listing for I/O Driver Module: A7d20

```
    {printf("IO driver error\n");}
sprintf(IOmessage, "A7d20:DATA MEM: %1d", param->Settings.channel);
                                                  /* data memory */
if (IODriver(IOmessage) != NOERROR)
    {printf("IO driver error\n");} return;
} static getNewRawToWfTransform()
{
/* Get number of points in waveform
*/
sprintf(IOmessage, "A7d20:WFMPRE? NR");
if (IODriver(IOmessage) != NOERROR)
    {printf("IO driver error\n");}
sprintf(IOmessage, "A7d20:");
if (IODriver(IOmessage) != NOERROR)
    {printf("IO driver error\n");}
tscanf(IOChannel, "%*[:] %c %d", &RawSize);
fflush(IOChannel); rewind(IOChannel);

/* Get horizontal offset
*/
sprintf(IOmessage,"A7d20:WFMPRE? PT_OFF");
if (IODriver(IOmessage) != NOERROR)
    {printf("IO driver error\n");}
sprintf(IOmessage, "A7d20:");
if (IODriver(IOmessage) != NOERROR)
    {printf("IO driver error\n");}
tscanf(IOChannel, "%*[:] %c %1f", &xZero);
fflush(IOChannel); rewind(IOChannel);

/* Create global RawToWfTransform
*/
RawToWfTransform.scale.x = HorizTime * 10.0 / RawSize;
RawToWfTransform.scale.y = 0.04 * Volts;
RawToWfTransform.offset.y = -( Position * 0.04) * Volts;
RawToWfTransform.offset.x = -( xZero * RawToWfTransform.scale.x);
return;
```

```
/* Open up the input channel (make a little noise)
*/
sprintf(IOmessage, "A7d20:CH1d COUP: DC;", param->Settings.channel);
if (IODriver(IOmessage) != NOERROR)
    {printf("IO driver error\n");}

/* Digitizer constants
*/
sprintf(IOmessage, "A7d20:DATA ENC: BIN;");      /* data encoding */
if (IODriver(IOmessage) != NOERROR)
    {printf("IO driver error\n");}

/* BLOSIM-controlled settings
*/
sprintf(IOmessage, "A7d20:AQ MO: CH%1d;", param->Settings.channel);
                                                  /* acquisition mode */
if (IODriver(IOmessage) != NOERROR)

tMantissa = (int) (HorizTime / pow((double) 10.0, tScale) + 0.5);
if (tMantissa <= 1.0)
    tMantissa = 1.0;
else if (tMantissa <= 2.0)
    tMantissa = 2.0;
else if (tMantissa <= 5.0)
    tMantissa = 5.0;
else {
    tMantissa = 1.0;
    tScale = tScale + 1.0;
}

HorizTime = tMantissa * pow((double) 10.0, tScale);

if (HorizTime > 20.0) HorizTime = 20.0;
else if (HorizTime <= 0.000000005) HorizTime = 0.000000005;

/* DELAY SETTINGS:
 *
 *  The TrigPos value sent out to the 7D20 must be negative-
 *  valued if it represents a time interval AFTER trigger.
 *  The value must be positive (and <= 10) if the interval
 *  represents a time BEFORE trigger.
 */

TrigPos = - floor((double) param->AcqRect.origin.x / HorizTime);

if (TrigPos > 10.0) TrigPos = 10.0;
else if (TrigPos < -1500.0) TrigPos = -1500.0;

/* Test to see if it's contained
*/
while (
    ((HorizTime * - TrigPos) > (double) param->AcqRect.origin.x ||
    ((HorizTime * - TrigPos + HorizTime * 10.0) <
        (double) param->AcqRect.origin.x + (double) param->AcqRect.exten
{
    if (tMantissa == 1.0) tMantissa = 2.0;
    else if (tMantissa == 2.0) tMantissa = 5.0;
    else { tMantissa = 1.0;
        tScale = tScale + 1.0;
}
```

```
static horizontalsettings(param)
PARAMSPTR    param;
{
    double powr();
    double tScale, tMantissa;

/*   HORIZONTAL SCALE: TimePerDiv   <nr3>
    */
    HorizTime = (double) param->AcqRect.extent.x / 10.0;
    tScale = floor(log10(HorizTime));
    HorizTime = tMantissa * powr((double) 10.0, tScale);

if (HorizTime > 20.0) HorizTime = 20.0;
        else if (HorizTime < 0.0000000005) HorizTime = 0.000000005;

TrigPos = -- floor((double) param->AcqRect.origin.x / Hori
    if (TrigPos > 10.0) TrigPos = 10.0;
        else if (TrigPos < - 1500.0) TrigPos = -1500.0;
    }
    return;   /* might consider returning an error if TrigPos outside range */
} static verticalsettings(param)
PARAMSPTR    param;
{
    double powr();
    double vCenter;
    double heightPerDiv, vScale, vMantissa;

vCenter = (double) param->AcqRect.extent.y / 2.0 + (double) param->AcqRect.origin
    /*
     *   Probes can attenuate the incoming signal by factors of
     *   1, 10, and 100. When setting the Volts value,
     *   the probe factor must be included. When vertical scale
     *   information is obtained from a waveform preamble, however,
     *   no correction is necessary.
     *
     *   vertical scale factor = Volts * probe factor
     */

/*   VERTICAL SCALE: VoltsPerDiv   <nr3>
    */
    heightPerDiv = (double) param->AcqRect.extent.y / Probe / 10.0;
    vScale = floor(log10(heightPerDiv));
    vMantissa = heightPerDiv / powr((double) 10.0, vScale);
    if (vMantissa <= 1.0) vMantissa = 1.0;
    else if (vMantissa <= 2.0) vMantissa = 2.0;
    else if (vMantissa <= 5.0) vMantissa = 5.0;
    else    vMantissa = 1.0;
    vScale = vScale + 1.0;
    Volts = vMantissa * powr((double) 10.0, vScale);
    if (Volts > 5.0) Volts = 5.0;
    if (Volts <= -0.005) Volts = 0.005;

/*   VERTICAL POSITION: Position   <nr2>
    */
    Position = -(vCenter / Probe / Volts);

/*  Correction for window outside Position range
    */
    if ((Position > 10.2)
        ||
        (Position < -10.2)
        ||
        (((param->maxSignal - param->minSignal) / Volts) > OVERDRIVEFACTOR)
    {
        if (fabs(vMantissa - 1.0) < 0.1)
            vMantissa = 2.0;
        else if (fabs(vMantissa - 2.0) < 0.1)
```

APPENDIX B -- Program Listing for I/O Driver Module: A7d20

```
char    *strcpy();

arr = (float *) arr_ptr(wave);

for (rawPtr = start; rawPtr<stop + 1; rawPtr++) {
    aPt.y = (float) (((RawData[rawPtr] & 0377) - 128);
    aPt.x = 0.0;
    transform(&RawToWfTransform, &aPt, &bPt);
    arr[arrPtr++] = bPt.y;

if (param->maxSignal < bPt.y) param->maxSignal = bPt.y;
    else if (param->minSignal > bPt.y) param->minSignal = bPt.y;
}

/* x-axis scaling and offset
*/
dim_scale(wave,0) = (double) RawToWfTransform.scale.x;
dim_offset(wave,0) = (double) xZero - start;

if ((dim_units(wave,0) = (char *) malloc((unsigned) 8)) == NULL)
    printf("malloc unable to allocate space\n");
strcpy(dim_units(wave,0), "Seconds");

if ((tup_units(wave,0) = (char *) malloc((unsigned) 8)) == NULL)
    printf("malloc unable to allocate space\n");
strcpy(tup_units(wave,0), "Volts");
return;
} static waveformLimits(param, pStart, pStop)
PARAMSPTR    param;
int          *pStart, *pStop;
{
    POINT    aPt;
    POINT    bPt;

aPt.x = param->AcqRect.origin.x;
    aPt.y = 0.0;                          /* ... a placeholder */
    inverseTransform(&RawToWfTransform, &aPt, &bPt);
```

```c
        else {
            vMantissa = 1.0;
            vScale = vScale * 1.0;
        }
        Volts = vMantissa * pow((double) 10.0, vScale);
        Position = -(vCenter / Probe / Volts);
    }
    return;
} static makeWaveform(wave, start, stop, param)
PARAMSPTR    param;
WAVEFORM     *wave;
int          start;   /* first index into RawData */
int          stop;    /* last index into RawData */
{
    POINT    aPt, bPt;
    int      rawPtr, arrPtr = 0;
    float    *arr;
    char     *malloc();

aPt.x = param->AcqRect.origin.x + param->AcqRect.extent.x;
    aPt.y = 0.0;                              /* ... a placeholder */
    inverseTransform(&RawToWfTransform, &aPt, &bPt);
    *pstop = (int) (ceil( bPt.x));
    if (*pstop >= RawSize) *pstop = RawSize - 1;
    *pstart = bPt.x;
    if (*pstart < 0) *pstart = 0;
    return;
} static dataToSmalltalk(param, wave)
PARAMSPTR    param;
WAVEFORM     *wave;
{
    float    scaleFactor;
    float    offset;
    short    totalPoints;
    pTransform->offset.y;
    return;
}

/*-----------------------------------------------------------------
 * inverseTransform:
 *     apply the transform to viewport coordinates
 *     giving window coordinates.
 *----------------------------------------------------------------*/
static inverseTransform(pTransform, pPoint, pResultPoint)
WINDOWTRANSFORM  *pTransform;
POINT    *pPoint;
POINT    *pResultPoint;
{
    pResultPoint->x = (pPoint->x -
            pTransform->offset.x) / pTransform->scale.x;
    pResultPoint->y = (pPoint->y -
            pTransform->offset.y) / pTransform->scale.y;
    return;
}

/* Print out header information to the response file in the following
 * order:
 *     1. Response Class (string)
 *     2. Current Block Name (string)
 */
fprintf(responseFile, "%s\n", "digitizer");
fprintf(responseFile, "%s\n", param->title);

/* Print out waveform information to the response file in the following
 * order:
 *     3. Maximum Signal Value
 *     4. Minimum Signal Value
 */
fwrite((char *)(&(param->maxSignal)), sizeof(float), 1, responseFile);
fwrite((char *)(&(param->minSignal)), sizeof(float), 1, responseFile);

/* Print out waveform information to the response file in the following
 * order:
 *     5. Horizontal Units (string)
 *     6. Vertical Units (string)
 *     7. Horizontal Scale Factor (binary float)
 *     8. Horizontal Offset (binary float)
 *     9. Total No. of Points (binary short)
 *    10. Array Data (binary floats)
 */
fprintf(responseFile, "%s\n", dim_units(wave,0));
fprintf(responseFile, "%s\n", tup_units(wave,0));

scaleFactor = (float) dim_scale(wave, 0);
fwrite((char *)(&scaleFactor), sizeof(float), 1, responseFile);

offset = (float) dim_offset(wave, 0);
fwrite((char *)(&offset), sizeof(float), 1, responseFile);

totalPoints = wave_size(wave);
fwrite((char *)(&totalPoints), sizeof(short), 1, responseFile);

print_wf_arr(wave, responseFile);

/* And finally, END, to finish things off
 */
```

```
       fprintf(responseFile, "%s\n", "END");
       return;
}

/*-----------------------------------------------------------
       transform:
           apply the transform to window coordinates
           giving viewport coordinates.
-------------------------------------------------------------*/
static transform(pTransform, pPoint, pResultPoint)
WINDOWTRANSFORM * pTransform;
POINT * pPoint;
POINT * pResultPoint;
{
       pResultPoint->x = pPoint->x * pTransform->scale.x +
               pTransform->offset.x;
       pResultPoint->y = pPoint->y * pTransform->scale.y +
               pTransform->offset.y;
}
```

APPENDIX C -- Program listing for Signal Analysis function: polars

```
/**************************************************************
                           polars()
**************************************************************/ include <stdio.h>
include "type.h"
#include "spd.h"
#include "sp.h"

extern FILE *responseFile;
extern FILE *commandFile;

/* typedef parameter and state */
typedef struct {
       int dummy;
} STATE, *STATEPTR;

typedef struct {
       UNIT units;
       BOOL unwrap;
       float delay;
       char name[80];
} POLARPARAM, *POLARPTR;

/**************************************************************
                       star_polars()

Inputs and outputs are waveforms.
**************************************************************/
star_polars (info)
CHAINPTR info;
{
       fprintf(info->save_file,"%d ", polarp->units);
       /*fprintf(info->query_file,"Enter boolean (0, 1) to indicate whether the phase wanted
       fscanf(info->inputfile,"%s", string);
       if (!strcmp("wrap", string))
              polarp->unwrap = 0;
       else if (!strcmp("unwrap", string))
              polarp->unwrap = 1;
       fprintf(info->save_file,"%d ", polarp->unwrap);
       fprintf(info->query_file,"Enter delay to specify linear varying of phase adjustment\n");
       fscanf(info->inputfile,"%f", &polarp->delay);
       fprintf(info->save_file,"%f", polarp->delay);
       info->no_input = 2;
       info->no_output = 2;
       star_setup (info,polars,(char *)polarp,sizeof(POLARPARAM));
       return (0);
}

/**************************************************************
                           polars()
**************************************************************/
polars(pparam,size,pstate)
POLARPTR pparam;
int size;   /* size of parameter storage */
STATEPTR pstate;
{
       SAMPLE x, y, mag_sample, phase_sample;
       char *alloc_state_var();
       WAVEFORM *magw, *phasew;
       ERRORTYPE create_wf(), polar(), errorcode;
       INDEX wdim[3];
       int tupletype[4];
```

```c
nt polars();
POLARPPTR polarp;
char blockname[NAMELENGTH];
POINTER para_allocate();
char *strcpy();
char string[20];
/*printf("In star_polar\n");*/ strcpy (blockname,info->blockname);
polarp = (POLARPPTR) para_allocate (sizeof(POLARPARAM));
strcpy(polarp->name, info->blockname);
/*fprintf(info->querry_file,"Enter one of the following number representation of phase
fprintf((info->querry_file,"1. RAD\n2. GRAD\n3. DEGREE\n"):*/
fscanf(info->inputfile,"%s", string);
/*printf("string = %s\n", string);*/
if (!strcmp("rad", string))
    polarp->units = 0;
else if (!strcmp("grad", string))
    polarp->units = 1;
else if (!strcmp("degree", string))
    polarp->units = 2;

/* error if not connected to two output fifo */
if (no_output_fifos() != 2)
    return(2);

/* error if not input fifo */
if (no_input_fifos() != 2)
    return(3);

/* first make sure the output fifo is not full before we get a sample
   from an input fifo */
if (len_output_fifo(0) == maxl_output_fifo(0))
    return(0);    /* output fifo full */
if (len_output_fifo(1) == maxl_output_fifo(1))
    return(0);    /* output fifo full */

/* now get the sample values from the input fifo */
if ((get(0, &x) == 0) && (get(1, &y) == 0)) {
    fprintf(responseFile, "%s\n", "invert");
    fprintf(responseFile, "%s\n", pparam->name);
    fflush(responseFile);
    fscanf(commandFile, "%s", string);
    if (strcmp(string, "e")) {
        printf("Wrong signal - %s received by polar\n", string);
        fflush(stdout);
    }
} if ((x->type != WAVE_SAMPLE || y->type != WAVE_SAMPLE)
    printf("The type of the sample received by polar() was invalid\n");
tupletype[0] = tup_type(x->uval.wave, 0);
wdim[0] = dim_len(x->uval.wave, 0);
if ((errorcode = create_wf(wave_dim(x->uval.wave), wdim, wave_tuple(x->uval.wave)
    printf("create_wf in polar reports ERRORCODE %d \n", errorcode);

if (!samp_alloc(&mag_sample) != NOERROR)
    printf("samp_alloc() was unable to allocate SAMPLE space\n");
mag_sample->type = WAVE_SAMPLE;
mag_sample->uval.wave = magw;

int len_output_fifo();
int maxl_ouput_fifo();
char *name;
char *malloc();
char string[20];

/* on first call only, initialize and check for errors */ if (pstate == NULL) { /* first call */

/* allocate state variable storage */ pstate = (STATEPTR) alloc_state_var(1, sizeof(STATE));

/* error if parameter not set by topology */ if(size != sizeof(POLARPARAM))
        return(1);

/* Set the vertical axis units for the magnitude and phase waves
    */
    tup_units(magw,0) = "Volts";
    switch(pparam->units)
    {
        case 0: tup_units(phasew,0) = "Radians";
            break;
        case 1: tup_units(phasew,0) = "Grads";
            break;
        case 2: tup_units(phasew,0) = "Degrees";
            break;
        default: tup_units(phasew,0) = "Unknown";
    }
    if (len_output_fifo(0) != maxl_output_fifo(0))
        put(0, &mag_sample);    /* put sample onto output fifo */
    if (put(1, &phase_sample) != 0)    /* put sample onto output fifo */
        return(0);    /* output fifo full */
} return(0);    /* input fifo empty */
```

```
if ((errorcode = create_wf(wave_dim(x->uval.wave), wdim, wave_tuple(x->uval.wave)
    printf("create wf2 in polar: reports ERRORCODE %2d \n", errorcode);

if (samp_alloc(&phase_sample) != NOERROR)
    printf("samp_alloc() was unable to allocate SAMPLE space\n");
phase_sample->type = WAVE_SAMPLE;
phase_sample->uval.wave = phasew;

if ((errorcode=polar(x->uval.wave, y->uval.wave, pparam->units, pparam->unwrap, (d
    printf("polar: reports ERRORCODE %2d \n", errorcode);
/*if ((name = (char *)(malloc((unsigned)(strlen(title_ptr(x->uval.wave)+8)+10))))
    printf("malloc couldn't allocate enough space \n");
sprintf(name,"POLAR OF%s", (title_ptr(x->uval.wave)+7));
title_ptr(magw) = title_ptr(phasew) = name;*/
dim_scale(magw, 0) = dim_scale(phasew, 0) = dim_scale(x->uval.wave, 0);
/*
 * Set the horizontal axis units for the magnitude and phase Waves
 */
dim_units(magw, 0) = dim_units(phasew, 0) = "Hertz";
/*
```

POLAR( )  APPENDIX C  POLAR( )

NAME
polar

PURPOSE
Converts rectangular coordinates to polar coordinates.

SYNOPSIS
include "tekspd.h"

ERRORTYPE
polar(real, im, units, unwrap, delay, mag, phase)

WAVEFORM *real, *im;
UNIT units;
BOOL unwrap;
double delay;
WAVEFORM *mag, *phase;

DESCRIPTION
*real:*
Pointer to the waveform containing x-coordinate or real number data.
*im:*
Pointer to the waveform containing y-coordinate or imaginary number data.
*units:*
Indicates whether phase should be calculated in radians, degrees, or grads.
*unwrap:*
Boolean that, if true, indicates that the phase data will be unwrapped.
*delay:*
Specifies a linearly varying phase adjustment.
*mag:*
Pointer to the output waveform containing magnitude data.
*phase:*
Pointer to the output waveform containing phase data.

*polar* converts the data in *real* and *im* into magnitude data and phase data to be stored in *mag* and *phase*, respectively, using the formulas below:

$$\text{mag\_arr}[i] = \sqrt{\text{real\_arr}[i]^2 + \text{im\_arr}[i]^2}$$

$$\text{phase\_arr}[i] = \arctan\left[\frac{\text{im\_arr}[i]}{\text{real\_arr}[i]}\right] + \text{"unwrap\_adjustment"} - 2\pi \cdot delay \cdot i$$

where mag_arr[i], phase_arr[i], real_arr[i], and im_arr[i] are waveform array values at the index i.

"unwrap_adjustment" is 0 if *unwrap* is FALSE, else it is set to $\pm n\pi$ where n is the unwrapping value used to eliminate the discontinuities at the $\pm\pi$ phase boundaries.

If either of the source waveforms, *real* or *im*, is the same as a target waveform, that source waveform is overwritten with the output data. If the waveform arrays are different sizes, the target waveform arrays will only be valid up to the length of the shortest of these arrays. If either *mag* or *phase* is a NIL pointer, the data for that waveform is simply not returned.

*units* is defined by one of three predefined keywords: RAD for radians, GRAD for grads, or DEGREE for degrees.

If *unwrap* is true, the phase data, which originally falls between $\pi$ and $-\pi$, is unwrapped modulo $2\pi$ to eliminate the discontinuities at $\pi$ and $-\pi$ and give continuous phase.

The delay parameter causes a linearly varying phase component whose slope is $2\pi \cdot delay$ to be subtracted from the phase after rectangular-to-polar conversion.

Both source waveforms and at least one target waveform must be valid. One target waveform pointer may be NIL. Information is taken from the first dimension and is placed in the first dimension. The data type information is taken from the first tuple.

The function returns an error code (as defined in the spd.h include file) indicating whether or not it was able to execute correctly.

APPENDIX D -- Netlist Format

The format of the netlist passed to BLOSIM is:

```
<executable function name> <block name>
        <parameter 1>
        <parameter 2>
              .
              .
              .
<executable function name> <block name>
        <parameter 1>
        <parameter 2>
              .
              .
              .

Connect
<source block name> <output port> <dest block name> <input port> <queue length>
<source block name> <output port> <dest block name> <input port> <queue length>
              .
              .
              .
END
``` where:
        executable function name
                name of the function in the executable function library block name
                name of the block as it appears on the block diagram Connect
                keyword denoting the start of the connection specification source block name
                name of the block (as it appears on the block diagram) of
                a block generating output data output port
                number of the output port of the block generating the data dest block name
                name of the block (as it appears on the block diagram) of
                a block receiving input data input port
                number of the output port of the block receiving the data queue length
                length of the queue connecting blocks END
                denotes the end of the netlist

APPENDIX D -- Example Netlist

```
Bfg5010 fg5010B
        SINE
        1.0
        1200.0
        0.0
        50.0
Afg5010 fg5010A
        SINE
        1.0
        1000.0
        0.0
        50.0
ps5010 powerSupply
        15.0
        0.4
        15.0
        0.4
amModulator amModulator
A7d20 7d20A
        6.19197e-5
        -8.17227
        0.00317337
        15.2311
        0.0
        PLUS
        1
        6.16
        -7.2
        YES
rffts rfft
polars polar
        rad
        wrap
        0.0
sink sink
waveprint graph
Connect
fg5010B 0 amModulator 0 1
fg5010A 0 amModulator 1 1
powerSupply 0 amModulator 2 1
amModulator 0 7d20A 0 1
7d20A 0 rfft 0 1
rfft 0 polar 0 1
rfft 1 polar 1 1
polar 0 graph 0 1
polar 1 sink 0 1
END
```

APPENDIX E. The definition of SAMPLE in the Environment Manager

```
/*
 * SAMPLE is the type of the object passed between
 *     the block functions of the
 *     Environment Manager.
 */ str  t sample {
    int  type;      /* defined type of sample   */
    union {         /* 7 possible sample types  */
        short    sval;     /* short integer sample */
        int      ival;     /* integer sample       */
```

```
long        lval;     /* long integer sample      */
float       fval;     /* floating point sample    */
double      dval;     /* double precision sample  */
char        *string;  /* character string         */
WAVEFORM    *wave;    /* pointer to waveform      */

} val;
};
typedef struct sample ATSAMPLE;
typedef ATSAMPLE *SAMPLE;

/*
* Defined types for the 'type' field of structure
*     ATSAMPLE.
*/
#define SHORT_SAMPLE  1 /* short integer sample */
#define INT_SAMPLE    2 /* integer sample       */
#define LONG_SAMPLE   3 /* long integer sample  */
#define FLOAT_SAMPLE  4 /* floating point sample*/
#define DBL_SAMPLE    5 /* double precision     */
#define STRING_SAMPLE 6 /* character string     */
#define WAVE_SAMPLE   7 /* waveform pointer     */
```

APPENDIX F. A Listing of a Typical Block Function

```
#include <stdio.h>
#include "type.h"   /* contains the definition of
       SAMPLE */

/*
*Declare the number of block function run-time
*     inputs and outputs.
*/
#define NUMINPUTS  1
#define NUMOUTPUTS 1

/*
*Declare the Smalltalk-to-C and C-to-Smalltalk
*     pipes as external.
*/
extern FILE *responseFile;
extern FILE *commandFile;

/*
* Define the parameter and state storage areas.
*/
typedef struct {
    int dummy;    /* no state variables needed */
```

---

```
} STATE, *STATEPTR;

typedef struct {
  int intFromPipe;  /* integer parameter
                       to be read from the
                       "commandFile" pipe  */
```

```
    char    name[80];     /* space for the block
                              function's name         */
} PARAM, *PARAMPTR;

/*****************************************************
 *
 * star_example -- this function is the block
 *    function driver routine for the 'example'
 *    block function.  The driver is responsible
 *    for allocating and initializing the data area
 *    for the block function, reading any
 *    parameters from the Smalltalk-to-C pipe and
 *    defining the number of run-time inputs and
 *    outputs.
 *
 * inputs:
 *
 *    info --a pointer to the CHAIN data structure,
 *           which is a repository for information
 *           about the block function.
 *           See typu.h for the definition of the
 *           CHAIN data structure.
 *
 * returns:
 *    0 indicating successful completion.
 *
 * effects:
 *
 *    The parameter area for the block function is
 *    allocated and the number of inputs and
 *    outputs are installed in the 'info' data
 *    structure.
 *
 * exceptions:
 *    none
 *
 *****************************************************/ star_example (info)

CHAINPTR info;

{
    int      example();      /* the block function
                                 routine              */
    PARAMPTR param;          /* pointer to the
                                 parameter area       */
    char     *para_allo-
              cate();        /* parameter area
                                 allocation routine   */
    char     *strcpy();      /* string copy function  */

/*
     * Allocate the block function's data area
     * and install its name.
     */
```

```
    param = (PARAMPTR) para_allocate
        (sizeof(PARAM));
    strcpy(param->name, info->blockname);
    /*
     * Read a parameter from the commandFile pipe
            and store it in the
     * data area.
     */
    fscanf(commandFile, "%d",
        ¶m->intFromPipe);

/*
     * This block function has one input and one
            output as defined above.
     */
    info->no_input = NUMINPUTS;
    info->no_output = NUMOUTPUTS;

/*
     * star_setup() stores pointers to the
            example() function and the
     * data area.  The pointer to example()
            is used later to
     * execute the block function routine.
     */
    star_setup (info,example,(char *)param,
        sizeof(PARAM)); return (0);
}

/***************************************************
 *
 * example -- this function is the 'example' block
 *    function routine.  It contains (or calls) the
 *    functional block of code that defines the
 *    semantics of this module.  It is responsible
 *    for allocating the state variable storage and
 *    checking for possible parameter errors.
 *
 *    This example block function has one input
 *    (where it receives a SAMPLE) and one output
 *    (where it can send out a SAMPLE).  It also
 *    interacts with the Smalltalk process to
 *    request animation and display of error
 *    messages.  For illustration, it also sends a
 *    keyword recognized by the server out the
 *    "responseFile" pipe to the Smalltalk process.
 *
 *inputs:
 *    param    -- a pointer to the data area
 *    size     -- the size of the data area
 *    pstate   -- a pointer to the state variable
 *                    storage area
 *returns:
 *    Non-zero integer error code in case
 *        of an error; else 0.
 *
 *effects:
 *    Block animation will result from the call
```

APPENDIX F

```
*            to 'invertBlock()'.
*       A sample may be received and one may be
*            output.
*       The state variable storage area will be
*            allocated upon the first
*       call to example().
*       A keyword is sent along the "responseFile"
*            pipe to the Smalltalk process.
*
* exceptions:
*       The following are error conditions and result
*            in non-zero return codes:
*            The 'size' parameter does not match
*            the size of the parameter data area.
*            The number of inputs or outputs
*            (fifos) is not as expected.
*       Attempts to access an empty input fifo or
*       write to a full one are not typically error
*       conditions.
*
***********************************************/
example(param,size,pstate)

PARAMPTR        param;
int             size;
STATEPTR        pstate;

{

SAMPLE   outputSample;       /* sample sent out
                                the output        */
SAMPLE   inputSample;        /* sample received
                                at the input      */
char    *alloc_state_var();  /* state variable al-
                                location routine  */
int      len_output_fifo();  /* returns length
                                of the output
                                fifo              */
int      maxl_output_fifo(); /* returns max.
                                length of output
                                fifo              */

/*
 * If this is the first call to this block
 * function routine, allocate the state variable
 * storage area and check for errors.
 */
if (pstate == NULL) {

/*
     * Allocate the state variable storage area.
```

```
     */
     pstate = (STATEPTR) alloc_state_var
              (1,sizeof(STATE));

/*
      * Check the size of the parameter area.
      */
     if (size != sizeof(PARAM))
         return(1);

/*
      * This block function has one input
        and one output as defined above.
      */
     if (no_input_fifos() != NUMINPUTS)
         return(2);

if (no_output_fifos() != NUMOUTPUTS)
         return(3);

/*
 * Make sure the output fifo is not full before
   we get a sample.
 */
if (len_output_fifo(0) == maxl_output_fifo(0))
        return(0);

/*
 * Get the sample (if any) from the input fifo.
 */
if (get(0, &inputSample) == 0){

/*
     * Request the Smalltalk process to
     * set the display block to reverse video.
     */
    invertBlock(param->name);

/*
     * This block function expects an integer
       sample so it checks the type.
     */
    if (inputSample->type != INT_SAMPLE)
        errorLog(param->name, "The type of the
                               sample received
                               by example()
                               was invalid");
    /* Allocate space for the sample to be sent as
       output.
     */
    if (samp_alloc(&outputSample) != 0)
        errorLog(param->name, "samp_alloc() was
                               unable to
                               allocate SAMPLE
                               space");
```

```
/*
 * If an integer sample is received, the output
 * sample is set to integer 0.
 ****** This is the point where other       ******
 ****** application code would typically    ******
 ******   be inserted.                      ******
 */
outputSample->type = INT_SAMPLE;
outputSample->uval.ival = 0;

/*
 * Send out the result.
 */
if (put(0, &outputSample) != 0)
    return(0);              /* output fifo full */
/*
 * Send a keyword out the responseFile pipe
 * to the Smalltalk process.
 */
fprintf(responseFile, "%s", "scalar");

} return(0);                  /* input fifo empty */

}
```

APPENDIX G: Signal Viewing Variables

These are the variables used in the operation of signal viewing interface to a digitizer.

Interface defining and operating variables

| | |
|---|---|
| defaultAcqRect | Rectangle<br>origin x: 0.0 *start time*<br>origin y: -5.0 *lowest voltage*<br>corner x: 0.01 *end time*<br>corner y: 5.0 *hightest voltage* |
| screenRect | Rectangle from 'zoom in' function<br>origin x: 0.0 *corresponds to start time*<br>origin y: -5.0 *corresponds to lowest voltage*<br>corner x: 0.01 *corresponds to end time*<br>corner y: 5.0 *corresponds to hightest voltage* |
| displayTransformation | WindowingTransformation<br>scale: *scale factors for x and y dimensions*<br>translation: *offset factors for x and y dimensions* |
| acqRect | Rectangle<br>origin x: *user-specified start time*<br>origin y: *user-specified lowest voltage*<br>corner x: *user-specified end time*<br>corner y: *user-specified hightest voltage* |

| | |
|---|---|
| zoomOutFactor | Point<br>   x: *factor by which to expand acqRect horizontally*<br>   y: *factor by which to expand acqRect vertically* |
| minZoomRect | Rectangle<br>   origin: 0@0<br>   extent: 10@10<br><br>*Minimum size, in screen units, of rectangle for 'zooming in.' These coordinates are entirely arbitrary and should be dictated by the application area addressed.* |

Digitizer defining variables

| | |
|---|---|
| Tables | Collection<br>*Contains following four variables which define a digitizer for vertical settings* |
| rangeTable | Collection<br>*Permissible voltage range settings arranged from smallest to largest* |
| minOffset | Number<br>*Lowest offset (as percentage of range) setting allowed* |
| maxOffset | Number<br>*Highest offset (as percentage of range) setting allowed* |
| offsetRes | Number<br>*Resolution of offset setting* |
| Tables | Collection<br>*Contains following four variables which define a digitizer for horizontal settings* |
| sampleIntervalTable | Collection<br>*Permissible sample interval settings arranged from smallest to largest* |
| minDelay | Number<br>*Lowest delay setting allowed* |
| maxDelay | Number<br>*Highest delay setting allowed* |
| maxSamples | Number<br>*Maximum value of samples that may be acquired.* |

Calculated digitizer settings

| | |
|---|---|
| range | Number<br>*an element from* rangeTable *in volts peak-to-peak* |
| offset | Number<br>*in ± percent of* range |
| sampleInterval | Number<br>*an element from* SampleRateTable, *in seconds* |

| | |
|---|---|
| delay | Number *in samples* |
| samples | Number *number of samples to be acquired* |

APPENDIX H

This is the method (written in the Smalltalk-80 programming language) for caluclating the vertical settings to be sent to a digitizer.

```
verticalSettings: acqRect tables: vTables
"This method calculates range and offset settings for a digitizer defined in
vTables for a user-specified acquistion rectangle, acqRect."

| rangeTable offsetMin offsetMax i range offset result offsetRes |

"vTables is a dictionary with 4 entries. It defines a digitizer for establishing vertical settings.
The table's entries are:

rangeTable - a collection of vertical ranges, ordered smallest to largest
        offsetMin ← minimum value for offset
        offsetMax ← maximum value for offset
        offsetRes ← resolution with which offset may be specified.

The following temporary variables are unpacked from vTables for clarity."

rangeTable ← vTables at: 1.
offsetMin ← vTables at: 2.
offsetMax ← vTables at: 3.
offsetRes ← vTables at: 4.

i ← 1.          "a pointer into rangeTable"

[               "Select a range from rangeTable:"

range ← rangeTable at: i.

"Calculate an offset, as a percentage of the current range, such that the offset
                is the center of the acqRect's vertical component or the minimum or maximum
                allowed offset value."

offset ← (((acqRect top + acqRect bottom) / 2.0) / range * 100.0) truncateTo: offsetRes.
        offset ← (offsetMin max: offset) min: offsetMax.

"Test to determine whether:
                    1) the rangeTable has been exhausted, or
                    2) the range and offset settings can be combined to bracket the
                        acqRect's vertical component."

i >= rangeTable size
        or: [(acqRect top) >= ((range * (offset / 100.0)) - (range / 2.0))
                and: [(acqRect bottom) <= ((range * (offset / 100.0)) + (range / 2.0))]]]
whileFalse: [i ← i + 1].

"Transcript
                show: ((range * (offset / 100.0)) - (range / 2.0)) printString;tab;tab;
                show: ((range * (offset / 100.0)) + (range / 2.0)) printString;cr;
                tab;show: 'RANGE: ', range printString;cr;
                tab;show: 'OFFSET: ', offset printString;cr;cr."

result ← OrderedCollection new: 2.
result addLast: range;
       addLast: offset.
↑ result
```

APPENDIX I

This is the method (written in the Smalltalk-80 programming language) for caluclating the horizontal settings to be sent to a digitizer.

horizontalSettings: acqRect tables: hTables
> "This method calculates sampleInterval, delay and samples settings for a digitizer defined in
> hTables for a user-specified acquistion rectangle, acqRect."

| sampleIntervalTable minDelay maxDelay maxSamples i sampleInterval delay samples result |

> "hTables is a colleciton with four entries. It defines a digitizer for establishing horizontal
> settings. The table's entries are:
>
> > sampleIntervalTable - a collection of available sample rates, ordered from shortest to longest,
> > minDelay - the minimum delay value (with respect to a trigger event),
> > maxDelay - the maximum delay value,
> > maxSamples - the maximum number of samples that may be acquired.
>
> The following temporary variables are unpacked from hTables for clarity."

sampleIntervalTable ← hTables at: 1.
minDelay ← hTables at: 2.
maxDelay ← hTables at: 3.
maxSamples ← hTables at: 4.

i ← 1. "a pointer into the sampleIntervalTable."

> "Select a sampling rate, sampleInterval, from sampleIntervalTable."

sampleInterval ← sampleIntervalTable at: i.

> "Calculate delay as the number of sampling intervals (after a trigger event) to wait before sampling.
> Delay must obey the restriction: minDelay <= delay <= maxDelay."

delay ← (acqRect left / sampleInterval) floor asFloat. "use next lowest integer number of sample times"
delay ← (minDelay max: delay) min: maxDelay.

> "Calculate the number of sample points, samples, from the first sampling time to the sampling point
> at or 1 past the latest (or right) edge of the acquisition window (the value is 1 greater than the
> number of sampling intervals). Samples must obey the restriction: samples <= maxSamples."

samples ← ((acqRect right - (delay * sampleInterval)) / sampleInterval) ceiling asFloat + 1.0.
samples ← samples min: maxSamples.

> "Test to determine whether:
> > 1) the sampleIntervalTable has been exhausted, or
> > 2) the acquisition rectangle's latest (or right) edge is less than or equal to the delay time plus
> > the digitizer window's width (the acquisition window's earliest (or left) edge is guaranteed to
> > be within the digitizer's window by the delay calculation)."

i >= sampleIntervalTable size
or: [acqRect right <= ((delay * sampleInterval) + ((samples - 1.0) * sampleInterval))]

whileFalse: [ i ← i + 1].

> "Return a collection with sampleInterval, delay, and samples."

result ← OrderedCollection new: 3.
result addLast: sampleInterval;
    addLast: delay;
    addLast: samples.
↑ result

APPENDIX J

These are the key Smalltalk-80 methods for graphically controlling a power supply (FIGs. 20 and 21).

---

This is the workspace program for creating, defining, and opening a view for controlling a power supply.

```
ps ← PowerSupply new.
ps constraints: (OrderedCollection
    with: (0.05@0.0 corner: 0.4@32.0)
    with: (0.4@0.0 corner: 0.75@15.0)).

PowerSupplyView openOn: ps
```

---

This method dispatches control to one of three operating point procedures depending upon the location of the system cursor when the operating (red) button is pressed.

```
PowerSupplyController methodsFor: 'interactive settings'
``` redButtonActivity

```
"Decide which operating point to adjust.
Select the operating point nearest the default cursor when the button was pushed."

| myPosition cursorPosition d1 d2 d3 |

"Get the default cursor position and my combined operating point in terms of
screen coordinates."

cursorPosition ← Sensor cursorPoint.
myPosition ← (view displayTransformation applyTo: model asPoint) rounded.

"Find distances from default cursor position to:
    x operating point cursor mid-point
    y operating point cursor mid-point
    combined operating point."

d1 ← cursorPosition dist: ((view displayBox left) @ (myPosition y + myPosition / 2.0)).
d2 ← cursorPosition dist: ((myPosition x) @ (view displayBox bottom + myPosition / 2.0)).
d3 ← cursorPosition dist: myPosition.

"Find shortest distance and perform appropriate operation."

d1 < d2
    ifTrue: [d1 < d3
        ifTrue: [self yPointOperation]
        ifFalse: [self combinedPointOperation]]
    ifFalse: [d2 < d3
        ifTrue: [self xPointOperation]
        ifFalse: [self combinedPointOperation]]
```

This method provides for the interactive adjustment of the combined operating point.

combinedPointOperation: view

```
"Displays x cursor from point to graticule which track
the sensor point until the redButtonIs clicked."

|screenPt oldScreenPt screenConstraints oldRect a b oldXCursor oldYCursor |

"Get combined operating point in screen coordinates."
``` screenPt ← oldScreenPt ← view displayTransform: model asPoint.

*"Blank out cursor and move it to the combined operating point."*

Cursor blank show.
Sensor cursorPoint: screenPt.

*"Make forms for the x and y cursors."* oldXCursor ← (Form
    extent: ((xCursor translateBy: oldScreenPt)
        intersect: view insetDisplayBox) extent) black.
oldYCursor ← (Form
    extent: ((yCursor translateBy: oldScreenPt)
        intersect: view insetDisplayBox) extent) black.

*"screenPt is guaranteed to be within the constraints. Convert constraint rectangles
into screen coordinate system, and find out which one contains the operating point (screenPt)."* screenConstraints ← self screenConstraints: view displayTransformation.

oldRect ← screenConstraints detect: [:x | x containsPoint: screenPt]
        ifNone: [self error: 'self not within constraints'].

*"While the red button is pressed, adjust the combined operating point."*

[Sensor redButtonPressed] whileTrue:
    [screenPt ← Sensor cursorPoint.
    screenPt = oldScreenPt
        ifFalse: [ *"A new screen point (cursor has moved): find out if current constraint (oldRect)
                still contains the point."*

(oldRect containsPoint: screenPt)
            ifFalse: [ *"If not, find out if any other constraint contains the point, and make it the
                    new current constraint."* oldRect ← screenConstraints
                detect: [:x | x containsPoint: screenPt]
                ifNone: [ *"If not, adjust the cursor point back into the current constraint (oldRect).
                        This makes the cursor follow edges."* screenPt ← screenPt + ((screenPt extent: 1 @ 1)
                    amountToTranslateWithin: oldRect).
                Sensor cursorPoint: screenPt.
                oldRect]].

*"Animate the x and y cursors by building cursors for the new locations and asking
        the old cursors to move the new cursors to the new locations restoring the old
        backgrounds (a variant of a standard Smalltalk-80 method. yBg and xBg are instance
        variables instantiated in display method: they contain the background under the
        operating point cursors."* yBg ← oldYCursor moveNewForm: (oldYCursor ←
                ((Form extent: (a ← ((yCursor translateBy: screenPt)
                    intersect: view insetDisplayBox)) extent) black))
            to: a origin
            restoring: yBg.
        xBg ← oldXCursor moveNewForm: (oldXCursor ←
                ((Form extent: (a ← ((xCursor translateBy: screenPt)
                    intersect: view insetDisplayBox)) extent) black))
            to: a origin
            restoring: xBg.

*"Paint up the new digital readout."* self updateReadout: screenPt.
oldScreenPt ← screenPt]].

*"Button is released. Establish new combined operating point, and show the normal cursor"* model newSettingPoint: (view inverseDisplayTransform: screenPt).
Cursor normal show

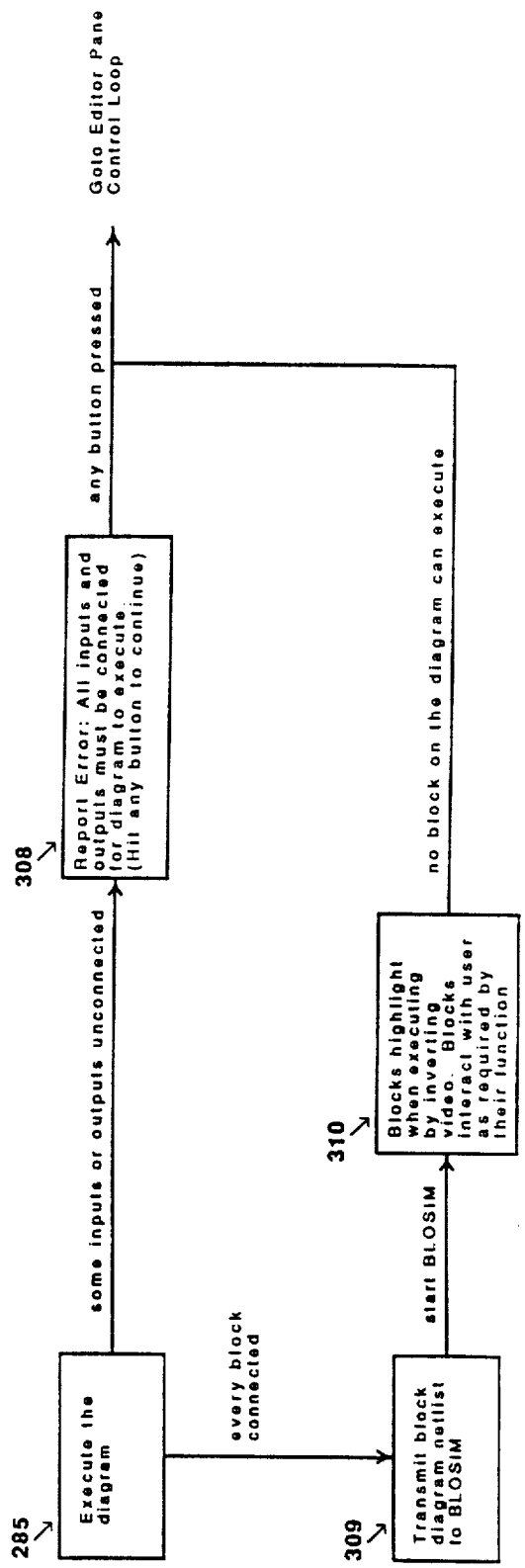

We claim:

1. A graphical user interface system for a user interactively to edit and program a block diagram for execution by a computer, the system comprising:
   a programmable computer including memory means for storing computer program instructions and data and processing means for executing the stored program instructions to manipulate the stored data;
   a graphical display means connected to the computer for displaying two-dimensional graphic data;
   input means connected to the computer for inputting data to the computer, including user-operable means for selecting and positioning graphic data displayed on the display means;
   block display means responsive to the user-operable means for displaying a plurality of user-selected blocks as graphical data on the graphical display means, said blocks including a first block having an output terminal and a second block having an input terminal;
   interconnection display means responsive to the user-operable means for displaying an interconnection between the output terminal of the first block and the input terminal of the second block;
   first prestored function instruction means associated with the first block and executable by the processing means for generating a first set of signal data in accordance with a predefined first function and providing the signal data at the output terminal of the first block;
   data flow means associated with the displayed inteconnection for transmitting signal data between functions in a direction determined by the interconnection from the output terminal of the first block to the input terminal of the second block;
   second prestored function instruction means associated with the second block and executable by the processing means for transforming the input signal data in accordance with a predefined second function;
   at least one of the function instruction means including a user-settable parameter responsive to user operation of the input means to set the function thereof, the parameter including a two-dimensional output function and the means for setting said parameter includes means for displaying a representation of said function on the graphical display means;
   means responsive to operation of the user-operable means for graphically modifying said representation, and means for converting the modified representation into a modified setting of the two-dimensional output function;
   means responsive to the input means for actuating the processing means to execute the first and second function instruction means to generate said first set of signal data in accordance with the first function, to transmit the signal data via the data flow means to the second function, and to transform the signal data in accordance with the second function to produce a second set of signal data; and
   means for actuating the graphical display means to display the second set of signal data.

2. A method of computer-controlling a physical system, comprising:
   providing computer-controllable means for stimulating the physical system;
   providing computer-controllable means for detecting a response to stimulation of the physical system;
   providing a computer including user input means for a user to enter instructions, user display means for graphically displaying information to the user, and external communications means for sending and receiving data;
   connecting the computer communications means for sending control signals via a first data channel to control the stimulating and detecting means for receiving, via a second data channel from the detecting means, a data signal that defines a response of the physical system to the stimulation;
   programming the computer to display a block diagram including a first block defining the stimulating means and a second block defining the detecting means;
   storing in association with the first block a variable stimulation parameter generically defining a form of stimulation that the stimulating means is capable of providing to the physical system;
   storing in association with the second block a variable detection parameter generically defining a feature of the response that the detecting means is capable of detecting;
   programming the computer to generate and send control signals to the stimulating and detecting means to actuate stimulation of the physical system and detection of the response thereof in accordance with the stimulation and detection parameters;
   entering in association with a selected one of the first and second blocks an instruction setting the variable parameter thereof to a specific simulation or detection parameter;
   executing the program to cause the computer means to send said control signals to the stimulating and detecting means to cause each in turn to stimulate the physical system and detect the response thereof in accordance with the specific stimulation parameter;
   transmitting to the computer a data signal corresponding to the detected response of the physical system; and
   processing the data signal and displaying in association with the second block a representation of the detected response, the displayed representation of the response being determined by said stimulation and detection parameters, wherein the detecting means is operable to detect the response of the physical system in two dimensions defining a signal acquisition window, including storing two of said variable detection parameters corresponding to the two dimensions, entering in association with the second block an instruction setting at least one of the two variable parameters to specific detection parameters to determine said acquisition window, operating the detecting means to acquire signal data defining said response in accordance with the signal acquisition window determined by the two specific parameters, and displaying a two-dimensional representation of the acquired signal data within a display window defined by said two parameters.

3. A method according to claim 2 including superimposing a modified display window over a portion of the signal represented in the display window, converting the modified display window into modified detection parameters, and operating the detecting means in accordance with the modified detection parameters to acquire a second response within a modified signal acquisition window determined by the modified detection parameters.

4. A method of computer-controlling a physical system, comprising:

providing computer-controllable means for stimulating the physical system;

providing computer-controllable means for detecting a response to stimulation of the physical system;

providing a computer including user input means for a user to enter instructions, user display means for graphically displaying information to the user, and external communications means for sending and receiving data;

connecting the computer communications means for sending control signals via a first data channel to control the stimulating and detecting means and for receiving, via a second data channel from the detecting means, a data signal that defines a response of the physical system to the stimulation;

programming the computer to display a block diagram including a first block defining the stimulating means, a second block defining the detecting means, a third block defining the physical system, a first signal path connecting an output of the first block to an input of the third block, and a second signal path connecting an output of the third clock to an input of the second block;

storing in association with the first block a variable stimulation parameter generically defining a form of stimulation that the stimulating means is capable of providing to the physical system;

storing in association with the second block a variable detection parameter generically defining a feature of the response that the detecting means is capable of detecting;

programming the computer to generate and send control signals to the stimulating and detecting means to actuate stimulation of the physical system and detection of the response thereof in accordance with the stimulation and detection parameters;

entering in association with a selected one of the first and second blocks an instruction setting the variable parameter thereof to a specific stimulation or detection parameter;

executing the program to cause the computer means to send said control signals to the stimulating and detecting means to cause each in turn to stimulate the physical system and detect the response thereof in accordance with the specific stimulation parameter;

transmitting to the computer a data signal corresponding to the detected response of the physical system; and processing the data signal and displaying in association with the second block a representation of the detected response, the displayed representation of the response being determined by said stimulation and detection parameters wherein the stimulating means is operable to generate a test signal having signal features in two dimensions, including storing two of said variable stimulation parameters corresponding to the two-dimensional signal features, entering in association with the first block an instruction setting the two variable parameters to specific stimulation parameters, and operating the stimulating means to generate the two-dimensional test signal in accordance with the two specific parameters 5. A method according to claim 4 including displaying a two-dimensional representation of the variable stimulation parameters, displaying and positioning a point on said two-dimensional representation, and converting coordinates of said point to said two specific parameters.

6. A method of computer-controlling a physical system, comprising:

providing computer-controllable means for stimulating the physical system;

providing computer-controllable means for detecting a response to stimulation of the physical system;

providing a computer including user input means for a user to enter instructions, user display means for graphically displaying information to the user, and external communications means for sending and receiving data;

connecting the computer communications means for sending control signals via a first data channel to control the stimulating and detecting means and for receiving, via a second data channel from the detecting means, a data signal that defines a response of the physical system to the stimulation;

programming the computer to display a block diagram including a first block defining the simulating means, a second block defining the detecting means, a third block defining the physical system, a first signal path connecting an output of the first block to an input of the third block, and a second signal path connecting an output of the third clock to an input of the second block;

storing in association with the first block a variable stimulation parameter generically defining a form of stimulation that the stimulating means is capable of providing to the physical system;

storing in association with the second block a variable detection parameter generically defining a feature of the response that the detecting means is capable of detecting;

programming the computer to generate and send control signals to the stimulating and detecting means to actuate stimulation of the physical system and detection of the response thereof in accordance with the stimulation and detection parameters;

entering in association with a selected one of the first and second blocks an instruction setting the variable parameter thereof to a specific stimulation or detection parameter;

executing the program to cause the computer means to send said control signals to the stimulating and detecting means to cause each in turn to stimulate the physical system and detect the response thereof in accordance with the specific stimulation parameter;

transmitting to the computer a data signal corresponding to the detected response of the physical system; and processing the data signal and displaying in association with the second block a representation of the detected response, the displayed representation of the response being determined by said stimulation and detection parameters.

7. A method according to claim 6 including storing information about the physical system, said information normally being suppressed but being displayable upon request of the user by actuation of the input means.

8. A method according to claim 6 including storing a third block function in association with the third block comprising a simulation of the physical system, inputting to the third block function data corresponding to the stimulation signal, and detecting the response of the simulation in accordance with the stimulation and detection parameters.

* * * * *

UNITED STATES PATENT AND TRADEMARK OFFICE
CERTIFICATE OF CORRECTION

PATENT NO. : 4,868,785

DATED : September 19, 1989

INVENTOR(S) : Dale A. Jordan, et al

It is certified that error appears in the above-identified patent and that said Letters Patent is hereby corrected as shown below:

Fig. 38, Sheet 53 of 64, of the drawings should be added as shown on the attached sheet.

Signed and Sealed this

First Day of January, 1991

*Attest:*

HARRY F. MANBECK, JR.

*Attesting Officer*      *Commissioner of Patents and Trademarks*